United States Patent
Chen

(10) Patent No.: US 12,216,191 B2
(45) Date of Patent: Feb. 4, 2025

(54) METHODS, CIRCUITS, AND APPARATUS FOR MOTION DETECTION, DOPPLER SHIFT DETECTION, AND POSITIONING BY SELF-ENVELOPE MODULATION

(71) Applicant: Richwave Technology Corp., Taipei (TW)

(72) Inventor: Tse-Peng Chen, Taipei (TW)

(73) Assignee: Richwave Technology Corp., Taipei (TW)

( * ) Notice: Subject to any disclaimer, the term of this patent is extended or adjusted under 35 U.S.C. 154(b) by 447 days.

(21) Appl. No.: 16/826,584

(22) Filed: Mar. 23, 2020

(65) Prior Publication Data

US 2020/0341133 A1    Oct. 29, 2020

Related U.S. Application Data

(60) Provisional application No. 62/886,293, filed on Aug. 13, 2019, provisional application No. 62/827,635, filed on Apr. 1, 2019.

(51) Int. Cl.
*G01S 13/56* (2006.01)
*G01S 7/292* (2006.01)
(Continued)

(52) U.S. Cl.
CPC ............ *G01S 13/56* (2013.01); *G01S 7/2925* (2013.01); *G01S 7/415* (2013.01); *G01S 13/522* (2013.01)

(58) Field of Classification Search
CPC ........ G01S 13/56; G01S 7/2925; G01S 7/415; G01S 13/522
See application file for complete search history.

(56) References Cited

U.S. PATENT DOCUMENTS

| | | |
|---|---|---|
| 3,970,938 A | 7/1976 | Sylten |
| 4,176,352 A | 11/1979 | Tyler |
| | (Continued) | |

FOREIGN PATENT DOCUMENTS

| | | |
|---|---|---|
| CN | 203455138 U | 2/2014 |
| JP | S-61-171641 A | 8/1986 |
| | (Continued) | |

OTHER PUBLICATIONS

Notice of Reasons for Refusal issued by the Japanese Patent Office in related JP Application No. 2020-062288, mailed Apr. 6, 2021 (10 pgs.).

(Continued)

*Primary Examiner* — Marcus E Windrich
(74) *Attorney, Agent, or Firm* — Finnegan, Henderson, Farabow, Garrett & Dunner, L.L.P.

(57) ABSTRACT

Methods and apparatus for detecting motion of an object in an environment, the method including transmitting a first wireless signal related to a transmission signal and receiving a second wireless signal related to an incoming signal, wherein the second wireless signal is a reflected first wireless signal from the object, obtaining a modulation signal related to a combination of the transmission and incoming signals, wherein the modulation signal contains a Doppler shift caused by the motion of the object, extracting a signal envelope varied by the Doppler shift from the modulation signal, and determining whether motion of the object is detected in accordance with the signal envelope.

20 Claims, 62 Drawing Sheets

(51) Int. Cl.
*G01S 7/41* (2006.01)
*G01S 13/522* (2006.01)

(56) References Cited

U.S. PATENT DOCUMENTS

| | | | |
|---|---|---|---|
| 5,459,405 | A | 10/1995 | Wolff et al. |
| 5,966,090 | A | 10/1999 | McEwan |
| 6,426,716 | B1 * | 7/2002 | McEwan .............. G01S 13/04 |
| | | | 342/28 |
| 7,233,388 | B2 | 6/2007 | Fujimori et al. |
| 7,932,855 | B2 * | 4/2011 | Uebo .............. G01S 13/32 |
| | | | 342/129 |
| 8,781,420 | B2 | 7/2014 | Schlub et al. |
| 9,125,628 | B2 * | 9/2015 | Saitoh .............. A61B 5/0059 |
| 11,316,474 | B1 * | 4/2022 | Ku .............. H03D 7/1408 |
| 11,316,475 | B1 * | 4/2022 | Ku .............. H03D 7/1408 |
| 2002/0060639 | A1 | 5/2002 | Harman |
| 2003/0030557 | A1 * | 2/2003 | Progovac .............. G01S 7/536 |
| | | | 340/552 |
| 2004/0119966 | A1 | 6/2004 | Iritani et al. |
| 2010/0109938 | A1 * | 5/2010 | Oswald .............. G01S 13/522 |
| | | | 707/E17.014 |
| 2011/0014880 | A1 | 1/2011 | Nicolson et al. |
| 2011/0181510 | A1 * | 7/2011 | Hakala .............. G06F 3/017 |
| | | | 345/158 |
| 2015/0338506 | A1 * | 11/2015 | Yukumatsu .............. G01S 7/35 |
| | | | 342/27 |
| 2017/0131395 | A1 | 5/2017 | Reynolds et al. |
| 2017/0328997 | A1 * | 11/2017 | Silverstein .............. G01S 7/003 |
| 2018/0081030 | A1 * | 3/2018 | McMahon .............. A61B 5/08 |
| 2020/0209388 | A1 * | 7/2020 | Ding .............. G01S 15/582 |
| 2020/0341133 | A1 * | 10/2020 | Chen .............. G01S 7/415 |

FOREIGN PATENT DOCUMENTS

| | | |
|---|---|---|
| JP | S-63-52082 A | 3/1988 |
| JP | H-02-223884 A | 9/1990 |
| JP | H 04-130288 A | 5/1992 |
| JP | H-7-218629 A | 8/1995 |
| JP | H-09-90031 A | 4/1997 |
| JP | H 10-126109 A | 5/1998 |
| JP | 2000-118338 A | 4/2000 |
| JP | 2001-108490 A | 4/2001 |
| JP | 2002-502042 A | 1/2002 |
| JP | 2002-507728 A | 3/2002 |
| JP | 2005-308646 A | 11/2005 |
| JP | 2006-275701 A | 10/2006 |
| JP | 2007093576 A | 4/2007 |
| JP | 2007-121043 A | 5/2007 |
| JP | 2007-124565 A | 5/2007 |
| JP | 2008-232982 A | 10/2008 |
| JP | 2009-35971 A | 2/2009 |
| JP | 2009-150208 A | 7/2009 |
| JP | 2009-294198 A | 12/2009 |
| JP | 2010-144494 A | 7/2010 |
| JP | 2011-128120 A | 6/2011 |
| JP | 2012-088293 A | 5/2012 |
| JP | 2012-112741 A | 6/2012 |
| JP | 2013-096828 A | 5/2013 |
| JP | 2014-059232 A | 4/2014 |
| JP | 2016-109657 A | 6/2016 |
| JP | 2018-516365 A | 6/2018 |
| KR | 10-1358904 B1 | 2/2014 |
| KR | 10-2016-0014390 A | 2/2016 |
| TW | 274584 B | 4/1996 |
| TW | 200401114 A | 1/2004 |
| TW | 201237448 A | 9/2012 |
| WO | WO 2014/050055 A1 | 4/2014 |
| WO | WO 2015/163138 A1 | 10/2015 |
| WO | 2019/038097 A1 | 2/2019 |

OTHER PUBLICATIONS

Office Action issued by the Korean Patent Office in related KR Application No. 10-2020-0039352, mailed May 21, 2021 (9 pgs.).
Taiwan Intellectual Property Office, Office Action regarding Application No. 109111123, Jan. 7, 2021 (7 pgs.).
Japan Patent Office, Notice of Reasons for Refusal in related JP Patent Application No. 2020-062288, mailed Sep. 7, 2021 and English translation (16 pages).
Choi, Mui-Gak et al., "*Design of an AM Radar Module with Improved Range Accuracy*," Research Gate Publication; Aug. 2010; https://www.researchgate.net/publication/264135118; Aug. 2010 (10 pgs.).
Lyu, Pei-Yu et al., "*A Standing-Wave Envelope Detection Technique for Breath and Heartbeat Rates Detection (invited)*"; IEEE 978-1-4799-8543-2/15 © 2015 (2 pgs.).
Fujimori, S. et al., "*Measurement of Distance and Velocity of a Moving Target by Short-Range High-Resolution Radar Utilizing Standing Wave*," The 47$^{th}$ IEEE International Midwest Symposium on Circuits and Systems; 0-7803-8346-X/04 © 2004 (4 pgs.).
European Patent Office, Extended European Search Report of EP 20167553.5, Jun. 9, 2020.
Ma, Xujun et al.; "Envelope detection for a double-sideband Low IF CW radar"; 2018 IEEE/MTT-S International Microwave Symposium, Jun. 10, 2018, pp. 240-243, XP033387898, DOI: 10.1109/MWSYM.2018.8439172.
Milani, Ileana et al.; "WiFi Emission-Based vs Passive Radar Localization of Human Targets"; 2018 IEEE Radar Conference, Apr. 23, 2018, pp. 1311-1316, XP033357077, DOI: 10.1109/RADAR.2018.8378753.
Japan Patent Office, Notice of Reasons for Refusal in relation to JP Application No. 2020-062288, mailed May 10, 2022 (24 pgs.).
Japanese Patent Office, Notice of Reasons for Refusal in relation to counterpart JP Patent Application No. 2023-050928, mailed Oct. 31, 2023 (13 pgs.).
Japan Patent Office, Notice of Reasons for Refusal in relation to counterpart JP Application No. 2020-62288, mailed Jun. 18, 2024 and English translation thereof (19 pgs.).

* cited by examiner

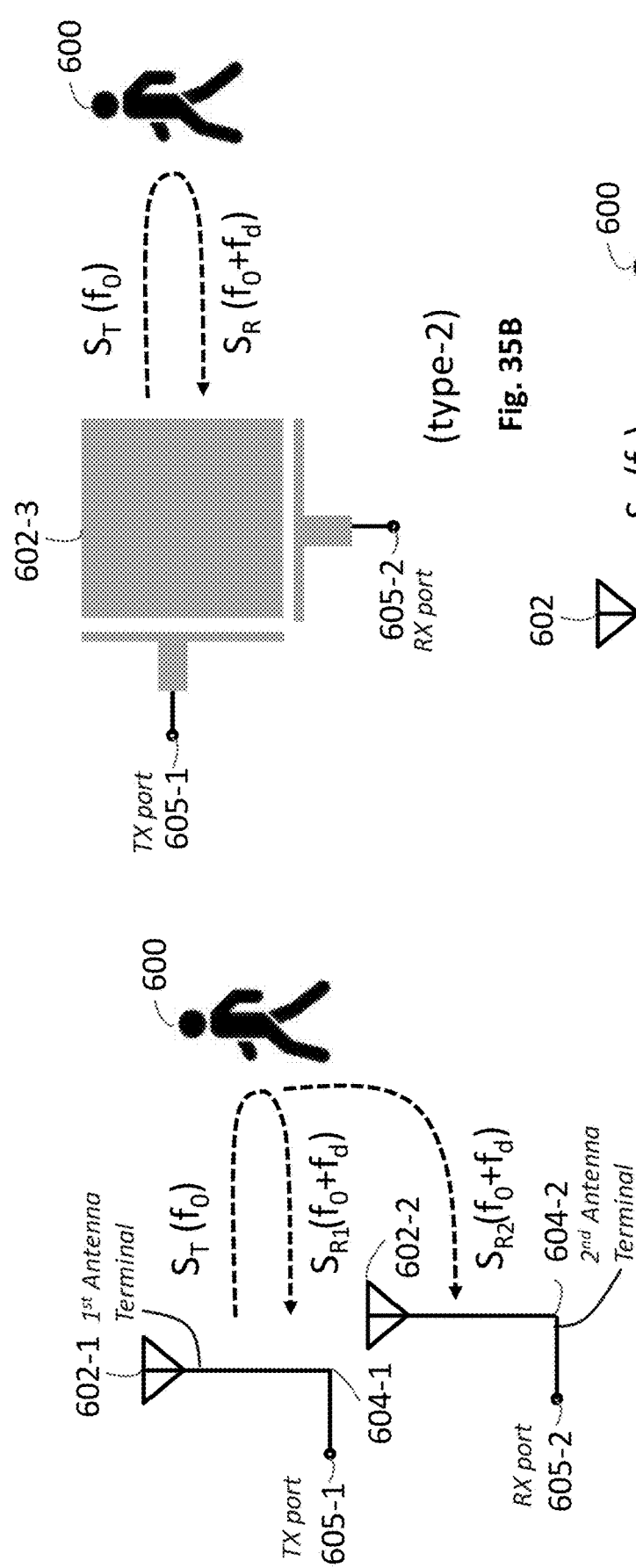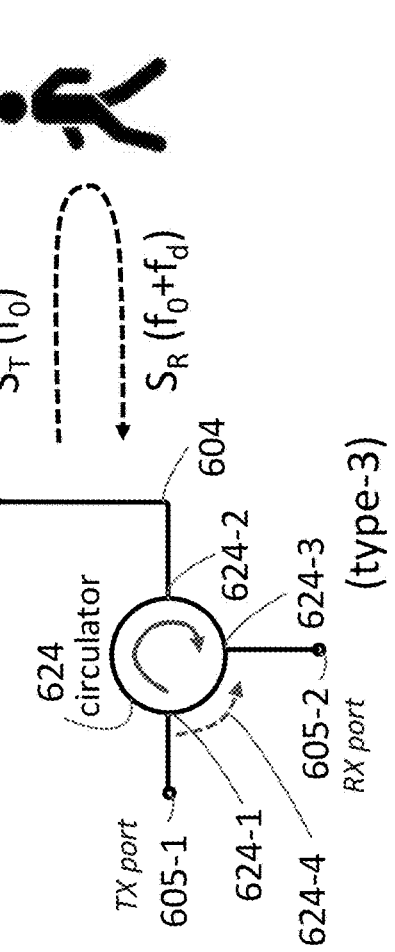
Fig. 35A (type-1)
Fig. 35B (type-2)
Fig. 35C (type-3)

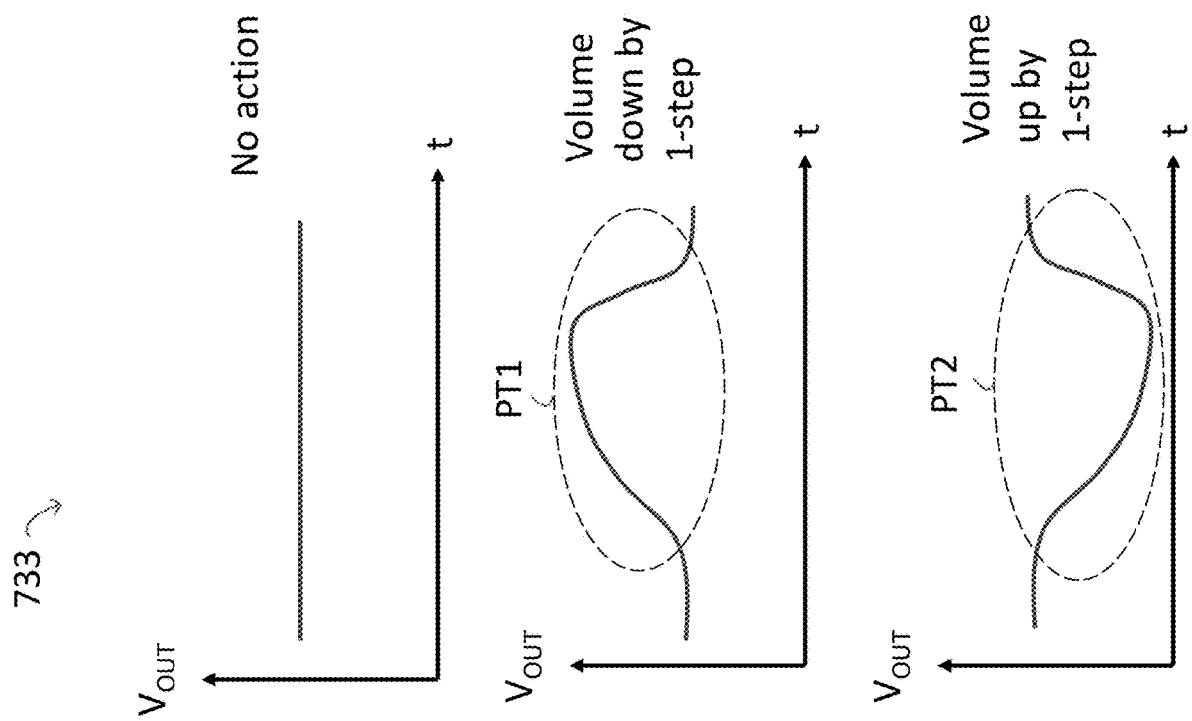
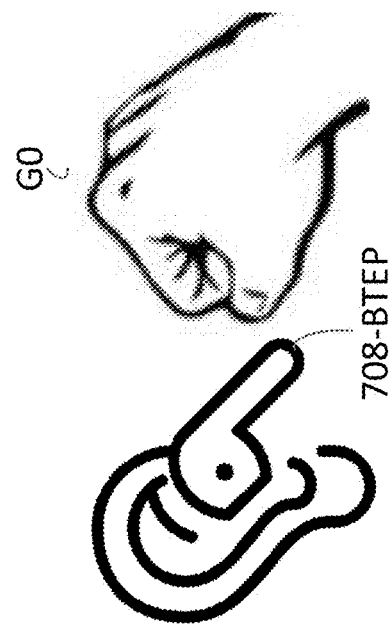
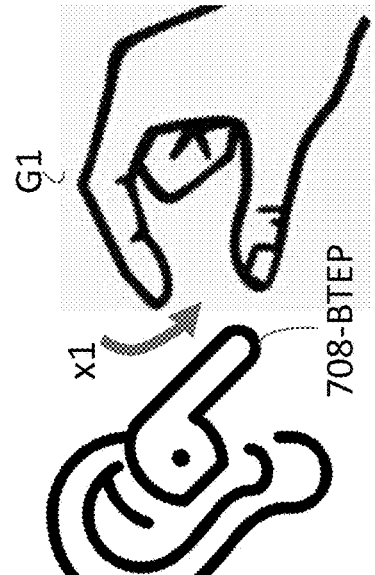
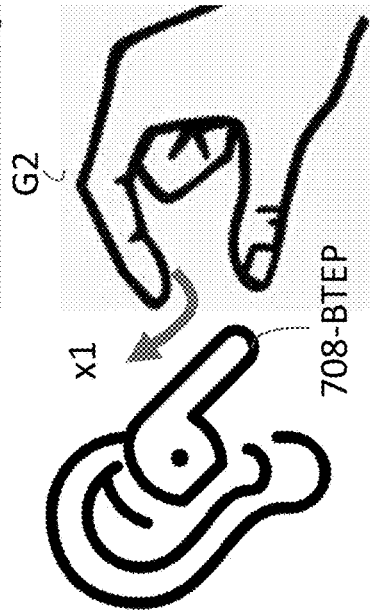
Fig. 47A
Fig. 47B
Fig. 47C

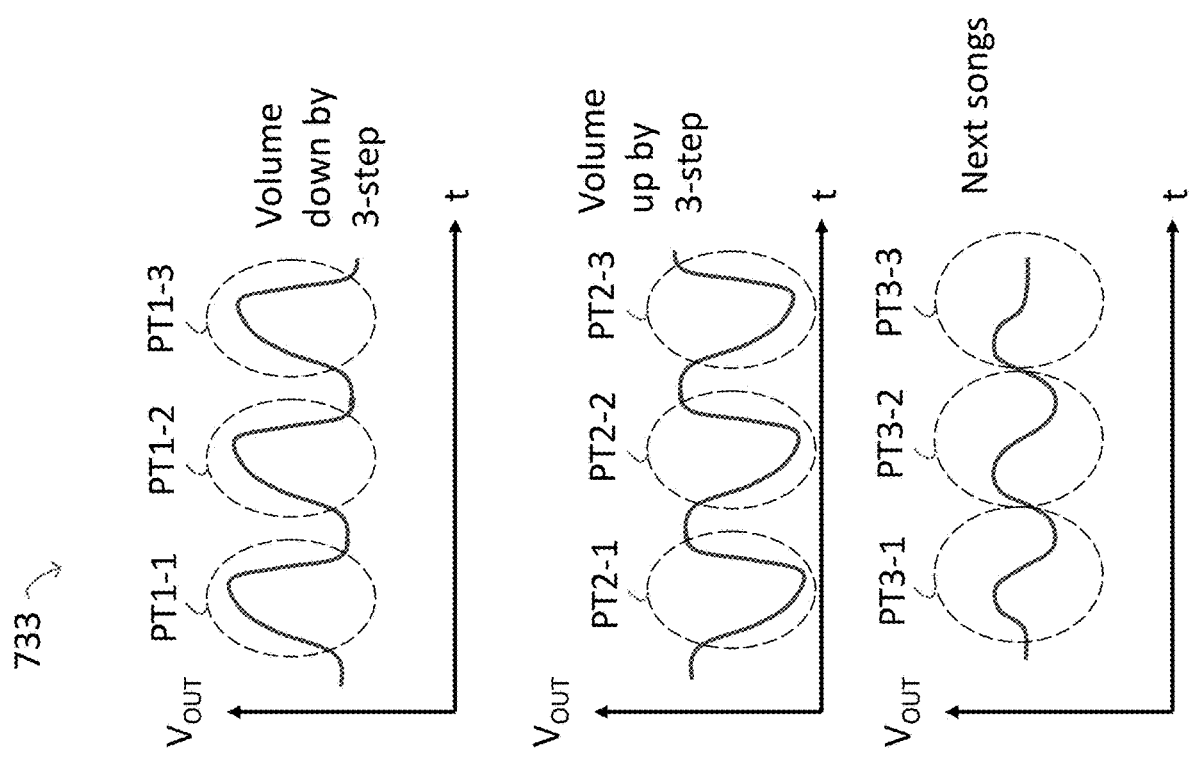
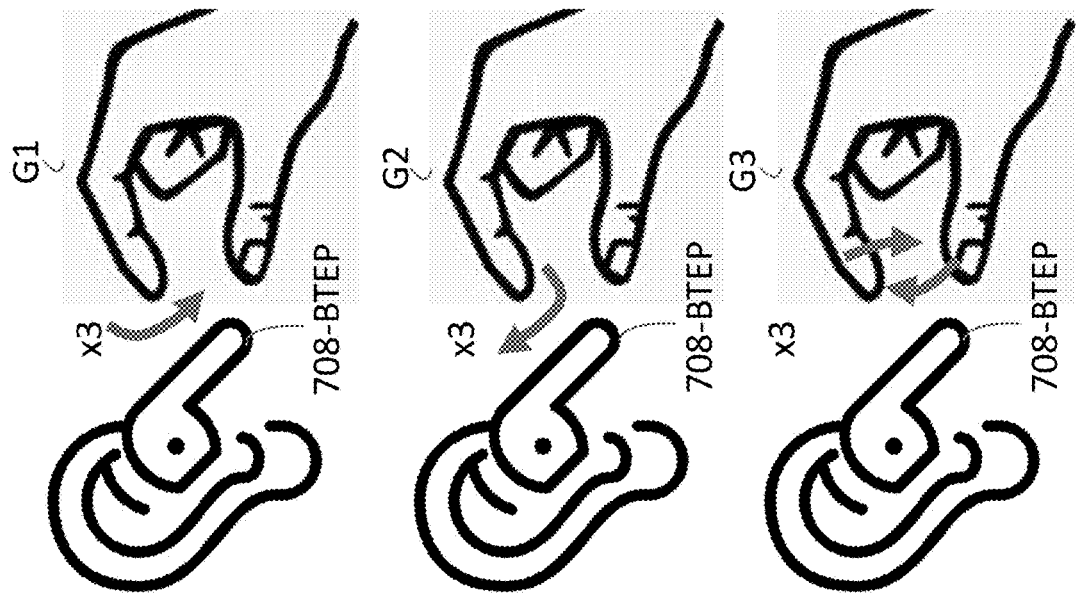
Fig. 48A
Fig. 48B
Fig. 48C

METHODS, CIRCUITS, AND APPARATUS FOR MOTION DETECTION, DOPPLER SHIFT DETECTION, AND POSITIONING BY SELF-ENVELOPE MODULATION

CROSS-REFERENCE TO RELATED APPLICATION

The present application claims the benefit of priority to U.S. Provisional Application Nos. 62/827,635, filed on Apr. 1, 2019, and 62/886,293, filed on Aug. 13, 2019, the entire contents of which are incorporated herein by reference.

TECHNICAL FIELD

The present application relates to motion detection of an object, and Doppler shift, and more particularly, to methods, circuits, and apparatus for motion detection and position determination of an object.

BACKGROUND

Detecting motion of an object, Doppler shifts caused by the motion, and a position of the object in an environment can be applied to various applications, such as smart home devices and systems, home security and surveillance, indoor and outdoor guide services, and interactive information systems. Motion sensors and proximity sensors can be used to detect the motion of the object. For example, passive infrared (PIR) sensors can be used to detect whether a human has moved in or out of a sensor's range. However, motion sensors and proximity sensors require additional installation of the sensors and may not be able to provide accurate and/or prompt motion detection of a variety of objects, such as an inanimate object, a human, or an animal. In addition, motion sensors and proximity sensors may not be applicable to a variety of environments, such as a large room, an open space office, a public space, or an outdoor environment.

Doppler shift detection circuits and positioning devices can be used to detect the Doppler shifts caused by the motion of the object and a position of the object. However, the Doppler shift detection circuits and positioning devices also require additional installation of the circuits and devices and may not be applicable to a variety of environments, such as multiple rooms, indoor and outdoor spaces, and various environments.

SUMMARY

Embodiments of the present application provide methods and apparatus for detecting motion of an object and determining a position of the object in an environment.

These embodiments include a method for detecting motion of an object in an environment. The method includes transmitting a first wireless signal related to a transmission signal and receiving a second wireless signal related to an incoming signal, wherein the second wireless signal is a reflected first wireless signal from the object; obtaining a modulation signal related to a combination of the transmission and incoming signals, wherein the modulation signal contains a Doppler shift caused by the motion of the object; extracting a signal envelope varied by the Doppler shift from the modulation signal; and determining whether motion of the object is detected in accordance with the signal envelope.

These embodiments also include a circuit for detecting motion of an object in an environment. The circuit includes a transmission chain configured to transmit a first wireless signal related to a transmission signal; a sensing circuit configured to obtain a modulation signal related to a combination of the transmission signal and an incoming signal, wherein: the modulation signal contains a Doppler shift caused by the motion of the object, and the incoming signal is obtained from a second wireless signal, the second wireless signal being a reflected first wireless signal from the object; an envelope extraction circuit configured to extract a signal envelope varied by the Doppler shift from the modulation signal; and a detector circuit configured to determine whether motion of the object is detected in accordance with the signal envelope.

These embodiments further include a method for determining a position of an object in an environment. The method includes obtaining a first modulation signal and a second modulation signal respectively related to a first signal and a second signal, wherein: the first and second modulation signals respectively contain a first Doppler shift and a second Doppler shift caused by motion of the object, and the first and second signals are respectively obtained from first and second wireless signals that are received via first and second antennae, the first and second wireless signals respectively being first and second reflected signals of a third wireless signal from the object; extracting a first signal envelope varied by the first Doppler shift from the first modulation signal, and a second signal envelope varied by the second Doppler shift from the second modulation signal; and determining a direction of the object relative to a reference position in accordance with the first and second signal envelopes.

It is to be understood that the foregoing general description and the following detailed description are exemplary and explanatory only, and are not restrictive of the invention, as claimed.

BRIEF DESCRIPTION OF THE DRAWINGS

FIGS. 35A, 35B, and 35C illustrate exemplary antenna port configurations for detecting motion of an object by SEM on two antenna ports, according to some embodiments of the present disclosure.

FIGS. 47A, 47B, and 47C illustrate exemplary gestures and exemplary SEM signals, according to some embodiments of the present disclosure.

FIGS. 48A, 48B, and 48C illustrate exemplary gestures and exemplary SEM signals, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
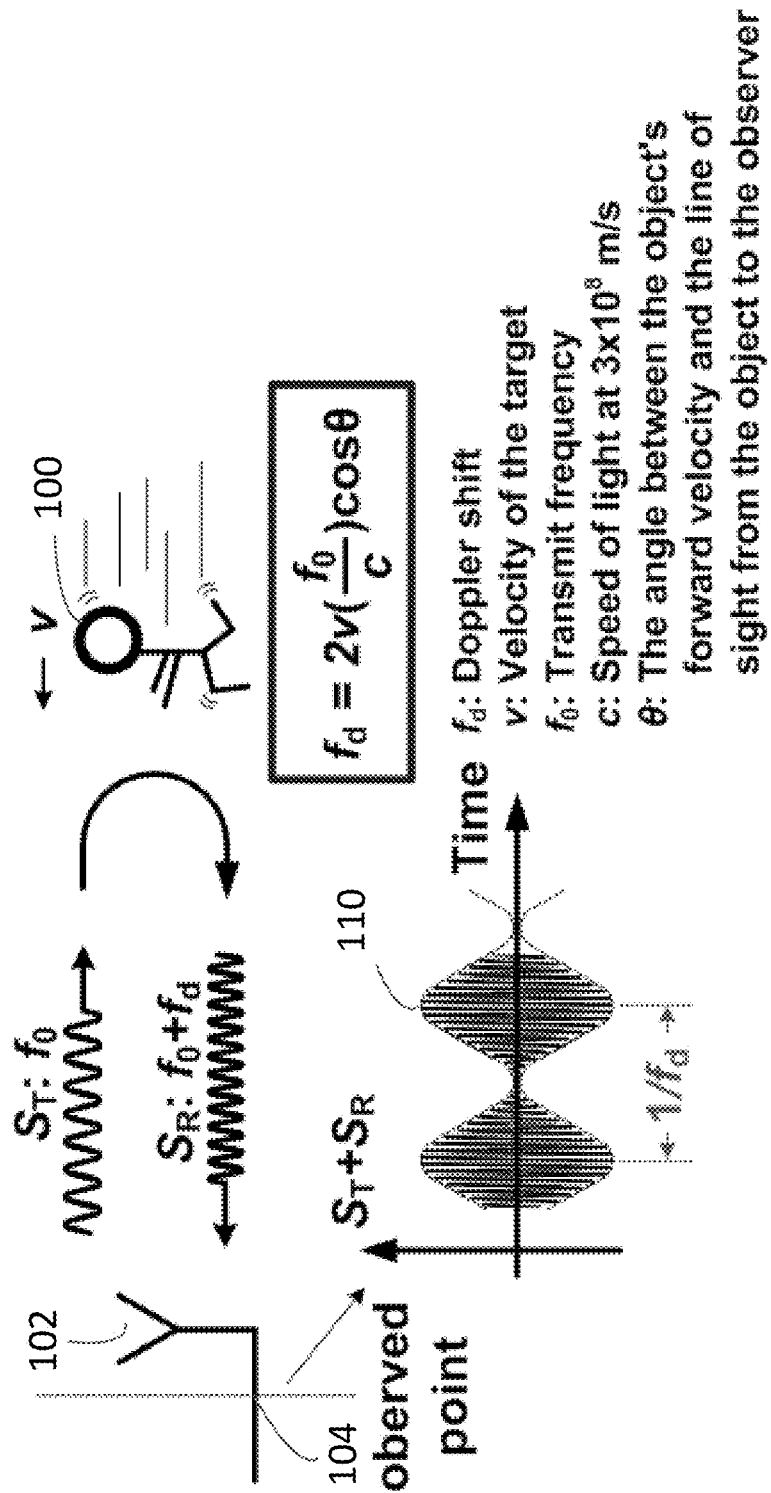
FIG. 1 illustrates an exemplary self-envelope modulation (SEM) signal for detecting motion of an object, according to some embodiments of the present disclosure.

FIG. 1 illustrates an exemplary self-envelope modulation (SEM) signal 110 for detecting motion of an object, such as a person 100, according to some embodiments of the present disclosure. As shown in FIG. 1, an antenna 102 transmits an $S_T$ signal at frequency $f_0$ toward person 100. When person 100 is moving, the transmitted $S_T$ signal is reflected from person 100 as an $S_R$ signal with a frequency $f_0+f_d$, where $f_d$ is a Doppler shift, $f_d=2v(f_0/c)\cos\theta$, v is a velocity of person 100, c is the speed of light, θ is an angle between person 100's forward velocity and the line of sight from person 100 to antenna 102. The frequency $f_0$ of the $S_T$ signal can be any suitable frequency.

A circuit is configured to receive the reflected $S_R$ signal through antenna 102 and add the transmitted $S_T$ signal and the reflected $S_R$ signal as SEM signal 110 at, for example, an observed point 104. The transmitted $S_T$ signal and the reflected $S_R$ signal can be observed and processed simultaneously.

As shown in FIG. 1, an envelope of SEM signal 110 varies due to presence of the Doppler shift $f_d$. A variation of the envelope of SEM signal 110 is caused and changed based on the Doppler shift $f_d$. In other words, the Doppler shift due to the motion of person 100 can be modulated onto the envelope of SEM signal 100 at observed point 104. A circuit or apparatus for detecting motion of person 100 can be configured to extract the signal envelope of SEM signal 110 and determine whether the motion of person 100 is detected in accordance with the variation of the extracted signal envelope.

Figure 2:
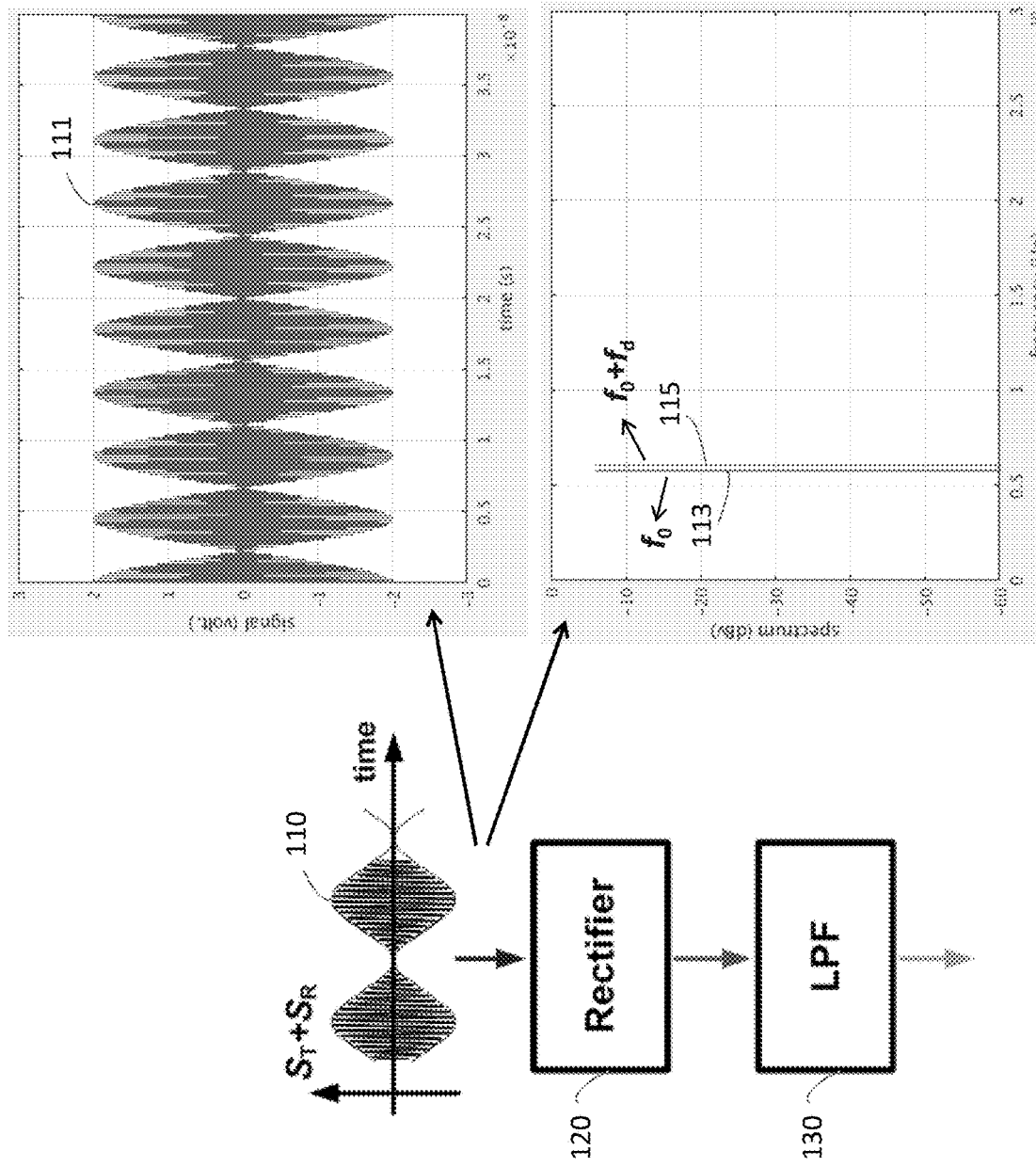
FIG. 2 illustrates an exemplary method for extracting a signal envelope of an SEM signal for detecting motion of an object, according to some embodiments of the present disclosure.

FIG. 2 illustrates an exemplary method for extracting the signal envelope of SEM 110 signal for detecting motion of person 100, according to some embodiments of the present disclosure. As shown at the left-hand side of FIG. 2, a circuit or apparatus for extracting the signal envelope of SEM signal 110 includes a rectifier 120 and a low pass filter (LPF) 130. Rectifier 120 can be a rectifier circuit or a processor configured to execute instructions stored in memory to rectify SEM signal 110. LPF 130 can be an LPF circuit or the processor configured to execute the instructions stored in the memory to filter rectified SEM signal 110 for low frequency. The circuit or apparatus for extracting the signal envelope of SEM signal 100 is configured to rectify SEM signal 110 by rectifier 120 and filter the rectified SEM signal 110 by LPF 130 to obtain the signal envelope.

As shown at the right upper quadrant of FIG. 2, an SEM signal 111, before rectification, includes a varied signal envelope. As shown at the right lower quadrant of FIG. 2, SEM signal 111 in the frequency domain includes the $S_T$ signal with the frequency $f_0$, i.e., a frequency tone 113 in the frequency domain, and the $S_R$ signal with the frequency $f_0+f_d$, i.e., a frequency tone 115 in the frequency domain.

Figure 3:
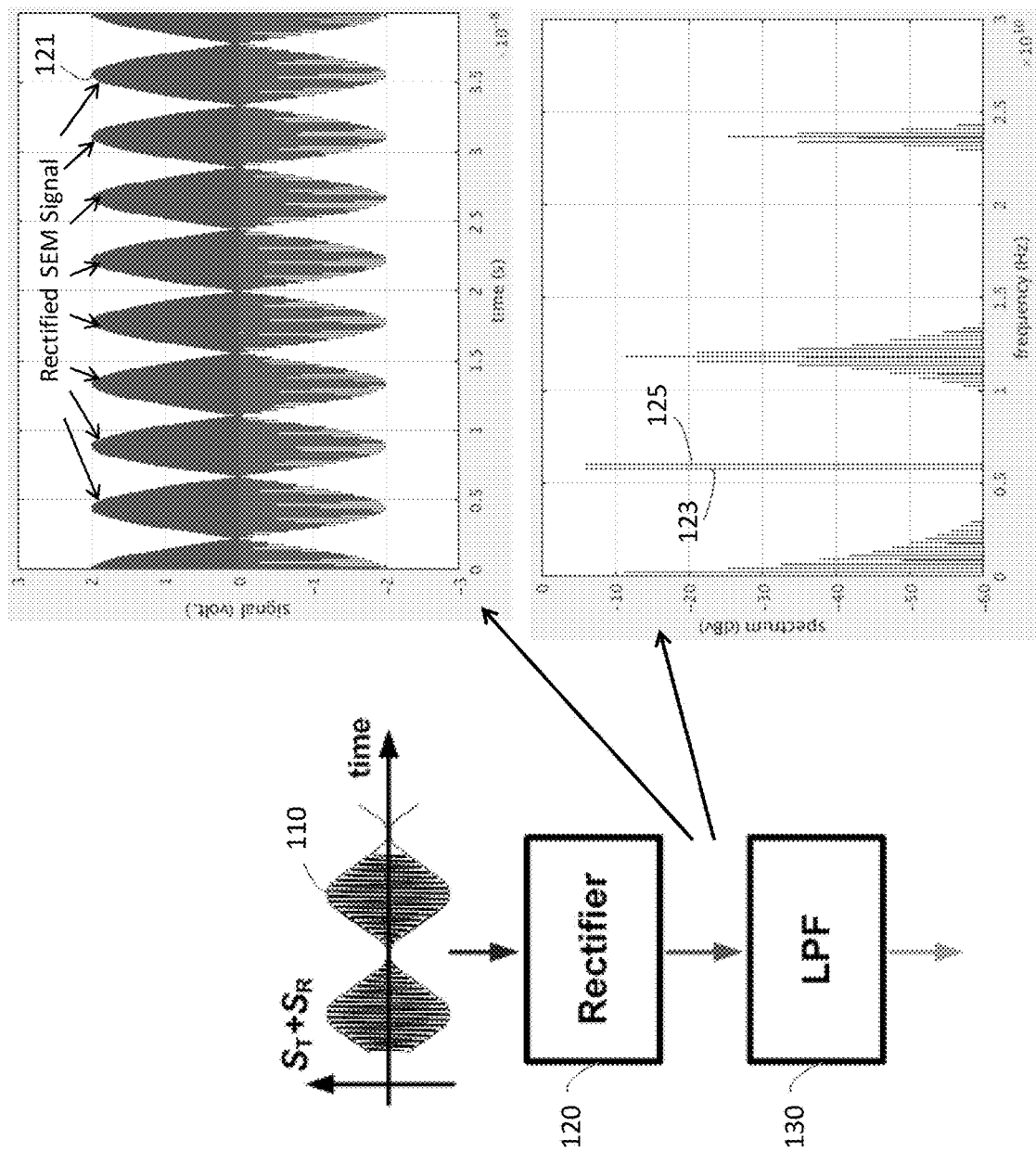
FIG. 3 illustrates an exemplary method for extracting a signal envelope of an SEM signal for detecting motion of an object, according to some embodiments of the present disclosure.

FIG. 3 illustrates an exemplary method for extracting the signal envelope of SEM signal 110 for detecting motion of person 100, according to some embodiments of the present disclosure. As shown at the left-hand side of FIG. 3, a circuit or apparatus for extracting the signal envelope of SEM signal 110 includes rectifier 120 and LPF 130, as described in FIG. 2. As shown at the right upper quadrant of FIG. 3, rectifier 120 is configured to rectify SEM signal 110 as a rectified SEM signal 121, which includes those waves above voltage=0. As shown at the right lower quadrant of FIG. 3, rectified SEM signal 121 in the frequency domain includes rectified signals at baseband and other frequency tones, where frequency tones 123 and 125 are $f_0$ and $f_0+f_d$ shown in FIG. 3 corresponding to frequency tones 113 and 115 in FIG. 2.

Figure 4:
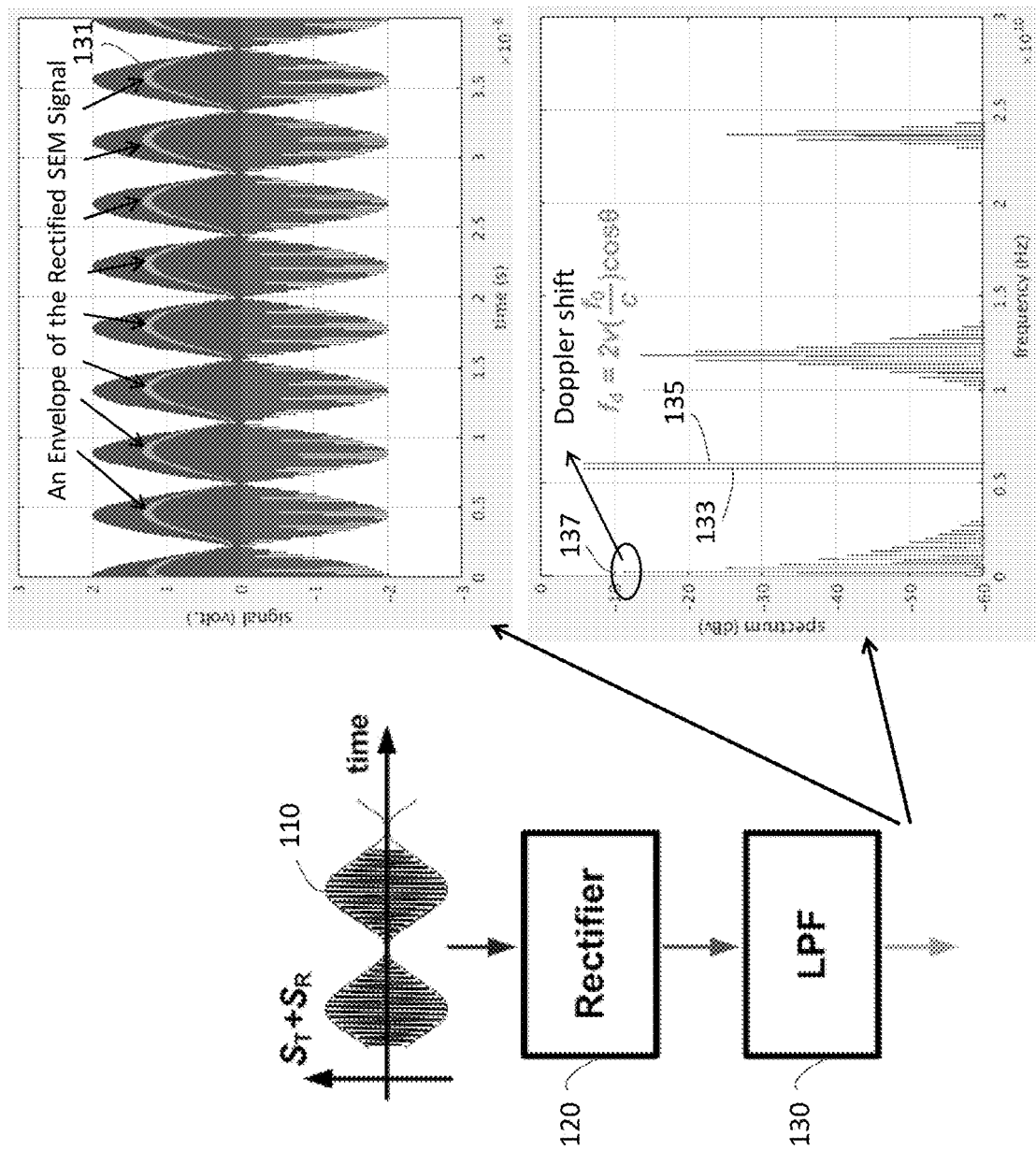
FIG. 4 illustrates an exemplary method for extracting a signal envelope of an SEM signal for detecting motion of an object, according to some embodiments of the present disclosure.

FIG. 4 illustrates an exemplary method for extracting the signal envelope of SEM signal 110 for detecting motion of person 100, according to some embodiments of the present disclosure. As shown at the left-hand side of FIG. 4, a circuit or apparatus for extracting the signal envelope of SEM signal 110 includes rectifier 120 and LPF 130, as described in FIGS. 2 and 3. As shown at the right upper quadrant of FIG. 4, LPF 130 is configured to filter rectified SEM signal 121 to extract a signal envelope 131 of SEM signal 110. As shown at the right lower quadrant of FIG. 4, extracted signal envelope 131 includes a Doppler shift 137 at baseband, i.e., $f_d=2v(f_0/c)\cos\theta$. LPF 130 is configured to suppress the other frequency tones.

FIGS. 5A, 5B, 5C, and 5D, are circuit and block diagrams of exemplary circuits for extracting signal envelope 131 of SEM signal 110 for detecting motion of person 100, according to some embodiments of the present disclosure. These circuits can be configured to extract signal envelope 131 as illustrated in FIGS. 2-4.

Figure 5B:
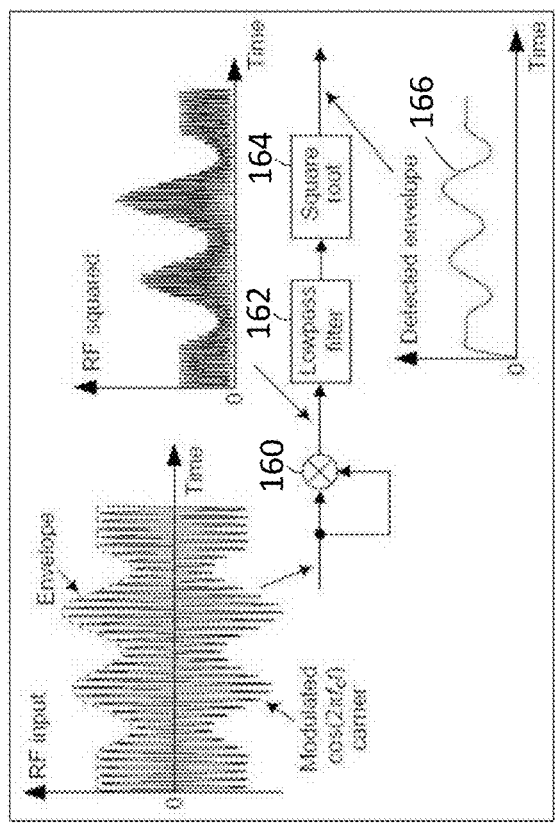
FIGS. 5A, 5B, 5C, and 5D, are circuit and block diagrams of exemplary circuits for extracting a signal envelope of an SEM signal for detecting motion of an object, according to some embodiments of the present disclosure.
Figure 5D:
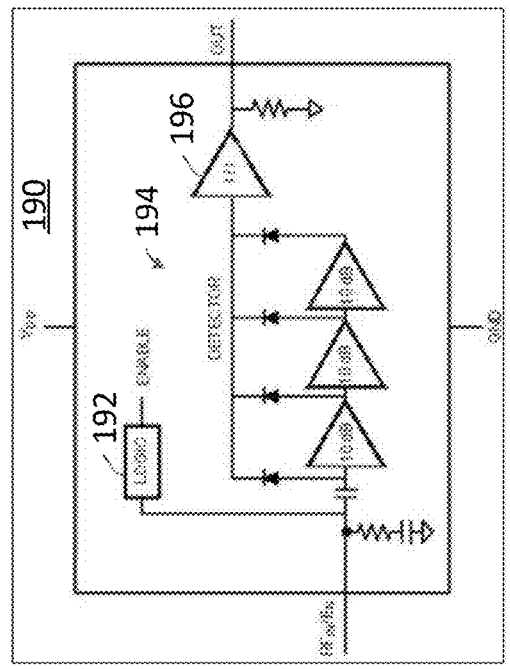
Figure 5A:
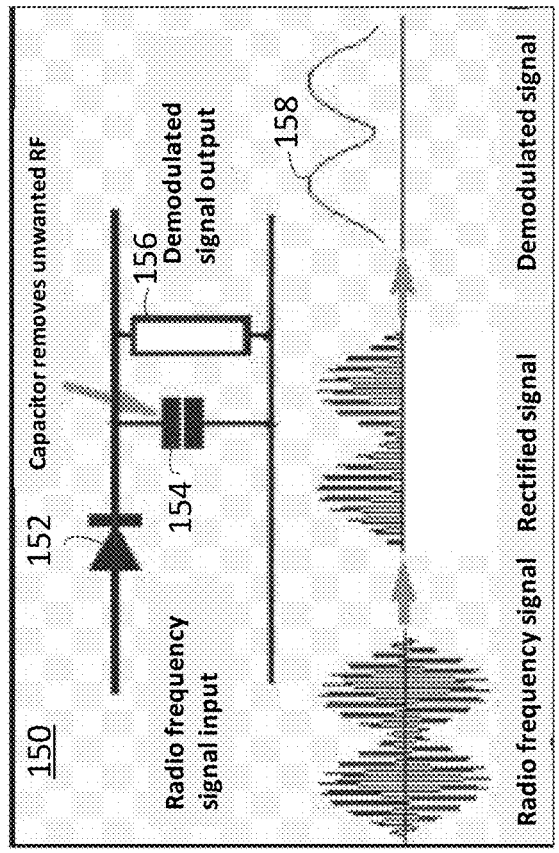

FIG. 5A illustrates a circuit 150 for extracting an envelope of an SEM signal. Circuit 150 includes a diode 152, a capacitor 154, and a load 156 connected as shown. SEM signal 110 ("radio frequency signal input") can be input to diode 152. Capacitor 154 is configured to remove unwanted radio frequency of SEM signal 110. Circuit 150 is configured to output a demodulated signal as an envelope 158 of SEM signal 110.

FIG. 5B illustrates a circuit for extracting an envelope of an SEM signal. The circuit includes a multiplier 160, a low-pass filter 162, and a square root filter 164 connected to each other as shown. SEM signal 110 can be input to multiplier 160 to generate a squared SEM signal. The low-pass filter is configured to filter the squared SEM signal for baseband. The square root filter is configured to filter the baseband squared SEM signal to detect an envelope 166 of SEM signal 110.

Figure 5C:
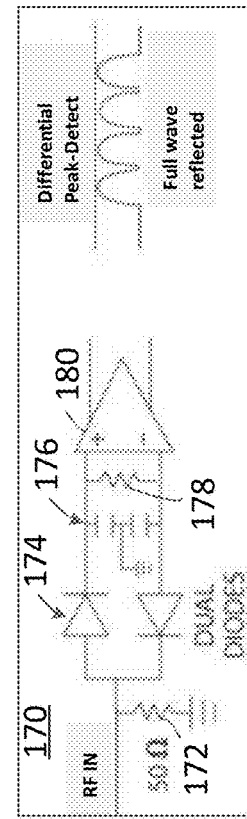

FIG. 5C illustrates a circuit 170 for extracting an envelope of an SEM signal. Circuit 170 includes a first resistor 172 of 50Ω, dual diodes 174, two capacitors 176, a second resistor 178, and an amplifier 180 connected as shown. SEM signal 110 can be input from "RF IN" to diodes 174. Dual diodes 174, capacitors 176, second resistor 178, and amplifier 180 are configured to rectify SEM signal 110. Circuit 170 is configured to output rectified signal wave as an envelope of SEM signal 110.

FIG. 5D illustrates a circuit 190 for extracting an envelope of an SEM signal. Circuit 190 includes an enable logic circuit 192, a detector 194, and an absolute value circuit 196 connected to each other as shown. SEM signal 110 can be input to detector 194 to extract a detected envelope signal of SEM signal 110. Absolute value circuit 196 is configured to rectify and obtain an envelope of SEM signal 110.

Figure 6A:
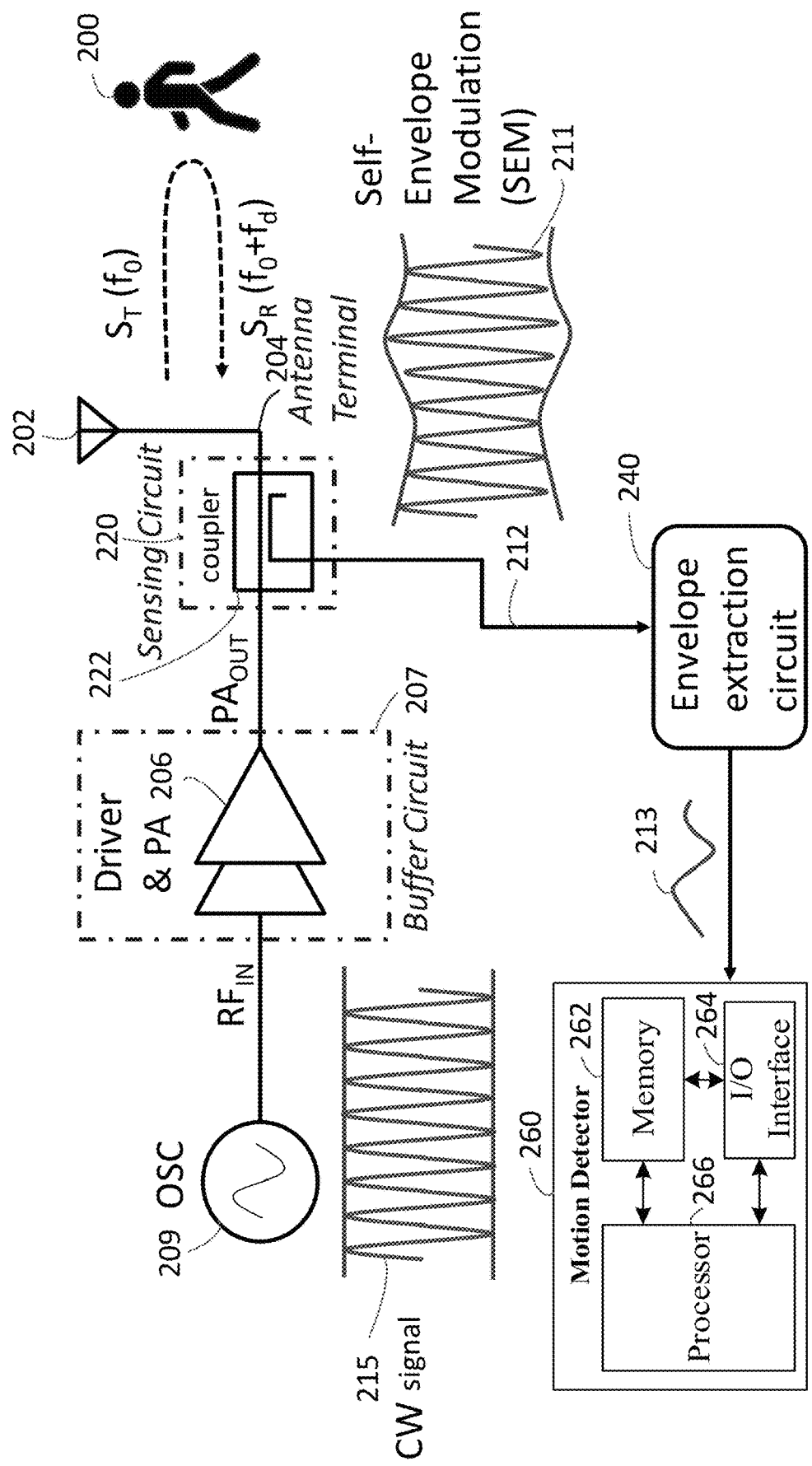
FIGS. 6A and 6B illustrate an exemplary circuit for detecting motion of an object by SEM using a coupler, according to some embodiments of the present disclosure.

FIG. 6A illustrates an exemplary circuit for detecting motion of a person 200 by SEM using a coupler, according to some embodiments of the present disclosure. As shown in FIG. 6A, the circuit includes an oscillator 209, a buffer circuit 207, a sensing circuit 220, an antenna terminal 204, an antenna 202, an envelope extraction circuit 240, and a motion detector 260. Buffer circuit 207 includes a driver and power amplifier (PA) 206. Alternatively, buffer circuit 207 may include a driver or a PA. Buffer circuit 207 is configured to receive a radio frequency (RF) signal, drive the RF signal and output the driven RF signal as a transmission signal $PA_{OUT}$. Sensing circuit 220 includes a coupler 222. Motion detector 260 includes a memory 262, a I/O interface 264, and a processor 266. One or more of these elements in FIG. 6A may be included for detecting motion of person 200. These elements may be configured to transfer data and send or receive instructions between or among each other.

Processor 266 includes any appropriate type of general-purpose or special-purpose microprocessor, digital signal processor, or microcontroller. Processor 266 can be representative of one or more processors in motion detector 260.

Memory 262 may include any appropriate type of mass storage provided to store any type of information that processor 266 may need to operate. Memory 262 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 262 may be configured to store one or more programs for execution by processor 266 for detecting motion of person 200, as disclosed herein.

Memory 262 may be further configured to store information and data used by processor 266. For instance, memory 266 may be configured to store thresholds for detecting variation of an envelope of an SEM signal.

I/O interface 264 may be configured to facilitate communication between motion detector 260 and other apparatuses. For example, I/O interface 264 is configured to receive a signal envelope from envelope extraction circuit 240. As another example, I/O interface 264 can be configured to receive a control signal from a transmitter. I/O interface 264 may also output data of motion detection results to other apparatuses.

Oscillator 209, buffer circuit 207, sensing circuit 220, antenna terminal 204, and antenna 202 are coupled in sequence to form a transmission chain to transmit wireless signal $S_T(f_0)$ toward person 200. When person 200 is moving, the transmitted wireless signal $S_T(f_0)$ is reflected by person 200 as a reflected wireless signal $S_R(f_0+f_d)$. The reflected wireless signal $S_R(f_0+f_d)$ can be received by antenna 202 and enter the transmission chain as an incoming signal.

Sensing circuit 220, envelope extraction circuit 240, and motion detector 260 are coupled in sequence to form a circuit for detecting motion of person 200 by SEM. Coupler 222 of sensing circuit 220 is configured to couple the transmission signal $PA_{OUT}$, output by driver and power amplifier 206, to the incoming signal to form an SEM signal 211 and send SEM signal 211 through a connection 212 to envelope extraction circuit 240. Envelope extraction circuit 240 is configured to extract a signal envelope 213 of SEM signal 211 and send signal envelope 213 to motion detector 260. Processor 266 of motion detector 260 is configured to determine whether motion of person 200 is detected in accordance with signal envelope 213.

For example, as shown in FIG. 6A, oscillator 209 is configured to generate the RF signal, such as a continuous wave (CW) signal 215 and send CW signal 215 to a radio frequency input ("$RF_{IN}$") as input to driver and power amplifier 206. Driver and power amplifier 206 is configured to amplify CW signal 215 and output PA output ("$PA_{OUT}$") to coupler 222. Coupler 222 is configured to send the amplified CW signal to antenna terminal 204. Antenna terminal 204 is connected to antenna 202 for transmitting the amplified CW signal as the wireless signal $S_T$. Antenna 202 is configured to transmit the wireless signal $S_T$ at frequency $f_0$ toward person 200.

When person 200 is moving with a velocity v, the wireless signal $S_T$ is reflected as the wireless signal $S_R$ with a frequency $f_0+f_d$, where $f_d$ is Doppler shift, $f_d=2v(f_0/c)\cos\theta$, as described with reference to FIG. 1. Antenna 202 is also configured to receive the reflected wireless signal $S_R$ and send the received signal $S_R$ to the coupler as an incoming signal.

Since driver and power amplifier 206 is configured to continue to send amplified CW signal 215 to antenna 202 for transmitting the wireless signal $S_T$, the incoming signal, based on the reflected signal $S_R$, is modulated with a transmission signal, for transmitting the wireless signal $S_T$, to be self-envelope modulation (SEM) signal 211 at coupler 222. The Doppler shift $f_d$ is modulated onto an envelope of SEM signal 211, as described and illustrated above with reference to FIGS. 1-4.

Envelope extraction circuit 240 can include rectifier 120 and LPF 130, as illustrated in FIGS. 2-4, or one of envelope extraction circuits illustrated in FIGS. 5A, 5B, 5C, and 5D. Envelope extraction circuit 240 is configured to extract signal envelope 213 of SEM signal 211 from sensing circuit 220.

As shown in FIG. 6A, signal envelope 213 varies due to the Doppler shift $f_d$ caused by the movement of person 200. For example, when person 200 is not moving, then velocity v=0. Then, $f_d=2v(f_0/c)\cos\theta=0$. There is no Doppler shift, and therefore signal envelope 213 of SEM signal 211 is constant.

As another example, person 200 is walking toward the antenna (i.e., θ=0 degree) at a velocity, v=3 km/hour=0.83 meter/second. When $f_0$=2.4 GHz, $f_d=2v(f_0/c)\cos\theta=2\times0.83\times8\times1=13.28$ Hz. The Doppler shift $f_d=13.28$ Hz causes signal envelope 213 of SEM signal 211 to vary.

Alternatively, person 200 is walking around the antenna, where θ=60 degrees, at a velocity, v=3 km/hour=0.83 meter/second. When $f_0$=2.4 GHz, $f_d=2v(f_0/c)\cos\theta=2\times0.83\times8\times0.5=6.64$ Hz. The Doppler shift $f_d=6.64$ Hz also causes signal envelope 213 of SEM signal 211 to vary.

Processor 266 of motion detector 260 is configured to execute instructions stored in memory 262 to determine that no motion is detected when the Doppler shift $f_d=0$ is on signal envelope 213. Alternatively, processor 266 is configured to execute instructions stored in memory 262 to determine motion of person 200 is detected when the Doppler shift $f_d$ is 13.82 or 6.64 Hz is modulated on signal envelope 213.

Figure 6B:
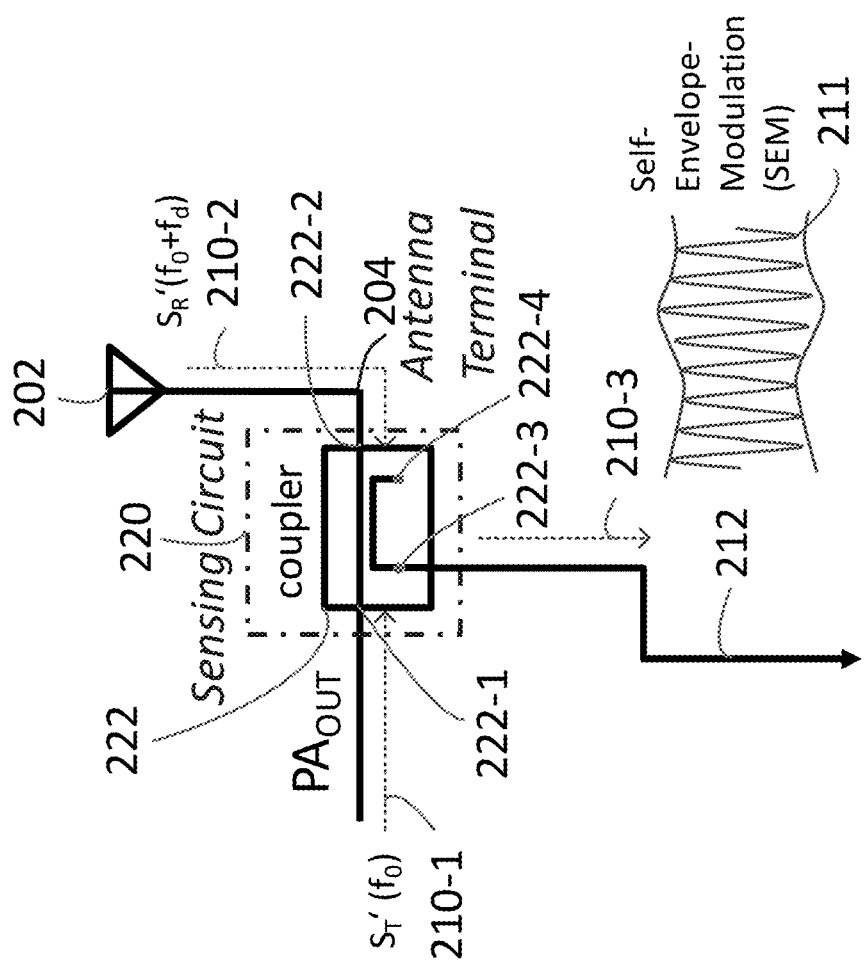

FIG. 6B illustrates exemplary sensing circuit 220 for detecting motion of person 200 by SEM using coupler 222, according to some embodiments of the present disclosure. Sensing circuit 220 in FIG. 6B is part of the circuit of FIG. 6A. As shown in FIG. 6B, coupler 222 of sensing circuit 220 includes an input port 222-1, a transmitted port 222-2, an isolated port 222-3, and a coupled port 222-4.

A transmission signal $S_T(f_0)$ 210-1 from $PA_{OUT}$ is input to coupler 222 at input port 222-1 and sent through transmitted port 222-2 to antenna terminal 204 and antenna 202 for transmitting the wireless signal $S_T(f_0)$. Antenna 202 receives the reflected wireless signal $S_R(f_0+f_d)$ as an incoming signal $S_R(f_0+f_d)$ 210-2. Incoming signal $S_R(f_0+f_d)$ 210-2 enters coupler 222 at transmitted port 222-2. Coupler 222 is configured to couple transmission signal $S_T(f_0)$ 210-1 at input port 222-1 to incoming signal $S_R(f_0+f_d)$ 210-2 at transmitted port 222-2 as a sensed signal 210-3 at isolated port 222-3 and send sensed signal 210-3, i.e., SEM signal 211, through connection 212 to envelope extraction circuit 240. Sensed signal 210-3 is a combination of transmission signal $S_T(f_0)$ 210-1 and incoming signal $S_R(f_0+f_d)$ 210-2 with certain power degradation.

Alternatively, sensed signal 210-3 can also be obtained from coupled port 222-4 of coupler 222. In other words, coupler 222 can be configured to send sensed signal 210-3 through coupled port 222-4 to connection 212 for envelope extraction circuit 240. In some embodiments, sensing circuit 220 may include a capacitor with two terminals. One terminal of the capacitor is coupled to $PA_{OUT}$ in FIG. 6A to obtain the above-described sensed signal. The other terminal is coupled to envelope extraction circuit 240 to provide the sensed signal.

Figure 7A:
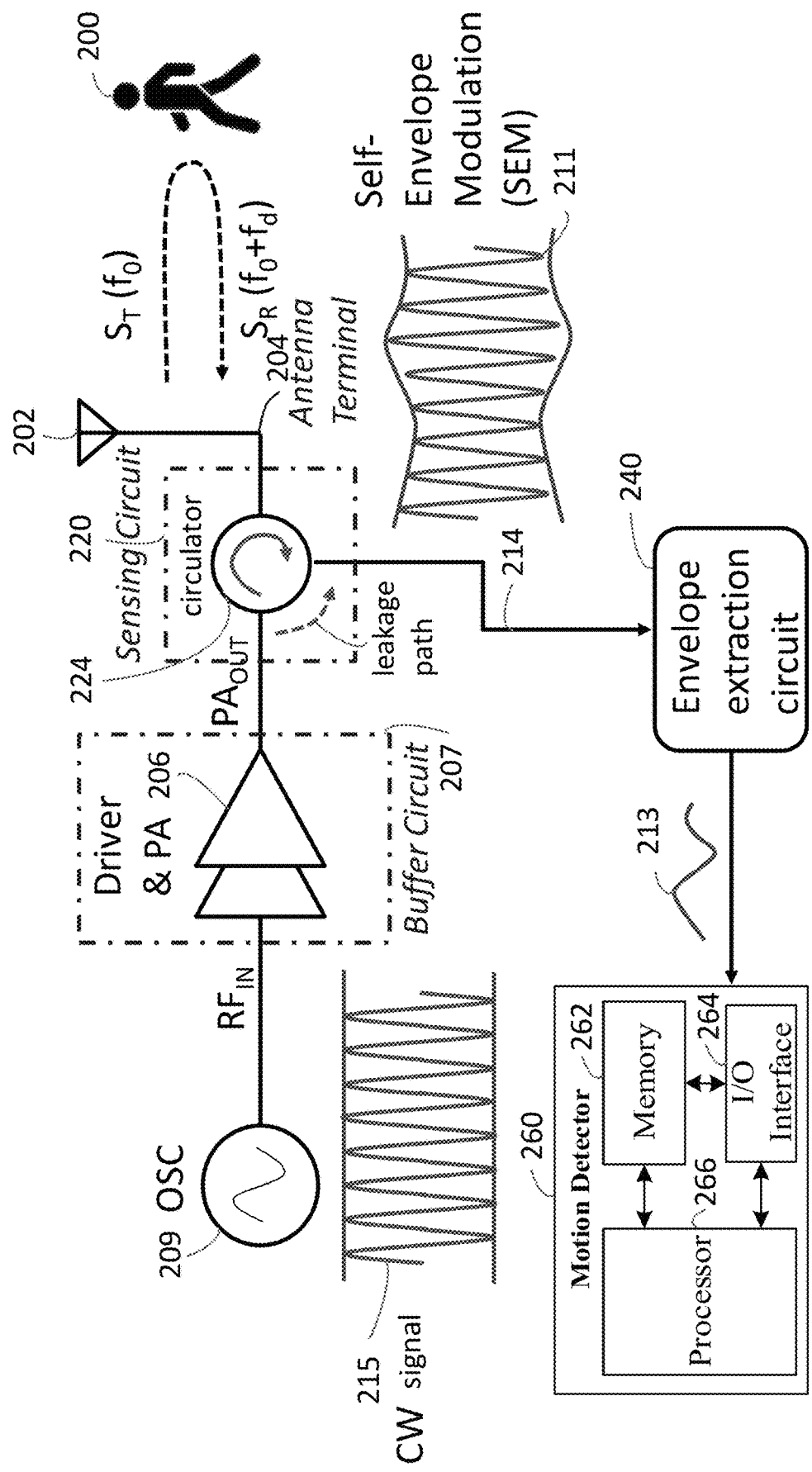
FIGS. 7A and 7B illustrate an exemplary circuit for detecting motion of an object by SEM using a circulator, according to some embodiments of the present disclosure.

FIG. 7A illustrates an exemplary circuit for detecting motion of person 200 by SEM using a circulator 224, according to some embodiments of the present disclosure. As shown in FIG. 7A, the circuit includes oscillator 209, buffer circuit 207, sensing circuit 220, antenna terminal 204, antenna 202, envelope extraction circuit 240, and motion detector 260. Sensing circuit 220 includes a circulator 224. One or more of the elements in FIG. 7A may be included for detecting motion of person 200. These elements may be configured to transfer data and send or receive instructions between or among each other. These elements are configured to operate as illustrated and described in FIG. 6A, except that circulator 224 is configured to operate as sensing circuit 220.

Circulator 224 of sensing circuit 220 is configured to combine a transmission signal from $PA_{OUT}$ with an incoming signal to form an SEM signal 211 and send SEM signal 211 through a connection 214 to envelope extraction circuit 240.

Figure 7B:
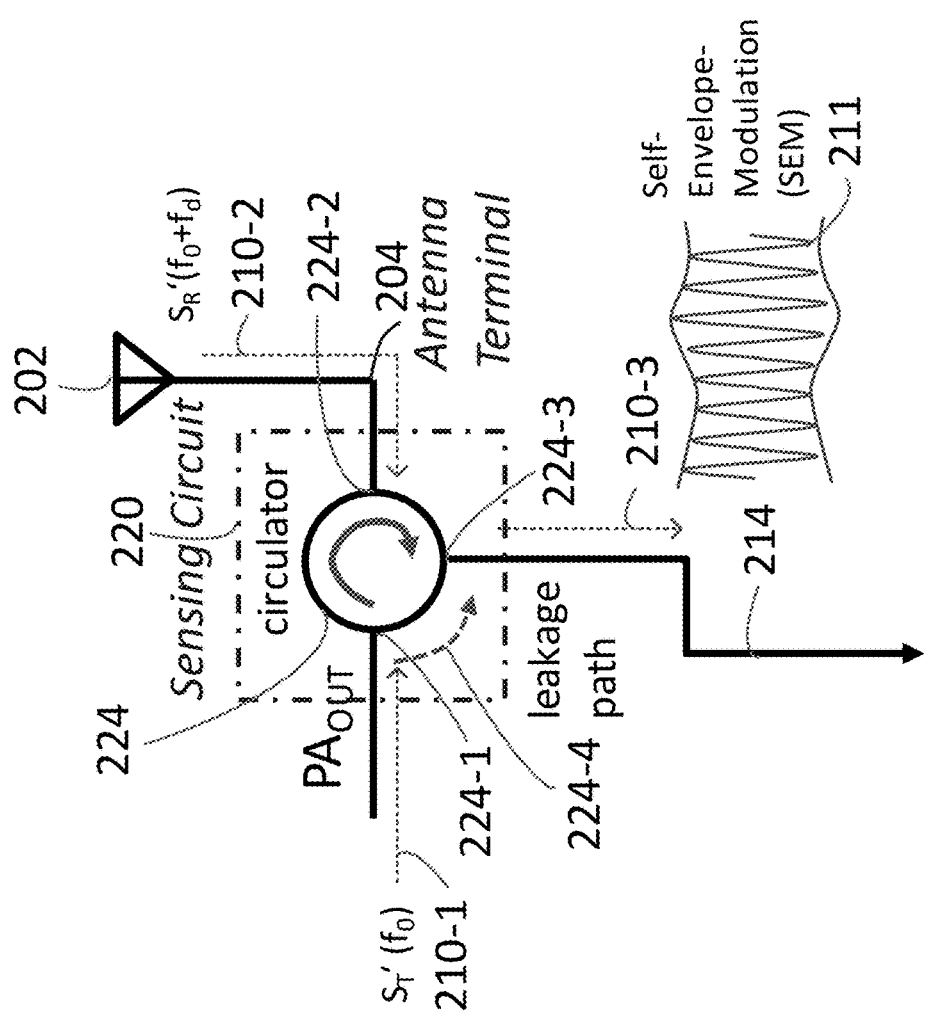

FIG. 7B illustrates exemplary sensing circuit 220 for detecting motion of person 200 by SEM using circulator 224, according to some embodiments of the present disclosure. Sensing circuit 220 in FIG. 7B is part of the circuit of FIG. 7A. As shown in FIG. 7B, circulator 224 of sensing circuit 220 includes a first port 224-1, a second port 224-2, a third port 224-3, and a leakage path 224-4 from first port 224-1 to third port 224-3.

Transmission signal $S_T(f_0)$ 210-1 from $PA_{OUT}$ is input to circulator 224 from first port 224-1 and sent through second port 224-2 to antenna terminal 204 and antenna 202 for transmitting the wireless signal $S_T(f_0)$. Antenna 202 receives the reflected wireless signal $S_R(f_0+f_d)$ as incoming signal $S_R(f_0+f_d)$ 210-2. Incoming signal $S_R(f_0+f_d)$ 210-2 enters circulator 224 from second port 224-2. Circulator 224 is configured to circulate incoming signal $S_R(f_0+f_d)$ 210-2 from second port 224-2 to third port 224-3. Moreover, transmission signal $S_T(f_0)$ 210-1 at first port 224-1 is leaked to third port 224-3 through leakage path 224-4 with a certain power degradation. For example, leakage path 224-4 may have 18, 20, 22, or 23 dB loss. Thus, circulator 224 is configured to combine degraded transmission signal $S_T(f_0)$ 210-1 at first port 224-1 with incoming signal $S_R(f_0+f_d)$ 210-2 at second port 222-2 as a sensed signal 210-3 at third port 224-3 and send sensed signal 210-3, i.e., SEM signal 211, through connection 214 to envelope extraction circuit 240. Sensed signal 210-3 is a combination of transmission signal $S_T(f_0)$ 210-1 with certain power degradation and incoming signal $S_R(f_0+f_d)$ 210-2.

Figure 8A:
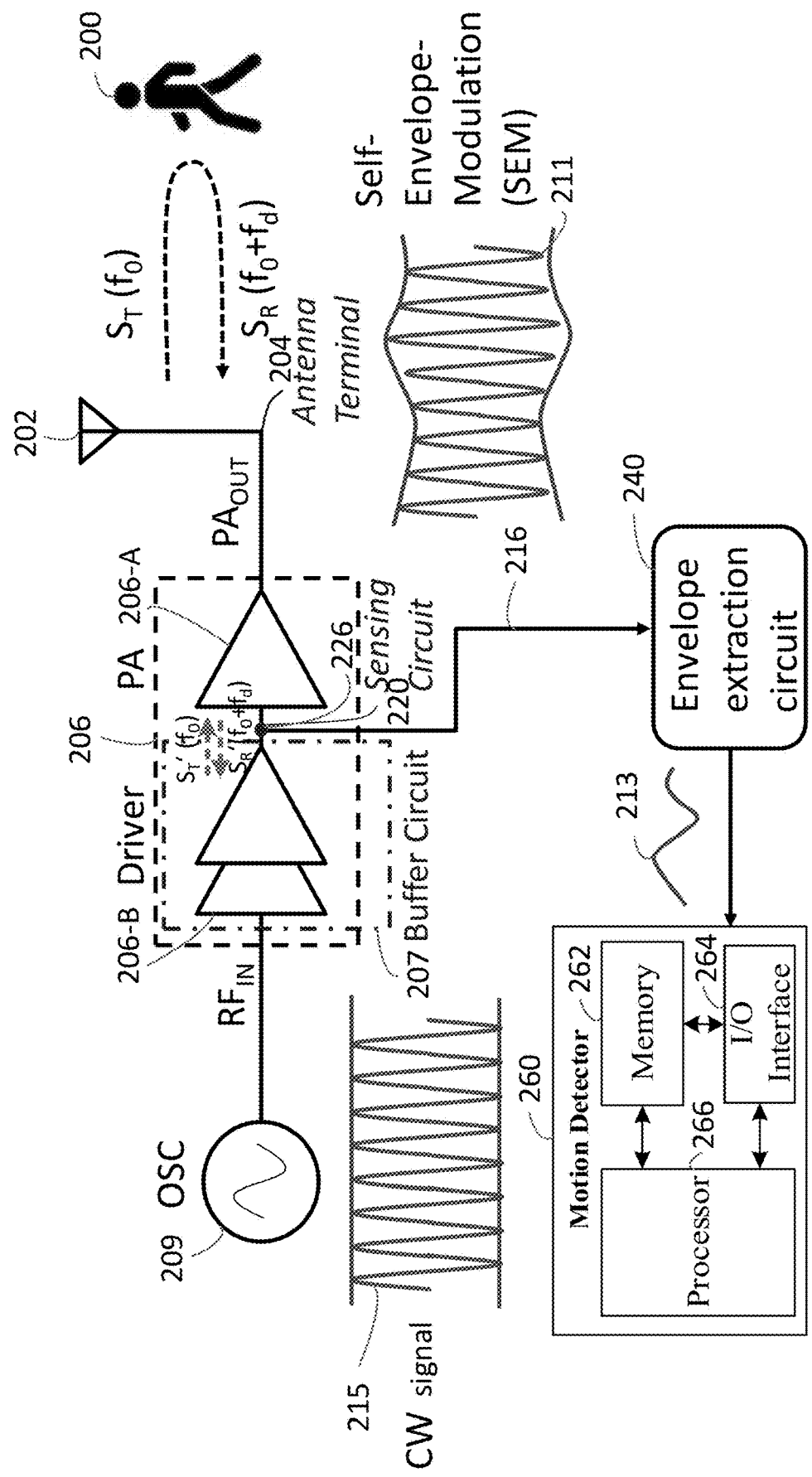
FIGS. 8A and 8B illustrate an exemplary circuit for detecting motion of an object by SEM via a connection node, according to some embodiments of the present disclosure.

FIG. 8A illustrates an exemplary circuit for detecting motion of person 200 by SEM via a connection node 226, according to some embodiments of the present disclosure. As shown in FIG. 8A, the circuit includes oscillator 209, buffer circuit 207, power amplifier (PA) 206-A, sensing circuit 220, antenna terminal 204, antenna 202, envelope extraction circuit 240, and motion detector 260. Buffer circuit 207 includes a driver 206-B. Sensing circuit 220 includes a connection node 226 between driver 206-B and PA 206-A. One or more of the elements in FIG. 8A may be included for detecting motion of person 200. These elements may be configured to transfer data and send or receive instructions between or among each other. These elements are configured to operate as illustrated and described in FIG. 6A, except that connection node 226 is configured to operate as sensing circuit 220.

Connection node 226 of sensing circuit 220 is configured to combine a transmission signal from an output of driver 206-B with an incoming signal to form SEM signal 211 and send SEM signal 211 through a connection 216 to envelope extraction circuit 240.

Figure 8B:
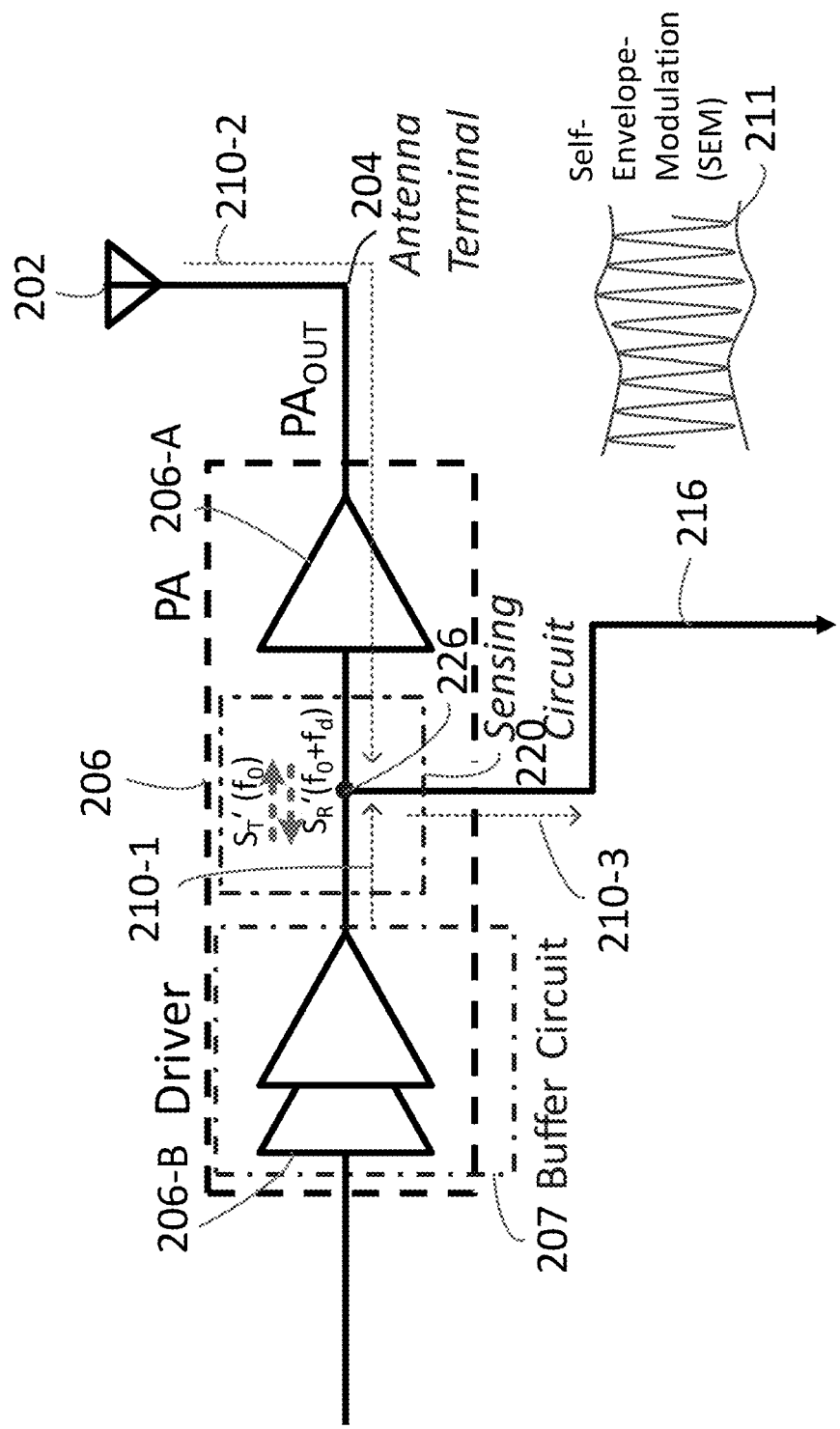

FIG. 8B illustrate exemplary sensing circuit 220 for detecting motion of person 200 by SEM via connection node 226, according to some embodiments of the present disclosure. Sensing circuit 220 in FIG. 8B is part of the circuit of FIG. 8A. As shown in FIG. 8B, connection node 226 of sensing circuit 220 includes a first terminal connected to driver 206-B, a second terminal connected to PA 206-A, and a third terminal to connection 216.

Transmission signal $S_T(f_0)$ 210-1 from driver 206-B is input to connection node 226 and sent through PA 206-A to antenna terminal 204 and antenna 202 for transmitting the wireless signal $S_T(f_0)$. Antenna 202 receives the reflected wireless signal $S_R(f_0+f_d)$ as incoming signal $S_R(f_0+f_d)$ 210-2. Incoming signal $S_R(f_0+f_d)$ 210-2 enters connection node 226 from its second terminal. Connection node 226 is configured to combine transmission signal $S_T(f_0)$ 210-1 at its first terminal with incoming signal $S_R(f_0+f_d)$ 210-2 at its second terminal as a sensed signal 210-3 at the third terminal and send sensed signal 210-3, i.e., SEM signal 211, through connection 216 to envelope extraction circuit 240. Sensed signal 210-3 is a combination of transmission signal $S_T(f_0)$ 210-1 and incoming signal $S_R(f_0+f_d)$ 210-2.

Figure 9:
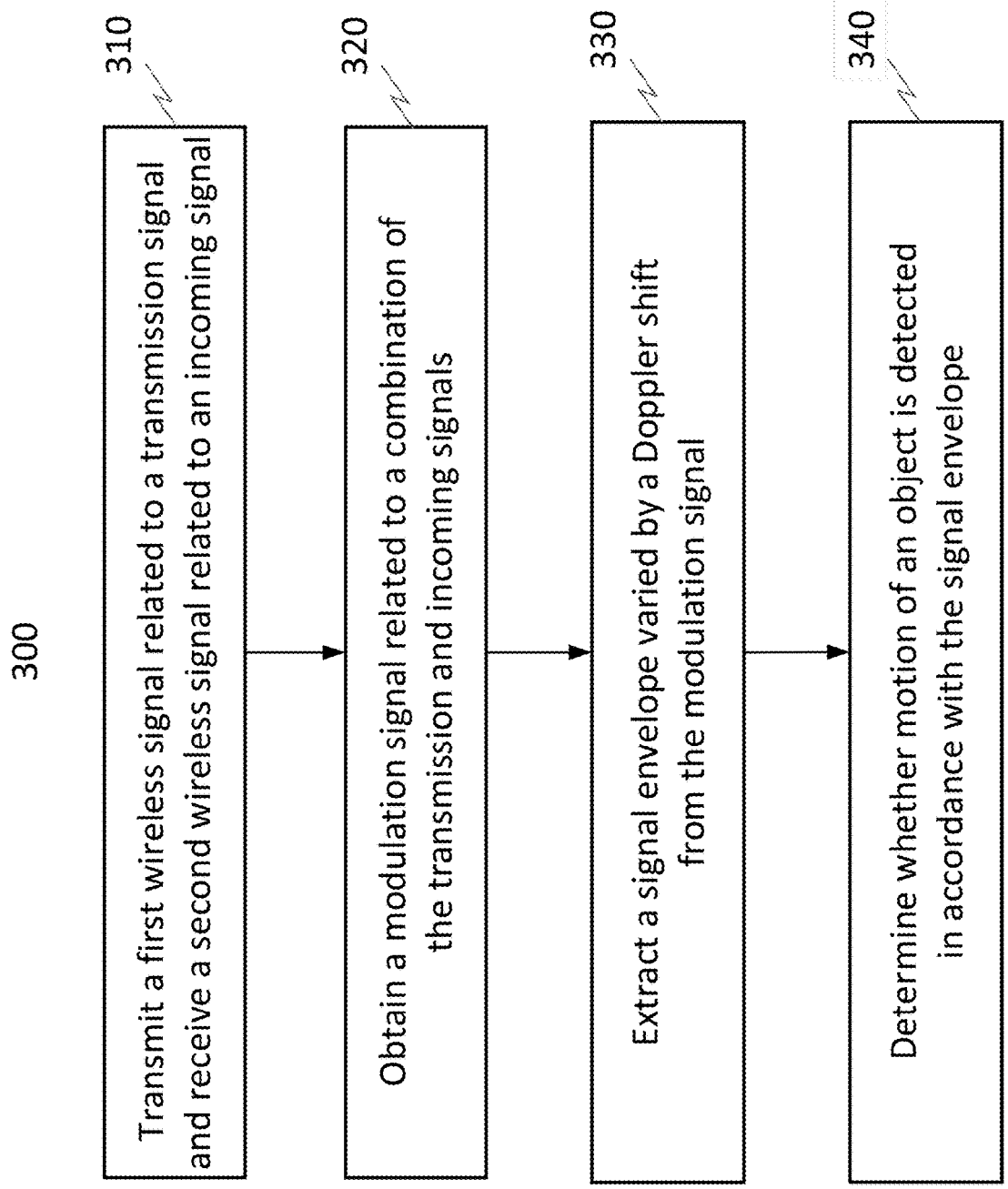
FIG. 9 illustrates a flowchart of an exemplary method for detecting motion of an object by SEM, according to some embodiments of the present disclosure.

FIG. 9 illustrates a flowchart of an exemplary method 300 for detecting motion of an object by SEM, according to some embodiments of the present disclosure. Method 300 may be practiced by all circuits disclosed and illustrated in the present disclosure. Method 300 includes transmitting a first wireless signal related to a transmission signal and receiving a second wireless signal related to an incoming signal (step 310), obtaining a modulation signal related to a combination of the transmission and incoming signals (step 320), extracting a signal envelope varied by a Doppler shift from the modulation signal (step 330), and determining whether motion of the object is detected in accordance with the signal envelope (step 340).

Step 310 includes transmitting a first wireless signal related to a transmission signal and receiving a second wireless signal related to an incoming signal. The second wireless signal is a reflected first wireless signal from the object. For example, as shown in FIGS. 6A and 6B, the transmission chain, which is a transmitter, is configured to transmit a first wireless signal $S_T(f_0)$ related to transmission signal $S_T(f_0)$ 210-1 toward person 200. When person 200 is moving, the transmitted wireless signal $S_T(f_0)$ is reflected by person 200 as a reflected wireless signal $S_R(f_0+f_d)$. Antenna 202 of the transmission chain receives the reflected wireless signal $S_R(f_0+f_d)$ and the wireless signal $S_R(f_0+f_d)$ enters the transmission chain as incoming signal $S_R(f_0+f_d)$ 210-2.

Step 320 includes obtaining a modulation signal related to a combination of the transmission and incoming signals. The modulation signal contains a Doppler shift caused by the motion of the object. As shown in FIG. 6B, coupler 222 of sensing circuit 220 is configured to couple transmission signal $S_T(f_0)$ 210-1 at port 222-1 to incoming signal $S_R(f_0+f_d)$ 210-2 at port 222-2 as a sensed signal 210-3 at port 222-3 and send sensed signal 210-3, i.e., SEM signal 211, through connection 212 to envelope extraction circuit 240. Sensed signal 210-3 is a combination of transmission signal $S_T(f_0)$ 210-1 and incoming signal $S_R(f_0+f_d)$ 210-2 with/without certain power degradation. SEM signal 211 contains a Doppler shift $f_d$ caused by the motion of person 200.

Step 330 includes extracting a signal envelope varied by a Doppler shift from the modulation signal. As shown in FIG. 6A, envelope extraction circuit 240 is configured to extract signal envelope 213 of SEM signal 211. Signal envelope 213 is varied by the Doppler shift $f_d$.

Step 340 includes determining whether motion of the object is detected in accordance with the signal envelope. As shown in FIG. 6A, processor 266 of motion detector 260 is configured to execute instructions stored in memory 262 to determine that no motion is detected when signal envelope 213 is a constant envelope. Signal envelope 213 is the constant envelope when the Doppler shift $f_d$=0. Alternatively, processor 266 is configured to execute instructions stored in memory 262 to determine motion of person 200 is detected when signal envelope 213 is a varied signal envelope. When the Doppler shift $f_d$ of 13.82 or 6.64 Hz is modulated on signal envelope 213, signal envelope 213 is the varied signal envelope.

In some embodiments, the transmission signal is an output signal of a power amplifier. For example, as shown in FIG. 6B, transmission signal $S_T(f_0)$ 210-1 is an output signal $PA_{OUT}$ of driver and power amplifier 206. Alternatively, the transmission signal can be an input signal of the power amplifier. For example, as shown in FIG. 8B, transmission signal $S_T(f_0)$ 210-1 is an input signal of power amplifier 206-A. The output signals of driver and power amplifier 206 in FIG. 6B and power amplifier 206-A in FIG. 8B are both applied to antenna 202 to transmit first wireless signal $S_T(f_0)$.

In some embodiments, the incoming signal contains a Doppler shift. As illustrated in FIG. 6B, incoming signal $S_R(f_0+f_d)$ 210-2 is obtained from the reflected wireless signal $S_R(f_0+f_d)$ and contains Doppler shift $f_d$. When person 200 is moving, $f_d$ is not zero.

In some embodiments, the transmission signal includes a continuous-wave signal. For example, as shown in FIGS. 6A and 6B, oscillator 209 is configured to generate a continuous-wave signal and send the continuous-wave signal through driver and power amplifier 206 to be transmission signal $S_T(f_0)$ 210-1. Alternatively, the transmission signal includes a signal that a transmitter transmits to be the first wireless signal. For example, as shown in FIG. 6A, the transmission chain, which is a transmitter, is configured to transmit transmission signal $S_T(f_0)$ 210-1 to be the first wireless signal $S_T(f_0)$.

In some embodiments, extracting a signal envelope at step 330 includes rectifying the modulation signal and filtering the rectified modulation signal. For example, as shown in FIG. 6A, envelope extraction circuit 240 is configured to rectify SEM signal 211 and filter the rectified SEM signal 211, by rectifier 120 and LPF 130 illustrated and described with reference to FIGS. 2-4, to obtain signal envelope 213.

In some embodiments, obtaining the modulation signal at step 320 includes modulating the incoming signal by the transmission signal, or modulating the transmission signal by the incoming signal. For example, as illustrated in FIGS. 6A and 6B, coupler 222 of sensing circuit 220 is configured to modulate incoming signal $S_R(f_0+f_d)$ 210-2 by transmission signal $S_T(f_0)$ 210-1 to obtain SEM signal 211. Alternatively, coupler 222 of sensing circuit 220 is configured to modulate transmission signal $S_T(f_0)$ 210-1 by incoming signal $S_R(f_0+f_d)$ 210-2 to obtain SEM signal 211.

In some embodiments, obtaining the modulation signal at step 320 includes adding the transmission and incoming signals, coupling the transmission signal to the incoming signal, or degrading the transmission signal, and adding the degraded transmission signal with the incoming signal. For example, as illustrated in FIG. 8B, connection node 226 of sensing circuit 220 is configured to add transmission signal $S_T(f_0)$ 210-1 and incoming signal $S_R(f_0+f_d)$ 210-2 to obtain SEM signal 211. Alternatively, as illustrated in FIG. 6B, coupler 222 of sensing circuit 220 is configured to couple transmission signal $S_T(f_0)$ 210-1 to incoming signal $S_R(f_0+f_d)$ 210-2 to obtain SEM signal 211. Alternatively, as illustrated in FIG. 7B, circulator 224 of sensing circuit 220 is configured to degrade transmission signal $S_T(f_0)$ 210-1, and add degraded transmission signal $S_T(f_0)$ 210-1 with incoming signal $S_R(f_0+f_d)$ 210-2 to obtain SEM signal 211.

In some embodiments, sensing circuit 220 includes at least one of a coupler, a circulator with a leakage path, a connection node, a capacitor, a power divider, or a duplexer. For example, as illustrated in FIGS. 6A, 7A, 8A, sensing circuit 200 includes coupler 222, circulator 224, and connection node 226, respectively. Alternatively, sensing circuit 220 can also be a capacitor, branch line coupler, directional coupler, wilkinson power divider, or a duplexer. All of the sensing circuits in the present disclosure can be one of the above-described components. Alternatively, all of the above-described components can be used to replace each other in all circuits of the present disclosure.

In some embodiments, method 300 further includes determining whether the signal envelope comprises a varied envelope. A signal level of the varied envelope is at least one of higher than a first threshold or lower than a second threshold, the first threshold being higher than the second threshold. In response to a determination that the signal envelope comprises the varied envelope, determining whether motion of the object is detected at step 340 includes determining detection of motion of the object in accordance with the varied envelope.

Figure 10:
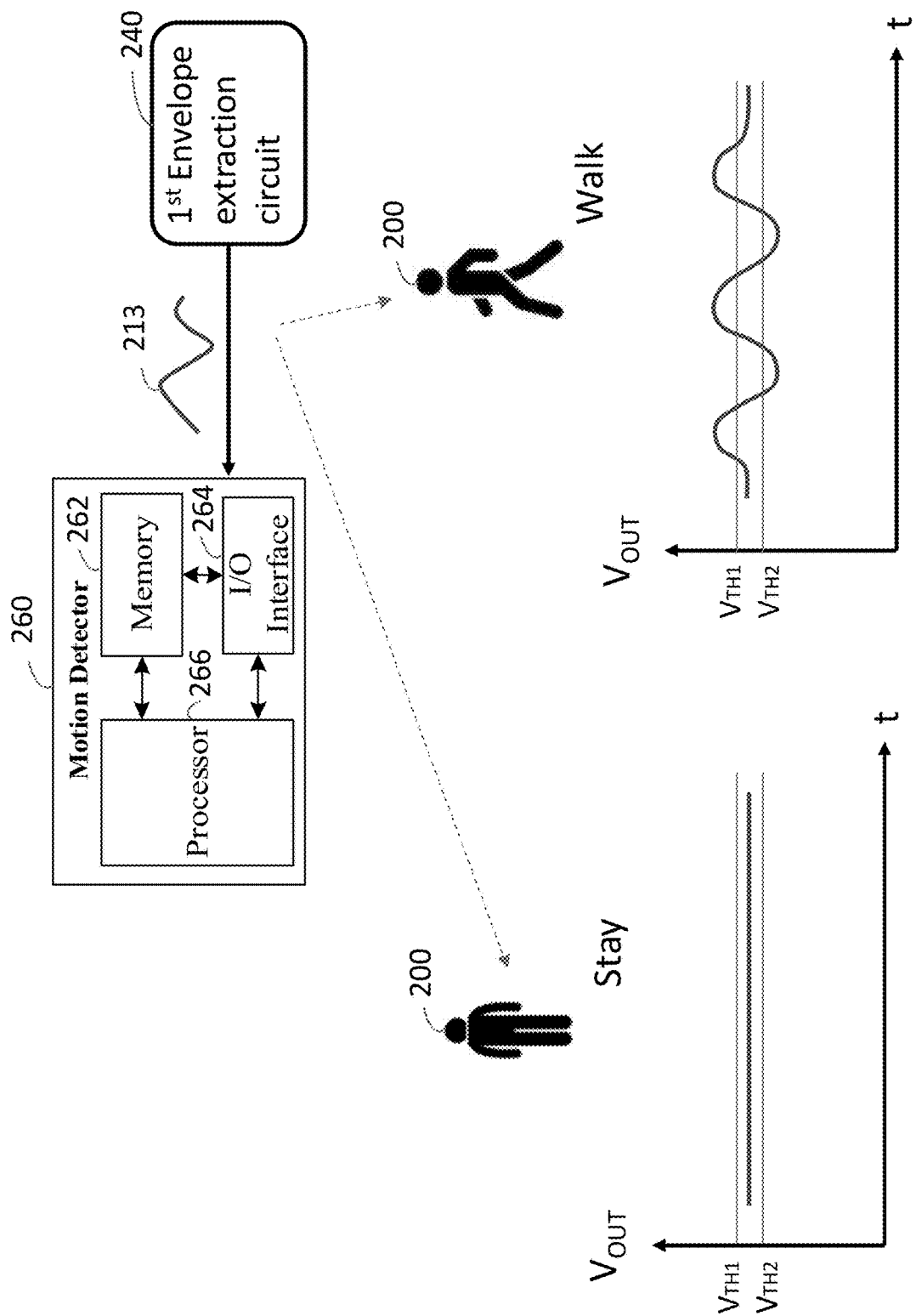
FIG. 10 illustrates exemplary non-varied and varied envelopes of an SEM signal for detecting motion of an object by SEM, according to some embodiments of the present disclosure.

FIG. 10 illustrates exemplary non-varied and varied envelopes of an SEM signal for detecting motion of person 200 by SEM, according to some embodiments of the present disclosure. As shown at the left-hand side of FIG. 10, when person 200 does not move, signal envelope 213 has a substantially constant envelope. As shown at the right-hand side of FIG. 10, when person 200 walks and moves around, signal envelope 213 has a varied envelope, whose signal level is higher than an upper threshold $V_{TH1}$ and/or lower than a lower threshold $V_{TH2}$. The upper threshold $V_{TH1}$ is greater than the lower threshold $V_{TH2}$.

Processor 266 of motion detector 260 is configured to determine whether signal envelope 213 comprises a varied envelope. When a signal level of signal envelope 213 is at least one of higher than the upper threshold $V_{TH1}$ or lower than the lower threshold $V_{TH2}$, processor 266 is configured to determine that signal envelope 213 includes a varied envelope.

In response to a determination that the signal envelope comprises the varied envelope, processor 266 of motion detector 260 is configured to determine detection of motion of person 200 in accordance with the varied envelope.

In some embodiments, the transmission signal is obtained from a source signal. The source signal is one of a constant envelope signal, a non-constant envelope signal, or a packet-based signal.

Figure 11A:
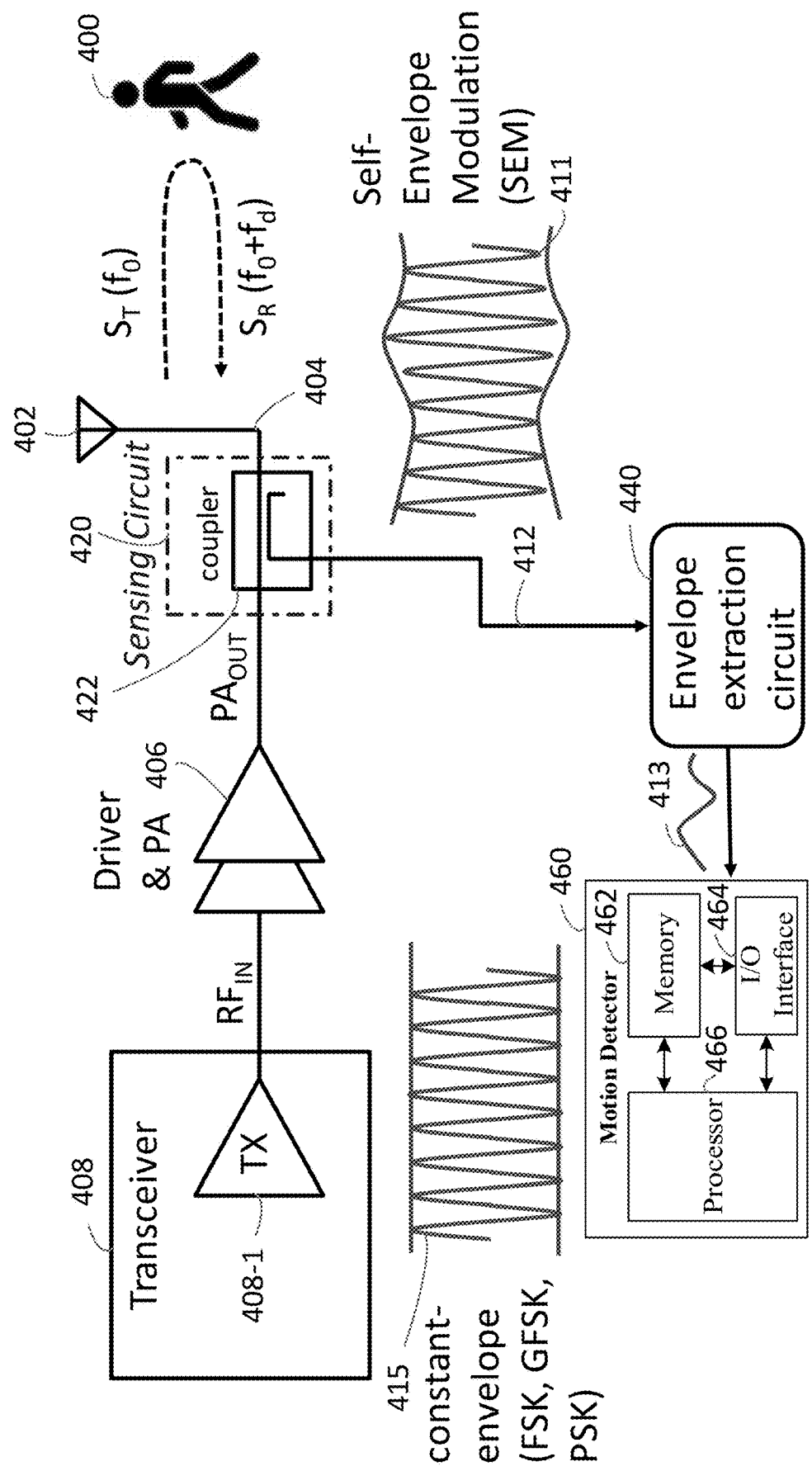
FIG. 11A illustrates an exemplary circuit using a sensing circuit for detecting motion of an object by SEM on a constant envelope signal, according to some embodiments of the present disclosure.

FIG. 11A illustrates an exemplary circuit using a sensing circuit 420 for detecting motion of person 400 by SEM on a constant envelope signal 415, according to some embodiments of the present disclosure. As shown in FIG. 11A, the circuit includes a transceiver 408, a driver and power amplifier 406, sensing circuit 420, an antenna terminal 404, an antenna 402, an envelope extraction circuit 440, and a motion detector 460. Transceiver 408 includes a transmitter 408-1. Sensing circuit 420 includes a coupler 422. Motion detector 460 includes a memory 462, an I/O interface 464, and a processor 466. One or more of these elements in FIG. 11A may be included for detecting motion of person 400. These elements may be configured to transfer data and send or receive instructions between or among each other. These elements are configured to operate similar to corresponding elements illustrated and described with reference to FIG. 6A, except that transmitter 408-1 is configured to transmit constant envelope signal 415 to be a transmission signal in a transmission chain in FIG. 11A.

Figure 11B:
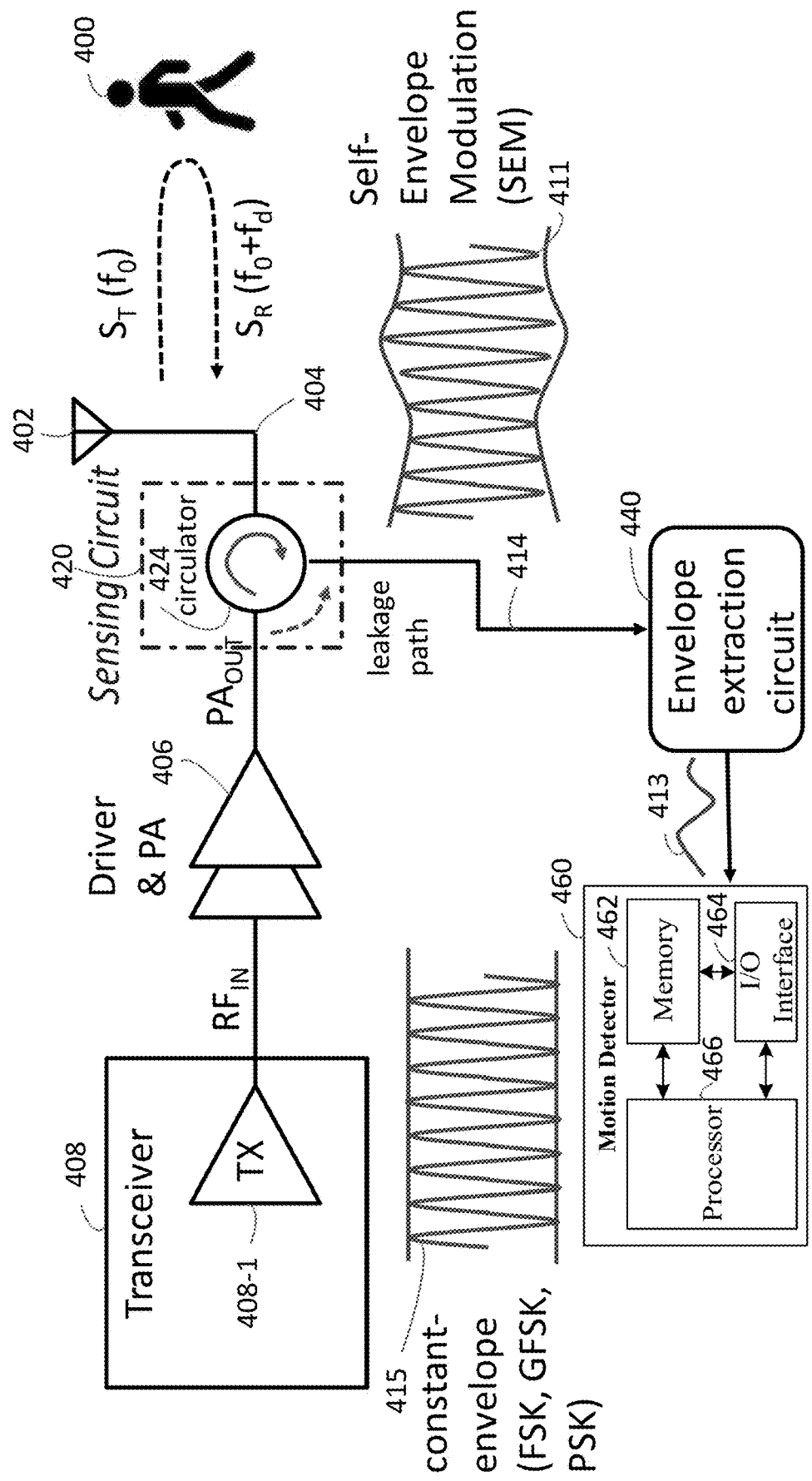
FIG. 11B illustrates an exemplary circuit using a circulator for detecting motion of an object by SEM on a constant envelope signal, according to some embodiments of the present disclosure.

FIG. 11B illustrates an exemplary circuit using a circulator 424 for detecting motion of person 400 by SEM on constant envelope signal 415, according to some embodiments of the present disclosure. As shown in FIG. 11B, the circuit includes transceiver 408, driver and power amplifier 406, sensing circuit 420, antenna terminal 404, antenna 402, envelope extraction circuit 440, and motion detector 460. Sensing circuit 420 includes a circulator 424. One or more of the elements in FIG. 11B may be included for detecting motion of person 400. These elements may be configured to transfer data and send or receive instructions between or among each other. These elements are configured to operate similar to corresponding element illustrated and described with reference to FIG. 7A, except that transmitter 408-1 is configured to transmit constant envelope signal 415 to be a transmission signal in a transmission chain in FIG. 11B.

Figure 12:
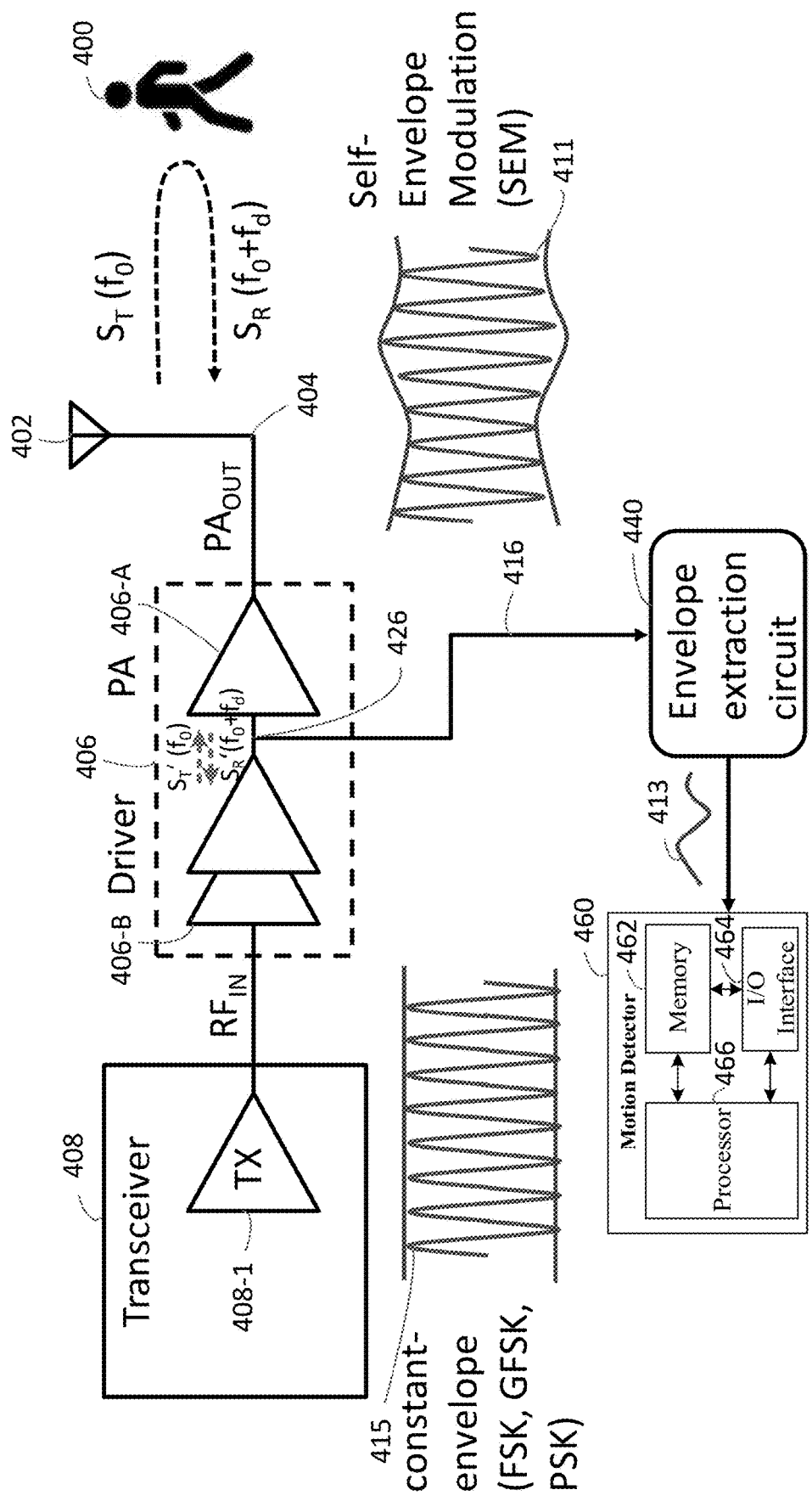
FIG. 12 illustrates an exemplary circuit using a connection node for detecting motion of an object by SEM on a constant envelope signal, according to some embodiments of the present disclosure.

FIG. 12 illustrates an exemplary circuit using a connection node 426 for detecting motion of person 400 by SEM on constant envelope signal 415, according to some embodiments of the present disclosure. As shown in FIG. 12, the circuit includes transceiver 408, driver 406-B and power amplifier 406-A, connection node 426 (i.e., a sensing circuit), antenna terminal 404, antenna 402, envelope extraction circuit 440, and motion detector 460. One or more of the elements in FIG. 12 may be included for detecting motion of person 400. These elements may be configured to transfer data and send or receive instructions between or among each other. These elements are configured to operate similar to corresponding elements illustrated and described with reference to FIG. 8A, except that transmitter 408-1 is configured to transmit constant envelope signal 415 to be a transmission signal in a transmission chain in FIG. 12.

As illustrated in FIGS. 11A, 11B, and 12, transmission signal $S_T(f_0)$ can be obtained from a source signal. The source signal is constant envelope signal 415.

Figure 13A:
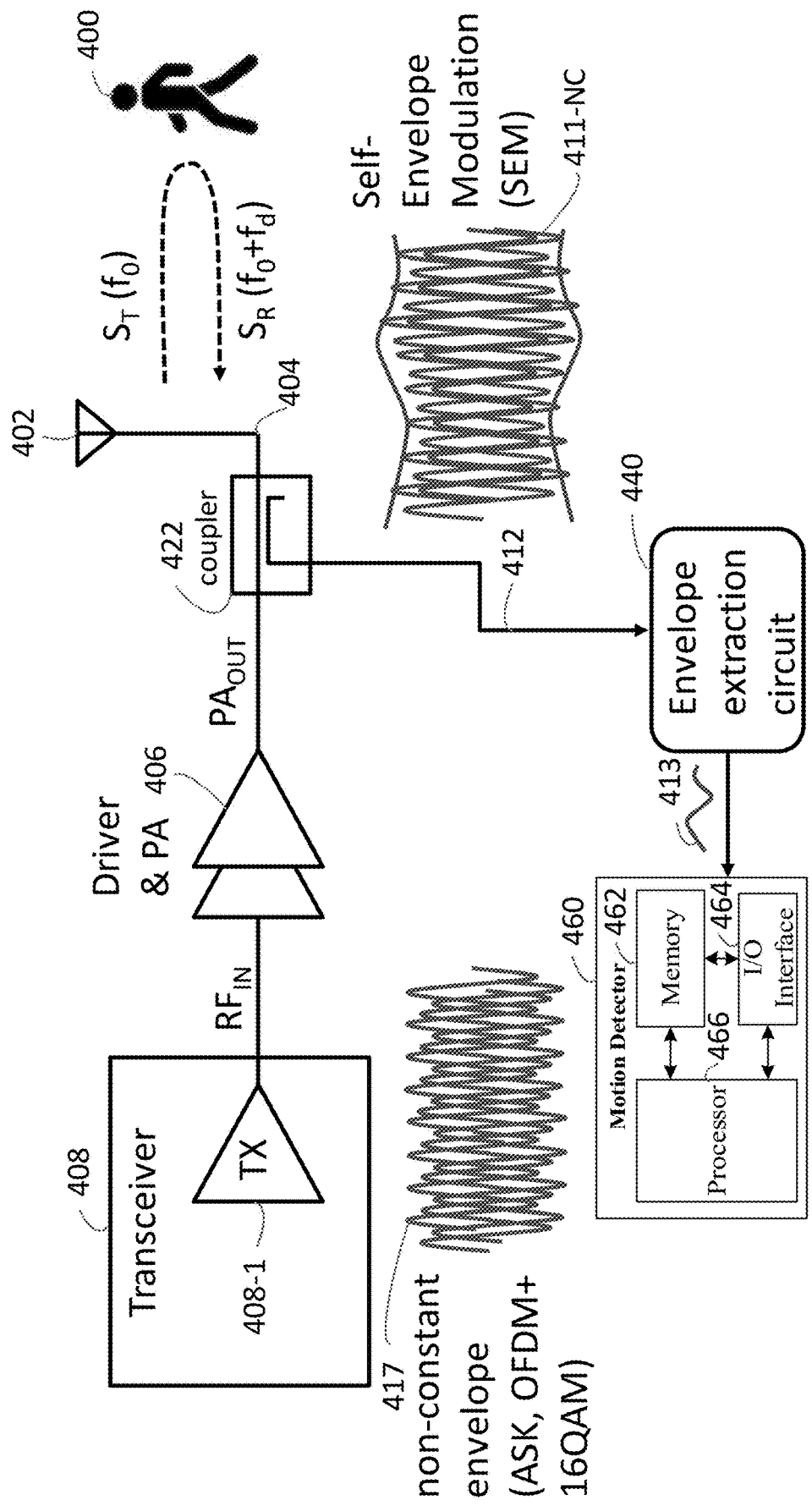
FIG. 13A illustrates an exemplary circuit using a coupler for detecting motion of an object by SEM on a non-constant envelope signal, according to some embodiments of the present disclosure.

FIG. 13A illustrates an exemplary circuit using a coupler 422 for detecting motion of person 400 by SEM on a non-constant envelope signal 417, according to some embodiments of the present disclosure. As shown in FIG. 13A, the circuit includes transceiver 408, driver and power amplifier 406, coupler 422 (i.e., sensing circuit), antenna terminal 404, antenna 402, envelope extraction circuit 440, and motion detector 460. One or more of the elements in FIG. 13A may be included for detecting motion of person 400. These elements may be configured to transfer data and send or receive instructions between or among each other. These elements are configured to operate similar to corresponding elements illustrated and described with reference to FIG. 6A, except that transmitter 408-1 is configured to transmit non-constant envelope signal 417 to be a transmission signal in a transmission chain in FIG. 13A.

Figure 13B:
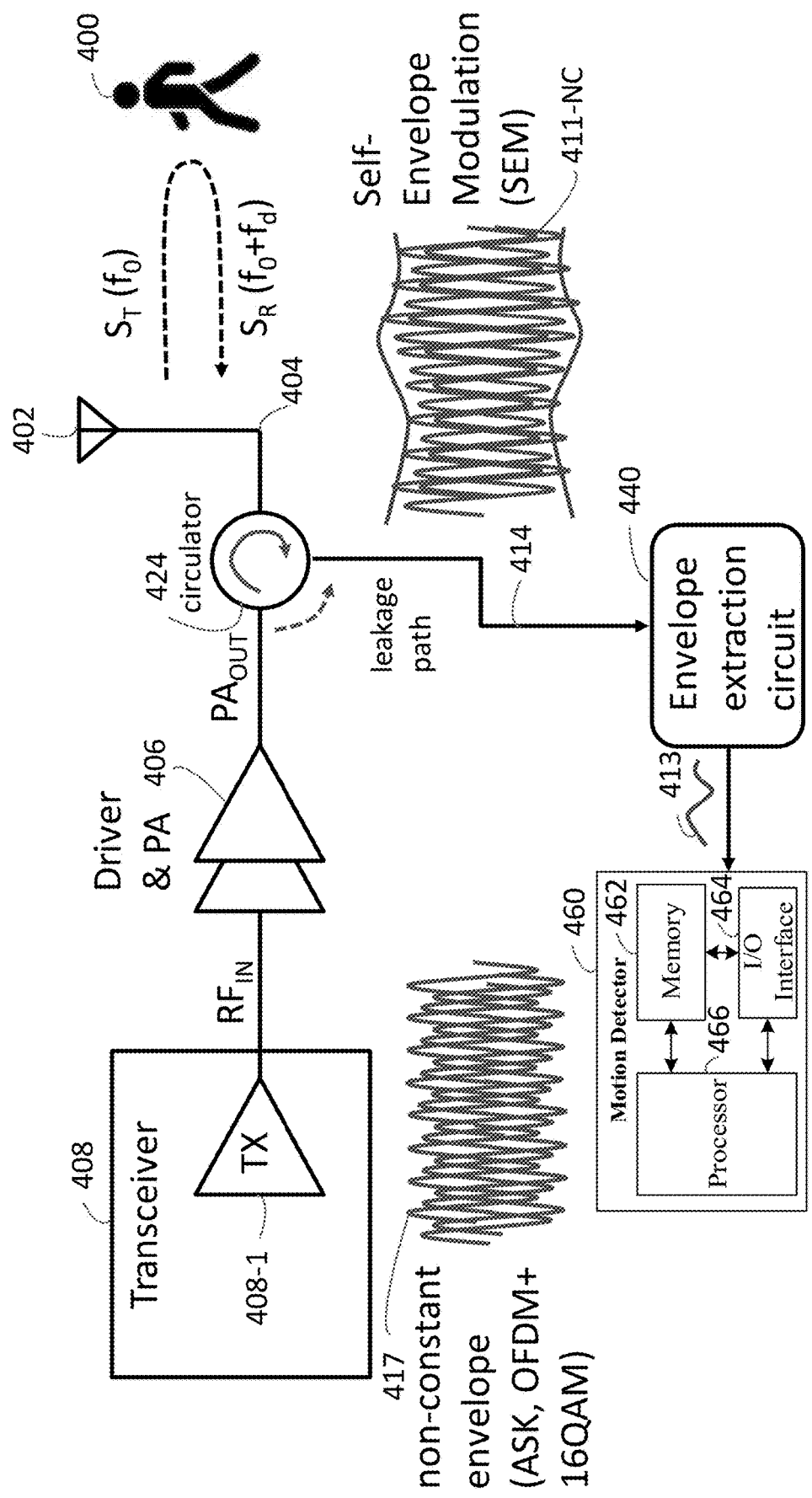
FIG. 13B illustrates an exemplary circuit using a circulator for detecting motion of an object by SEM on a non-constant envelope signal, according to some embodiments of the present disclosure.

FIG. 13B illustrates an exemplary circuit using a circulator 424 for detecting motion of person 400 by SEM on non-constant envelope signal 417, according to some embodiments of the present disclosure. As shown in FIG. 13B, the circuit includes transceiver 408, driver and power amplifier 406, circulator 424 (i.e., sensing circuit), antenna terminal 404, antenna 402, envelope extraction circuit 440, and motion detector 460. One or more of the elements in FIG. 13B may be included for detecting motion of person 400. These elements may be configured to transfer data and send or receive instructions between or among each other. These elements are configured to operate similar to corresponding elements illustrated and described with reference to FIG. 7A, except that transmitter 408-1 is configured to transmit non-constant envelope signal 417 to be a transmission signal in a transmission chain in FIG. 13B.

Figure 14:
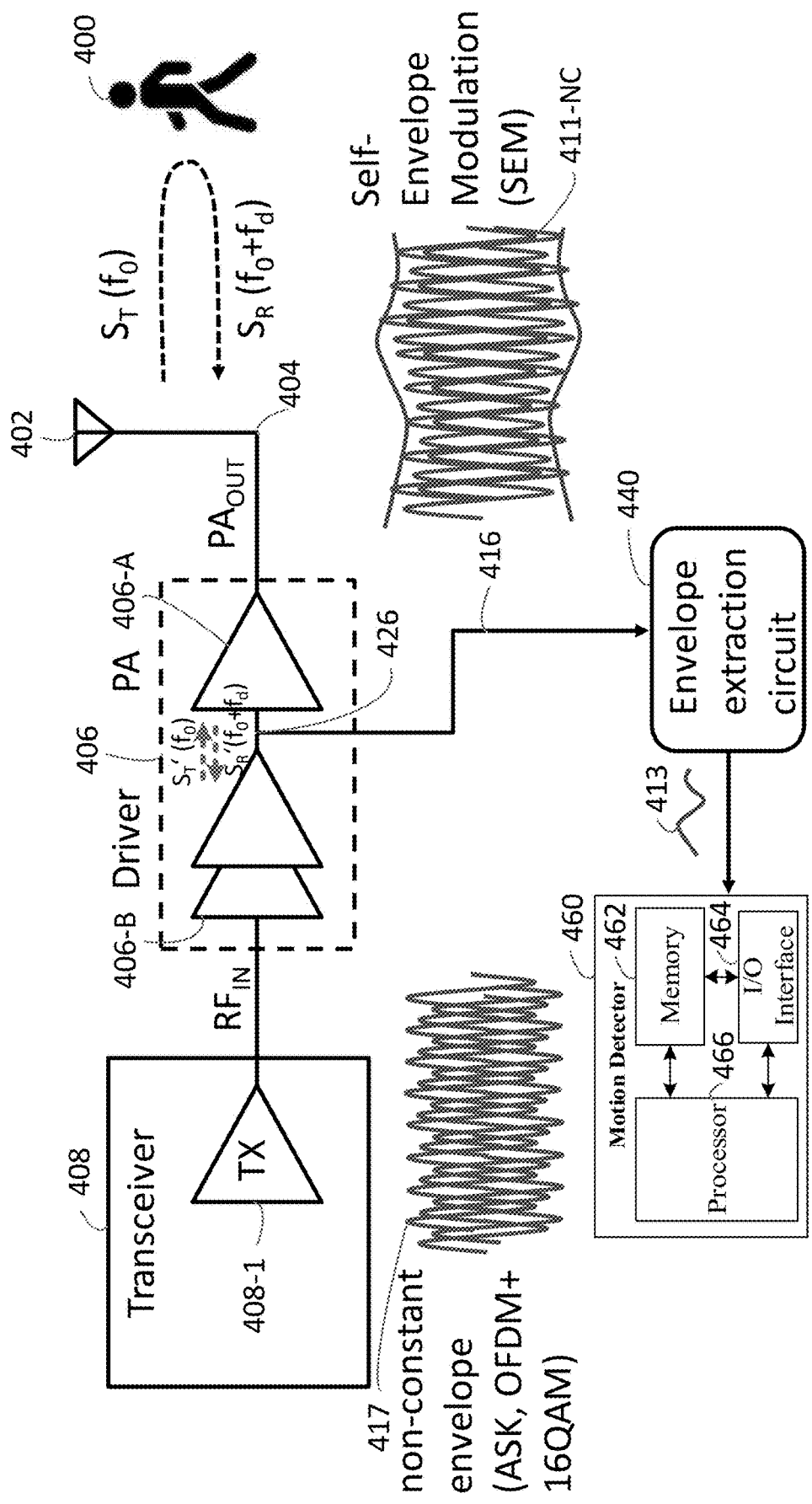
FIG. 14 illustrates an exemplary circuit using a connection node for detecting motion of an object by SEM on a non-constant envelope signal, according to some embodiments of the present disclosure.

FIG. 14 illustrates an exemplary circuit using a connection node 426 for detecting motion of person 400 by SEM on non-constant envelope signal 417, according to some embodiments of the present disclosure. As shown in FIG. 14, the circuit includes transceiver 408, driver 406-B and power amplifier 406-A, connection node 426 (i.e., a sensing circuit), antenna terminal 404, antenna 402, envelope extraction circuit 440, and motion detector 460. One or more of the elements in FIG. 14 may be included for detecting motion of person 400. These elements may be configured to transfer data and send or receive instructions between or among each other. These elements are configured to operate similar to corresponding elements illustrated and described with reference to FIG. 8A, except that transmitter 408-1 is configured to transmit non-constant envelope signal 417 to be a transmission signal in a transmission chain in FIG. 14.

As illustrated in FIGS. 13A, 13B, and 14, transmission signal $S_T(f_0)$ can be obtained from a source signal. The source signal is non-constant envelope signal 417.

Figure 15A:
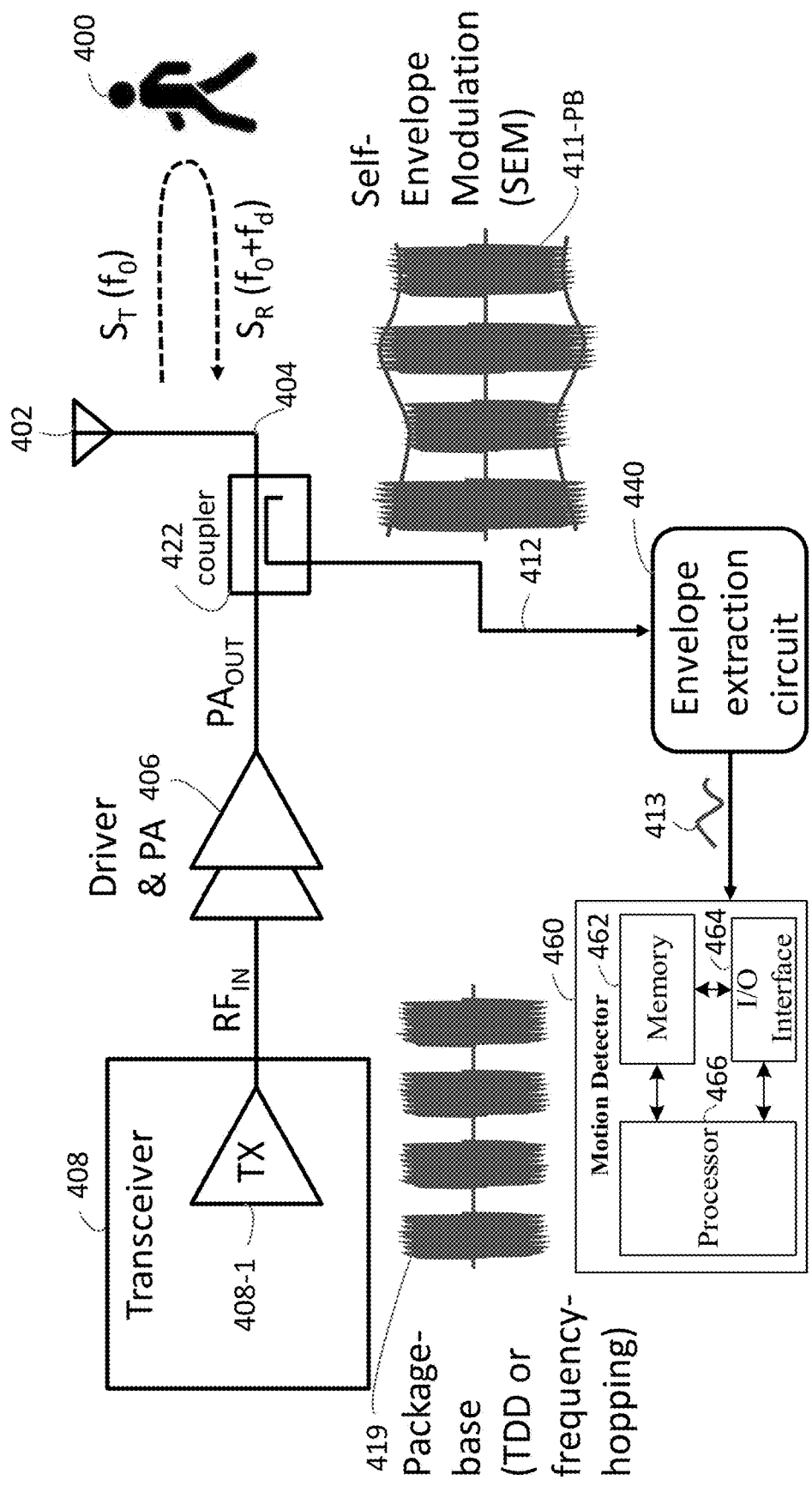
FIG. 15A illustrates an exemplary circuit using a coupler for detecting motion of an object by SEM on a packet-based signal, according to some embodiments of the present disclosure.

FIG. 15A illustrates an exemplary circuit using a coupler 422 for detecting motion of person 400 by SEM on a packet-based signal 419, according to some embodiments of the present disclosure. As shown in FIG. 15A, the circuit includes transceiver 408, driver and power amplifier 406, coupler 422 (i.e., sensing circuit), antenna terminal 404, antenna 402, envelope extraction circuit 440, and motion detector 460. One or more of the elements in FIG. 15A may be included for detecting motion of person 400. These elements may be configured to transfer data and send or receive instructions between or among each other. These elements are configured to operate similar to corresponding elements illustrated and described with reference to FIG. 6A, except that transmitter 408-1 is configured to transmit packet-based signal 419 to be a transmission signal in a transmission chain in FIG. 15A.

Figure 15B:
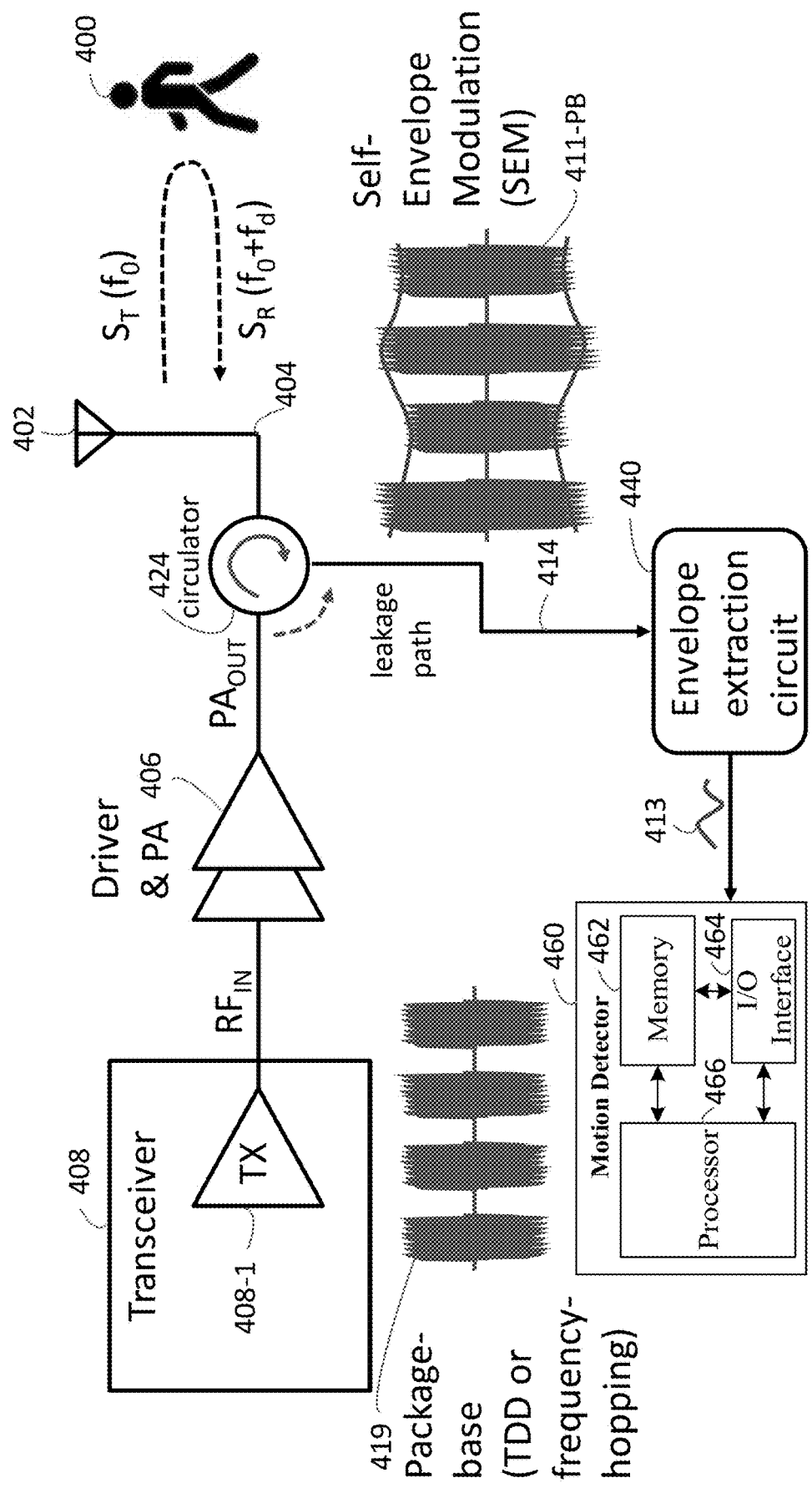
FIG. 15B illustrates an exemplary circuit using a circulator for detecting motion of an object by SEM on a packet-based signal, according to some embodiments of the present disclosure.

FIG. 15B illustrates an exemplary circuit using a circulator 424 for detecting motion of person 400 by SEM on packet-based signal 419, according to some embodiments of the present disclosure. As shown in FIG. 15B, the circuit includes transceiver 408, driver and power amplifier 406, circulator 424 (i.e., sensing circuit), antenna terminal 404, antenna 402, envelope extraction circuit 440, and motion detector 460. One or more of the elements in FIG. 15B may be included for detecting motion of person 400. These elements may be configured to transfer data and send or receive instructions between or among each other. These elements are configured to operate similar to corresponding elements illustrated and described with reference to FIG. 7A, except that transmitter 408-1 is configured to transmit packet-based signal 419 to be a transmission signal in a transmission chain in FIG. 15B.

Figure 16:
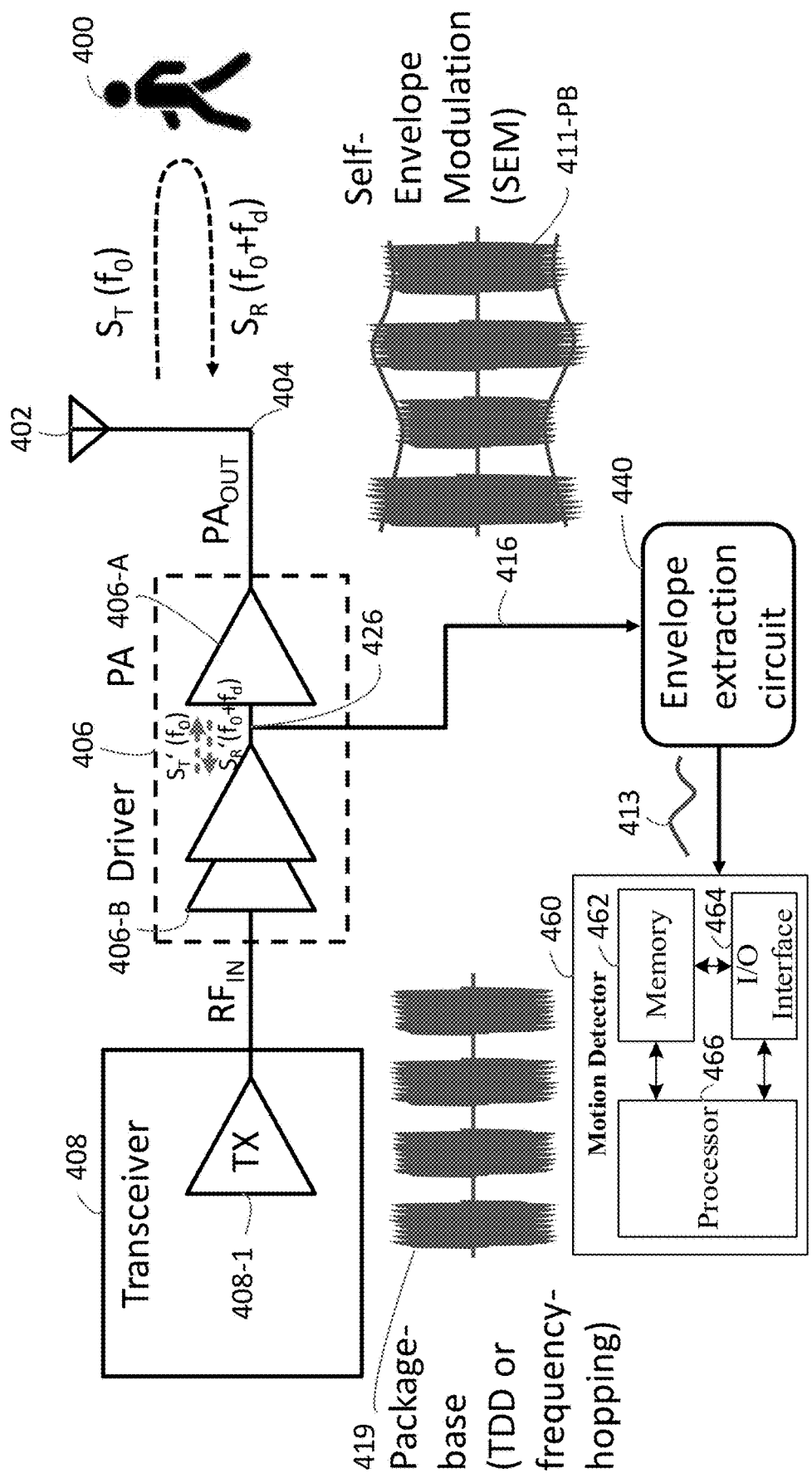
FIG. 16 illustrates an exemplary circuit using a connection node for detecting motion of an object by SEM on a packet-based signal, according to some embodiments of the present disclosure.

FIG. 16 illustrates an exemplary circuit using a connection node 426 for detecting motion of person 400 by SEM on packet-based signal 419, according to some embodiments of the present disclosure. As shown in FIG. 16, the circuit includes transceiver 408, driver 406-B and power amplifier 406-A, connection node 426 (i.e., a sensing circuit), antenna terminal 404, antenna 402, envelope extraction circuit 440, and motion detector 460. One or more of the elements in FIG. 16 may be included for detecting motion of person 400. These elements may be configured to transfer data and send or receive instructions between or among each other. These elements are configured to operate similar to corresponding elements illustrated and described with reference to FIG. 8A, except that transmitter 408-1 is configured to transmit packet-based signal 419 to be a transmission signal in a transmission chain in FIG. 16.

As illustrated in FIGS. 15A, 15B, and 16, transmission signal $S_T(f_0)$ can be obtained from a source signal. The source signal is packet-based signal 419.

In some embodiments, method 300 further includes obtaining a control signal from a transmitter that generates the transmission signal, and determining whether the Doppler shift is detected in accordance with the signal envelope and the control signal.

Figure 17A:
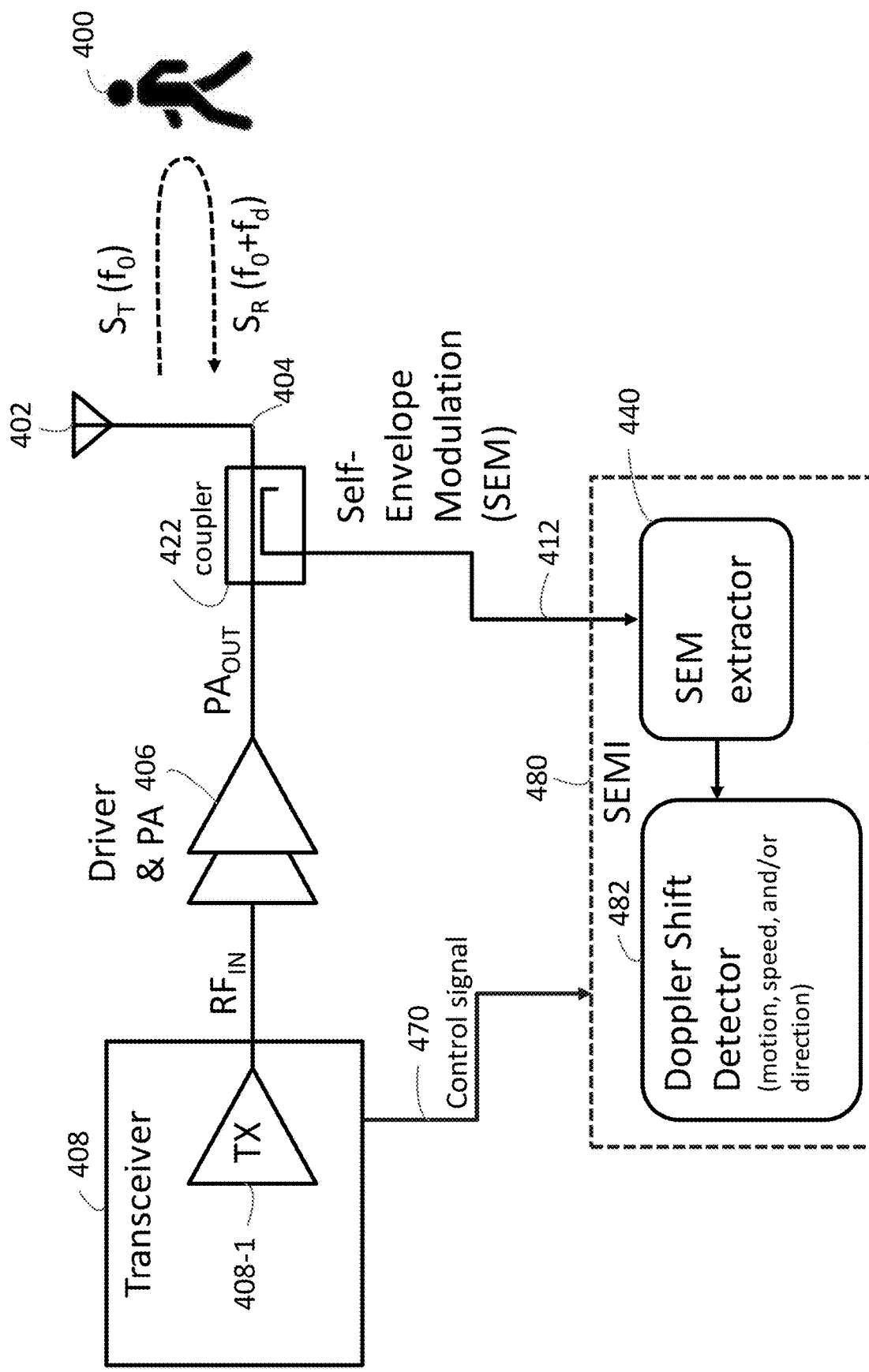
FIG. 17A illustrates an exemplary circuit using a coupler for detecting motion of an object by SEM with a control signal from a transmitter, according to some embodiments of the present disclosure.

FIG. 17A illustrates an exemplary circuit using a coupler 422 for detecting motion of person 400 by SEM with a control signal 470 from transmitter 408-1, according to some embodiments of the present disclosure. As shown in FIG. 17A, the circuit includes transceiver 408, driver and power amplifier 406, coupler 422 (i.e., sensing circuit), antenna terminal 404, antenna 402, and a SEM indicator (SEMI) circuit 480. SEMI 480 includes a SEM extractor 440 and a Doppler shift detector 482. SEM extractor 440 includes a circuit and is configured to operate as envelope extraction circuit 240 in FIG. 6A.

Doppler shift detector 482 includes a processor, memory, and an I/O interface. Doppler shift detector 482 is configured to operate as motion detection 460. Moreover, Doppler shift detector 482 can be configured to detect speed and direction of person 400 based on the Doppler shift $f_d$. For example, Doppler shift detector 482 is configured to detect a speed of person 400 as 3 km/hour when it detects $f_d$=13.82 Hz and θ=0, as examples illustrated in FIG. 6A. Doppler shift detector 482 can be configured to detect angle θ, as will be described below.

One or more of the elements in FIG. 17A may be included for detecting motion of person 400. These elements may be configured to transfer data and send or receive instructions between or among each other. These elements are configured to operate similar to corresponding elements illustrated and described with reference to FIG. 15A, except that transmitter 408-1 is configured to send control signal 470 to SEMI 480.

Figure 17B:
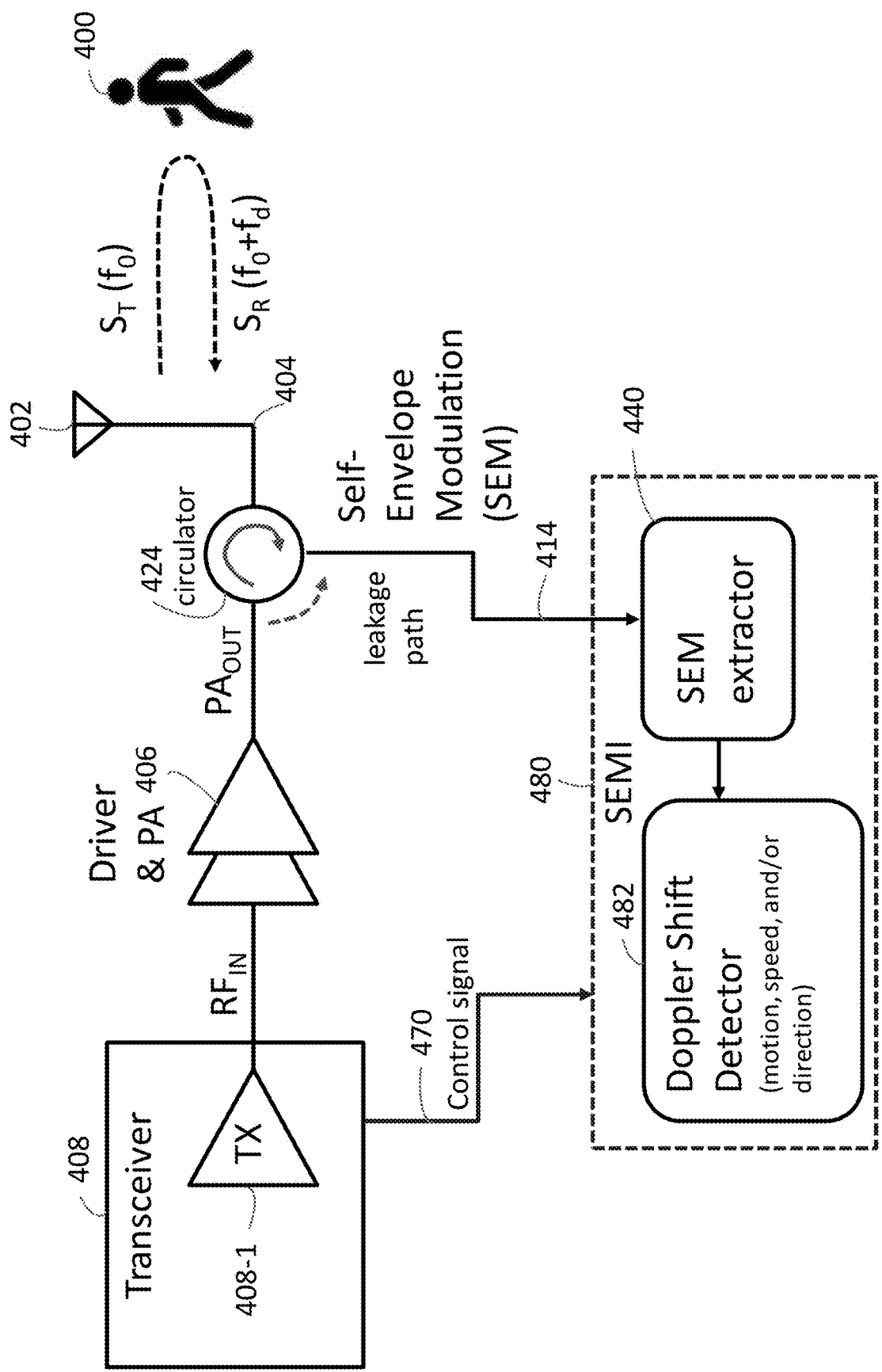
FIG. 17B illustrates an exemplary circuit using a circulator for detecting motion of an object by SEM with a control signal from a transmitter, according to some embodiments of the present disclosure.

FIG. 17B illustrates an exemplary circuit using a circulator 424 for detecting motion of person 400 by SEM with control signal 470 from transmitter 408-1, according to some embodiments of the present disclosure. As shown in FIG. 17B, the circuit includes transceiver 408, driver and power amplifier 406, circulator 424 (i.e., sensing circuit), antenna terminal 404, antenna 402, and SEM indicator (SEMI) circuit 480. One or more of the elements in FIG. 17B may be included for detecting motion of person 400. These elements may be configured to transfer data and send or receive instructions between or among each other. These elements are configured to operate similar to corresponding elements illustrated and described with reference to FIG. 17A, except that circulator 424 is configured to obtain an SEM signal and send the SEM signal to SEM extractor 440. Transmitter 408-1 is configured to send control signal 470 to SEMI 480.

Figure 18:
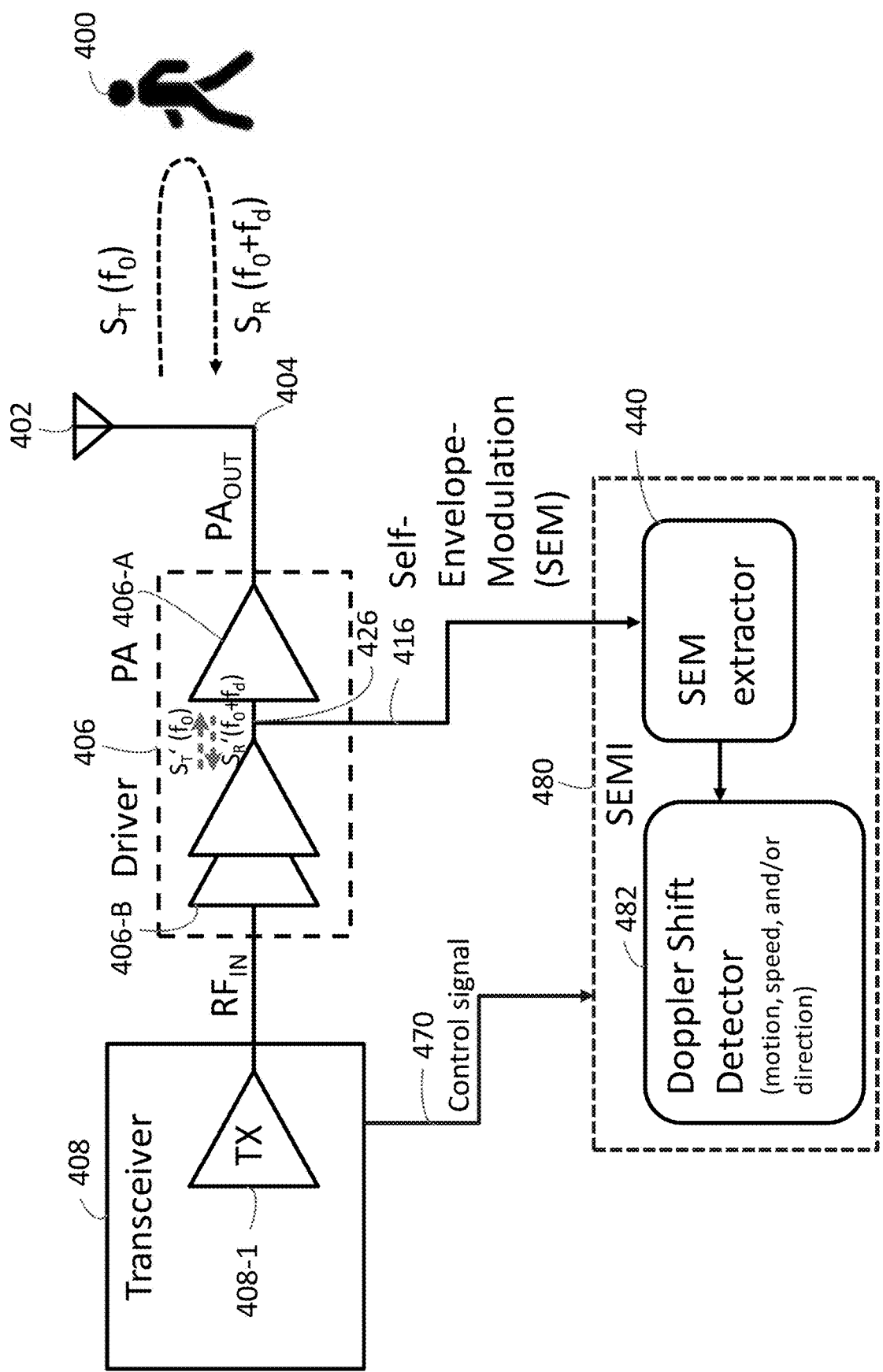
FIG. 18 illustrates an exemplary circuit using a connection node for detecting motion of an object by SEM with a control signal from a transmitter, according to some embodiments of the present disclosure.

FIG. 18 illustrates an exemplary circuit using a connection node 426 for detecting motion of person 400 by SEM with control signal 470 from transmitter 408-1, according to some embodiments of the present disclosure. As shown in FIG. 18, the circuit includes transceiver 408, driver 406-B and power amplifier 406-A, connection node 426 (i.e., sensing circuit), antenna terminal 404, antenna 402, and SEM indicator (SEMI) circuit 480. One or more of the elements in FIG. 18 may be included for detecting motion of person 400. These elements may be configured to transfer data and send or receive instructions between or among each other. These elements are configured to operate similar to corresponding elements illustrated and described with reference to FIG. 17A, except that connection node 426 is configured to obtain an SEM signal and send the SEM signal to SEM extractor 440. Transmitter 408-1 is configured to send control signal 470 to SEMI 480.

As illustrated in FIGS. 17A, 17B, and 18, Doppler shift detector 482 is configured to obtain control signal 470 from transmitter 408-1 that generates transmission signal $S_T(f_0)$. Control signal 470 includes information about when transmitter 408-1 transmits transmission signal $S_T(f_0)$, the waveforms transmitter 408-1 transmits for Doppler shift detector 482 to detect the Doppler shift at a correct time and related parameters of the waveforms. Thus, Doppler shift detector 482 is configured to determine whether the Doppler shift is detected in accordance with a signal envelope and control signal 470 from transmitter 408-1.

In some embodiments, modulation signal 411 is a first modulation signal, and signal envelope 413 is a first signal envelope, and method 300 further includes determining to extract one of the first signal envelope or a second signal envelope varied by the Doppler shift in accordance with the control signal; in response to a determination to extract the second signal envelope, obtaining a second modulation signal, and extracting the second signal envelope from the second modulation signal; and determining whether the Doppler shift is detected in accordance with the control signal and the one of the first or second signal envelope.

Figure 19:
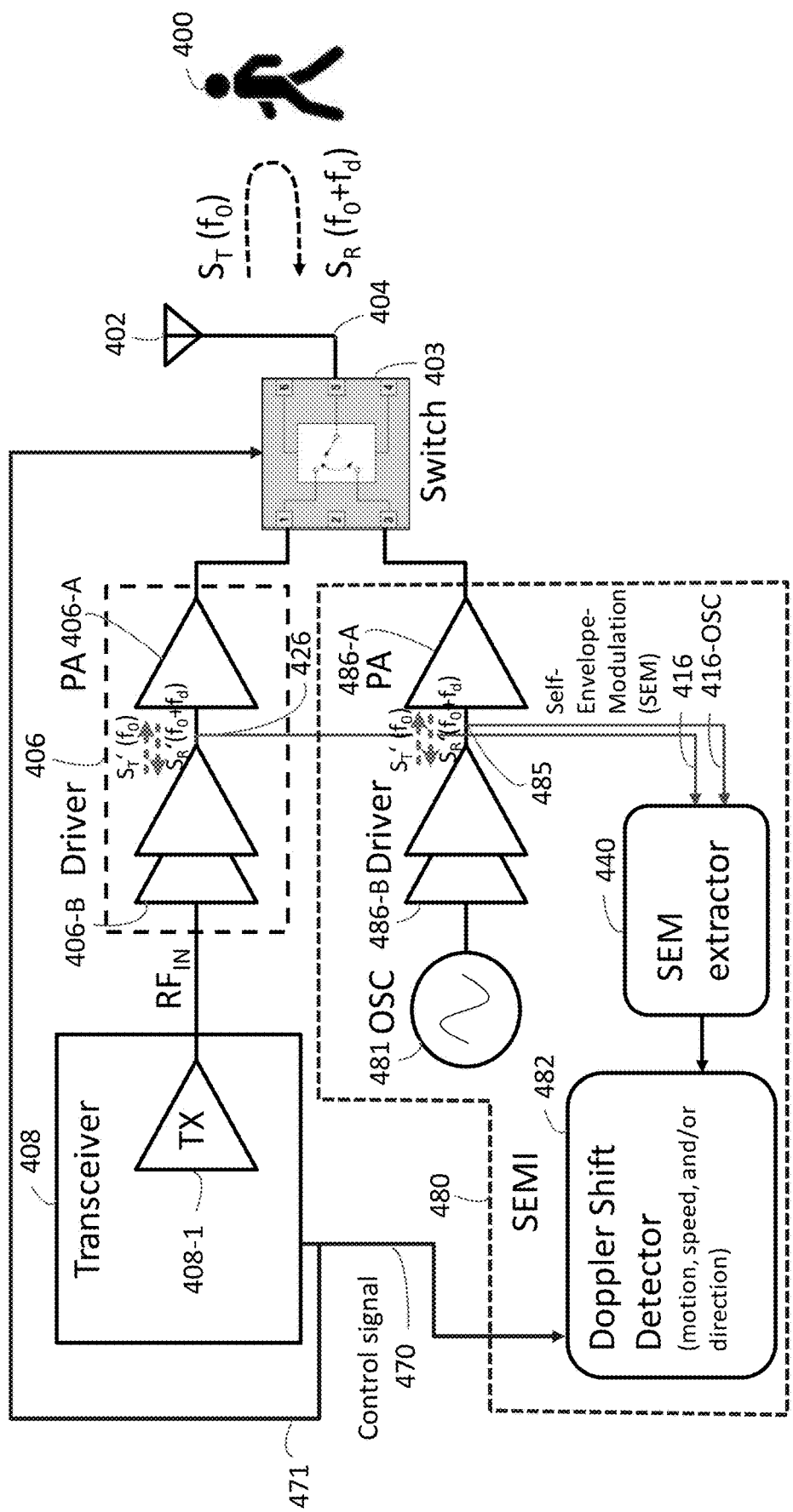
FIG. 19 illustrates an exemplary circuit with a source signal generator for detecting motion of an object by SEM, according to some embodiments of the present disclosure.

FIG. 19 illustrates an exemplary circuit with a source signal generator 481 for detecting motion of person 400 by SEM, according to some embodiments of the present disclosure. As shown in FIG. 19, the circuit includes transceiver 408, driver 406-B and power amplifier 406-A, connection node 426 (i.e., sensing circuit), antenna terminal 404, antenna 402, oscillator 481, a driver 486-B and a power amplifier 486-A, a connection node 485, a switch 403, and SEM indicator (SEMI) circuit 480.

One or more of the elements in FIG. 19 may be included for detecting motion of person 400. These elements may be configured to transfer data and send or receive instructions between or among each other. These elements are configured to operate similar to corresponding elements illustrated and described with reference to FIG. 18, except that oscillator 481, driver 486-B, connection node 485, and power amplifier 486-A are coupled in sequence to form another transmission chain to generate another transmission signal $S_{T'}(f_0)$.

Connection node 426 is configured to obtain an SEM signal and send the SEM signal to SEM extractor 440 through connection 416. Connection node 485 is configured to obtain another SEM signal and send the SEM signal to SEM extractor 440 through connection 416-OSC. Transmitter 408-1 is configured to send control signal 470 to SEMI 480 and a control signal 471 to switch 403.

Control signal 471 is sent to switch 403 to select a path for incoming signal $S_R(f_0+f_d)$. When an upper transmission chain in FIG. 19 can be used to extract an SEM signal, control signal 471 is configured to select an upper path for incoming signal $S_R(f_0+f_d)$ to enter connection node 426. When the upper transmission chain in FIG. 19 is not able to extract the SEM signal, control signal 471 is configured to select a lower path for incoming signal $S_R(f_0+f_d)$ to enter connection node 485.

Doppler shift detector 482 is configured to determine whether to extract one of a first signal envelope from the SEM signal varied by the Doppler shift on connection 416, or a second signal envelope from another SEM signal varied by the Doppler shift on connection 416-OSC, in accordance with the control signal.

When the SEM signal from the upper transmission chain in FIG. 19 is unavailable, Doppler shift detector 482 is configured to determine to extract the second signal envelope. In response to the determination to extract the second signal envelope, SEMI 480 is configured to obtain a second modulation signal from connection node 485, and extract the second signal envelope from the second modulation signal on connection 416-OSC. Doppler shift detector 482 can be configured to determine whether the Doppler shift is detected in accordance with control signals 470 and the second signal envelope.

Thus, Doppler shift detector 482 is configured to determine whether the Doppler shift is detected in accordance with control signal 470 and the one of the first or second signal envelope.

In FIG. 19, oscillator 481 is configured to generate a source signal. Connection node 485 is configured to combine the source signal and the second incoming signal $S_R(f_0+f_d)$ from switch 403 to obtain the second modulation signal. The second incoming signal $S_R(f_0+f_d)$ is obtained from the reflected wireless signal $S_R(f_0+f_d)$.

In some embodiments, obtaining the modulation signal of step 320 includes obtaining the modulation signal from a first loop signal of a closed-loop circuit. A second loop signal of the closed-loop circuit includes the combination of the transmission and incoming signals.

Figure 20A:
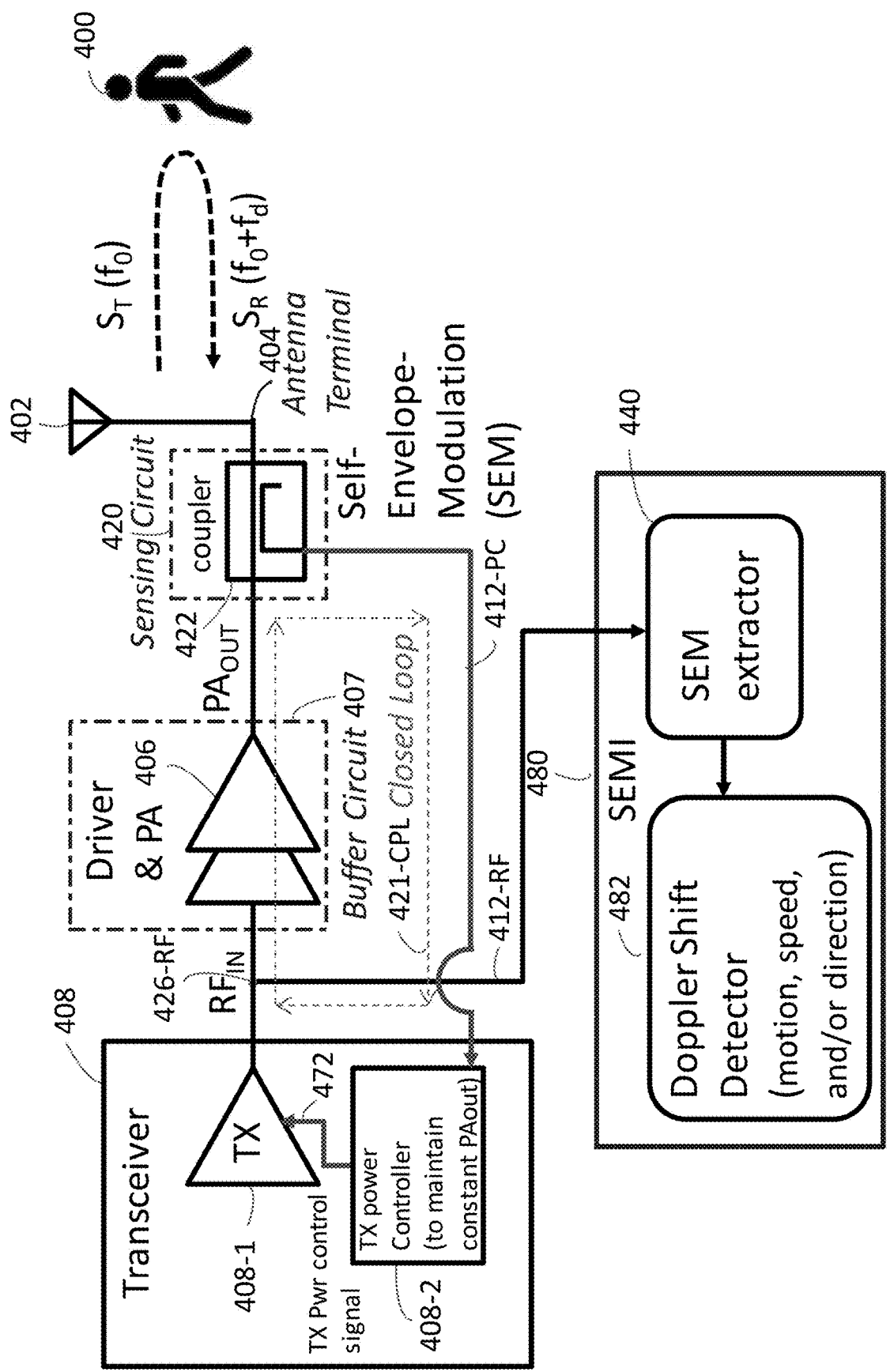
FIG. 20A illustrates an exemplary circuit using a coupler for detecting motion of an object by SEM on a closed-loop circuit, according to some embodiments of the present disclosure.

FIG. 20A illustrates an exemplary circuit using a coupler 422 for detecting motion of person 400 by SEM on a closed-loop circuit 421-CPL, according to some embodiments of the present disclosure. As shown in FIG. 20A, the circuit includes transceiver 408, a connection node 426-RF, driver and power amplifier 406 (i.e., a buffer circuit 407), coupler 422 (i.e., a sensing circuit 420), antenna terminal 404, antenna 402, and SEM indicator (SEMI) circuit 480. Transceiver 408 includes transmitter 408-1 and a transmission power controller 408-2. SEM extractor 440 is configured to operate similar to envelope extraction circuit 240 illustrated and described with reference to FIG. 6A.

One or more of the elements in FIG. 20A may be included for detecting motion of person 400. These elements may be configured to transfer data and send or receive instructions between or among each other. These elements are configured to operate as illustrated and described in FIG. 17A, except that transmitter 408-1 is not configured to send control signal 470 to SEMI 480 and that coupler 422 of sensing circuit 420 is configured to send a sensed SEM signal to transmission power controller 408-2, not to SEM extractor 440.

As shown in FIG. 20A, closed-loop circuit 421-CPL includes transmitter 408-1, connection node 426-RF, driver and power amplifier 406, coupler 422, and transmission power controller 408-2. Coupler 422 of sensing circuit 420 is configured to combine transmission and incoming signals to obtain a first SEM signal, and feed back to transmission power controller 408-2. The first SEM signal can propagate through a transmission power control signal 472 to transmitter 408-1. Transmitter 408-1 is configured to control its transmission power on a transmission signal based on transmission power control signal 472, in which the first SEM signal is carried. Thus, transmitter 408-1 is configured to transmit a transmission signal including the first SEM signal. Connection node 426-RF at the $RF_{IN}$ is configured to sense the transmission signal to obtain a second SEM signal and send the second SEM signal through connection 412-RF to SEM extractor 440 for extracting a signal envelope.

As illustrated in FIG. 20A, closed-loop circuit 421-CPL includes transmitter 408-1, connection node 426-RF (i.e., a second sensing circuit), driver and power amplifier 406 (i.e., a radio frequency circuit), and coupler 422 (i.e., a first sensing circuit). The second sensing circuit, connection node 426-RF, is configured to obtain the second SEM signal from $RF_{IN}$ signal of closed-loop circuit. The first sensing circuit, coupler 422, is configured to obtain the first SEM signal including the combination of the transmission and incoming signals.

In some embodiments, method 300 includes adjusting transmission power of a transmitter in the closed-loop circuit based on the second loop signal.

As illustrated in FIG. 20A, transmitter 408-1 is configured to adjust transmission power based on the first SEM signal.

In some embodiments, the first loop signal includes an input signal of a radio frequency circuit in the closed-loop circuit. An output signal of the radio frequency circuit is applied to an antenna to transmit the first wireless signal. For example, as shown in FIG. 20A, the first loop signal is $RF_{IN}$ signal of closed-loop circuit 421-CPL. An output signal of driver and power amplifier 406 (i.e., the radio frequency circuit) is applied to antenna 402 to transmit the first wireless signal $S_T(f_0)$.

In some embodiments, the first loop signal includes a signal combining the transmission and incoming signals and being fed back to a transmitter in the closed-loop circuit. For example, the first loop signal can be the first SEM signal obtained by the first sensing circuit, coupler 422, including the combination of the transmission and incoming signals.

Figure 20B:
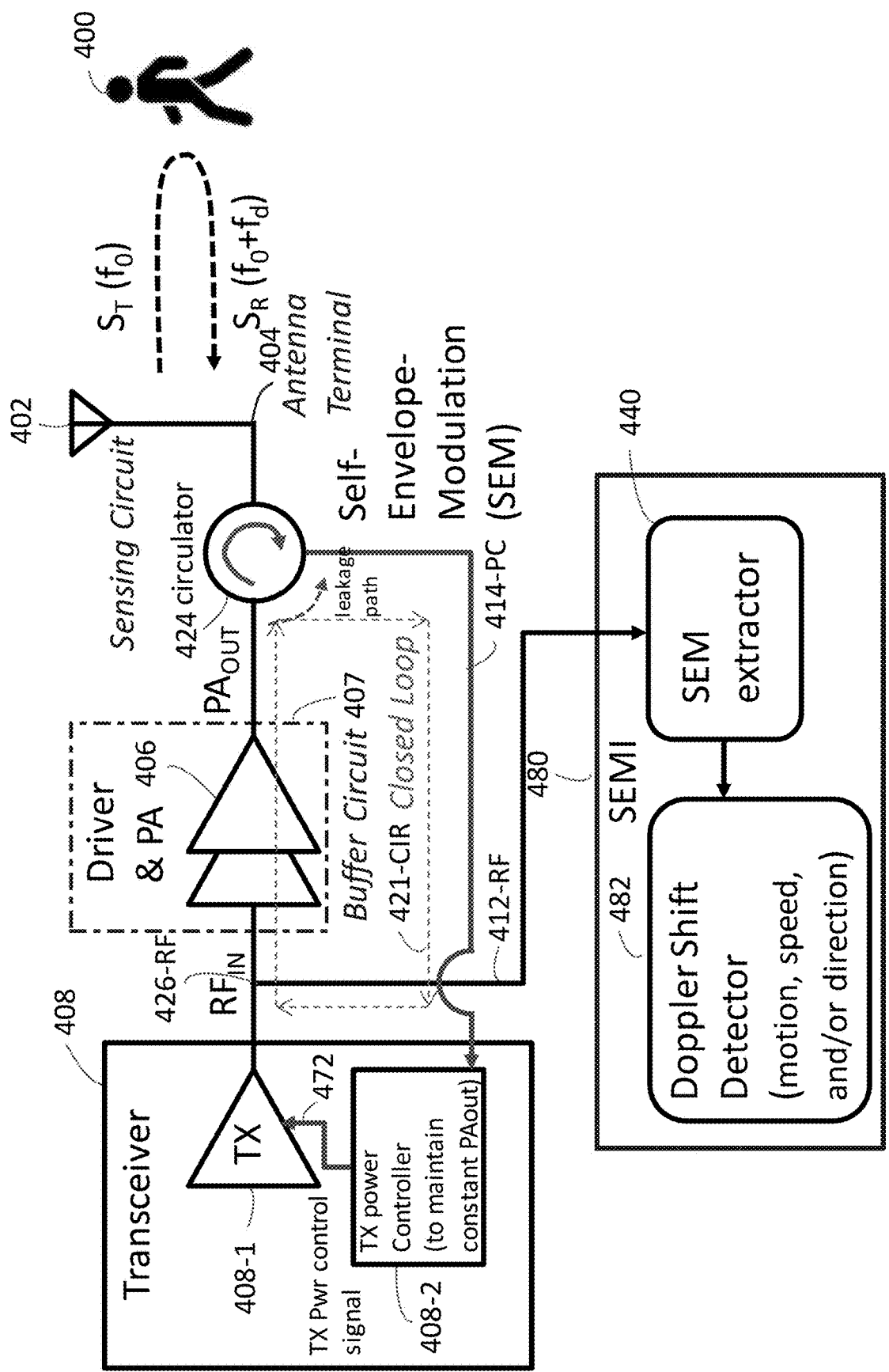
FIG. 20B illustrates an exemplary circuit using a circulator for detecting motion of an object by SEM on a closed-loop circuit, according to some embodiments of the present disclosure.

FIG. 20B illustrates an exemplary circuit using a circulator 424 for detecting motion of person 400 by SEM on a closed-loop circuit 421-CIR, according to some embodiments of the present disclosure. As shown in FIG. 20B, the circuit includes transceiver 408, connection node 426-RF, driver and power amplifier 406 (i.e., a buffer circuit 407), circulator 424 (i.e., a sensing circuit 420), antenna terminal 404, antenna 402, and SEM indicator (SEMI) circuit 480. SEM extractor 440 is configured to operate similar to envelope extraction circuit 240 illustrated and described with reference to FIG. 6A.

One or more of the elements in FIG. 20B may be included for detecting motion of person 400. These elements may be configured to transfer data and send or receive instructions between or among each other. These elements are configured to operate similar to corresponding elements illustrated and described with reference to FIG. 20A, except that circulator 424 of sensing circuit 420 is configured to send a first SEM signal to transmission power controller 408-2.

As shown in FIG. 20B, closed-loop circuit 421-CIR includes transmitter 408-1, connection node 426-RF, driver and power amplifier 406, circulator 426, and transmission power controller 408-2. Circulator 424 of sensing circuit 420 is configured to combine transmission and incoming signals to obtain a first SEM signal, and feed back to transmission power controller 408-2. The remaining operations of closed-loop circuit 421-CIR are as illustrated and described for closed-loop circuit 421-CPL in FIG. 20A.

Figure 21:
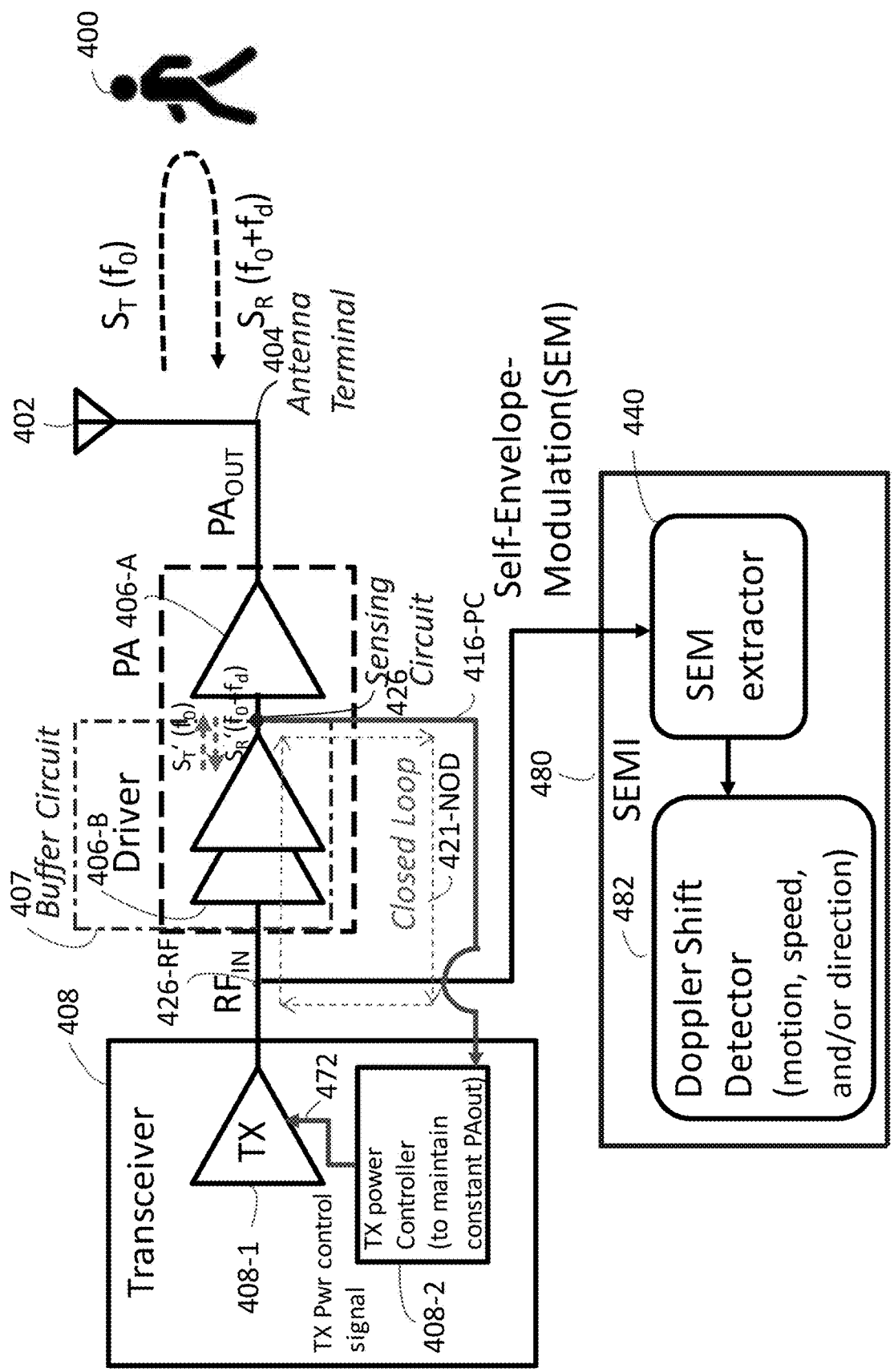
FIG. 21 illustrates an exemplary circuit using a connection node for detecting motion of an object by SEM on a closed-loop circuit, according to some embodiments of the present disclosure.

FIG. 21 illustrates an exemplary circuit using a connection node 426 for detecting motion of person 400 by SEM on a closed-loop circuit 421-NOD, according to some embodiments of the present disclosure. As shown in FIG. 21, the circuit includes transceiver 408, connection node 426-RF, driver 406-B (i.e., a buffer circuit 407), connection node 426 (i.e., a sensing circuit), power amplifier 406-A, antenna terminal 404, antenna 402, and SEM indicator (SEMI) circuit 480. SEM extractor 440 is configured to operate similar to envelope extraction circuit 240 illustrated and described with reference to FIG. 6A.

One or more of the elements in FIG. 21 may be included for detecting motion of person 400. These elements may be configured to transfer data and send or receive instructions between or among each other. These elements are configured to operate similar to corresponding elements illustrated and described with reference to FIG. 20A, except that connection node 426 is configured to send a first SEM signal to transmission power controller 408-2.

As shown in FIG. 21, closed-loop circuit 421-NOD includes transmitter 408-1, connection node 426-RF, buffer circuit 407, connection node 426 (i.e., a sensing circuit), and transmission power controller 408-2. Connection node 426 is configured to combine transmission and incoming signals to obtain the first SEM signal, and feed back to transmission power controller 408-2. The remaining operations of closed-loop circuit 421-NOD are similar to operations of closed-loop circuit 421-CPL illustrated and described with reference to FIG. 20A.

In some embodiments, the first loop signal includes a signal for controlling transmission power of a transmitter in the closed-loop circuit.

Figure 22:
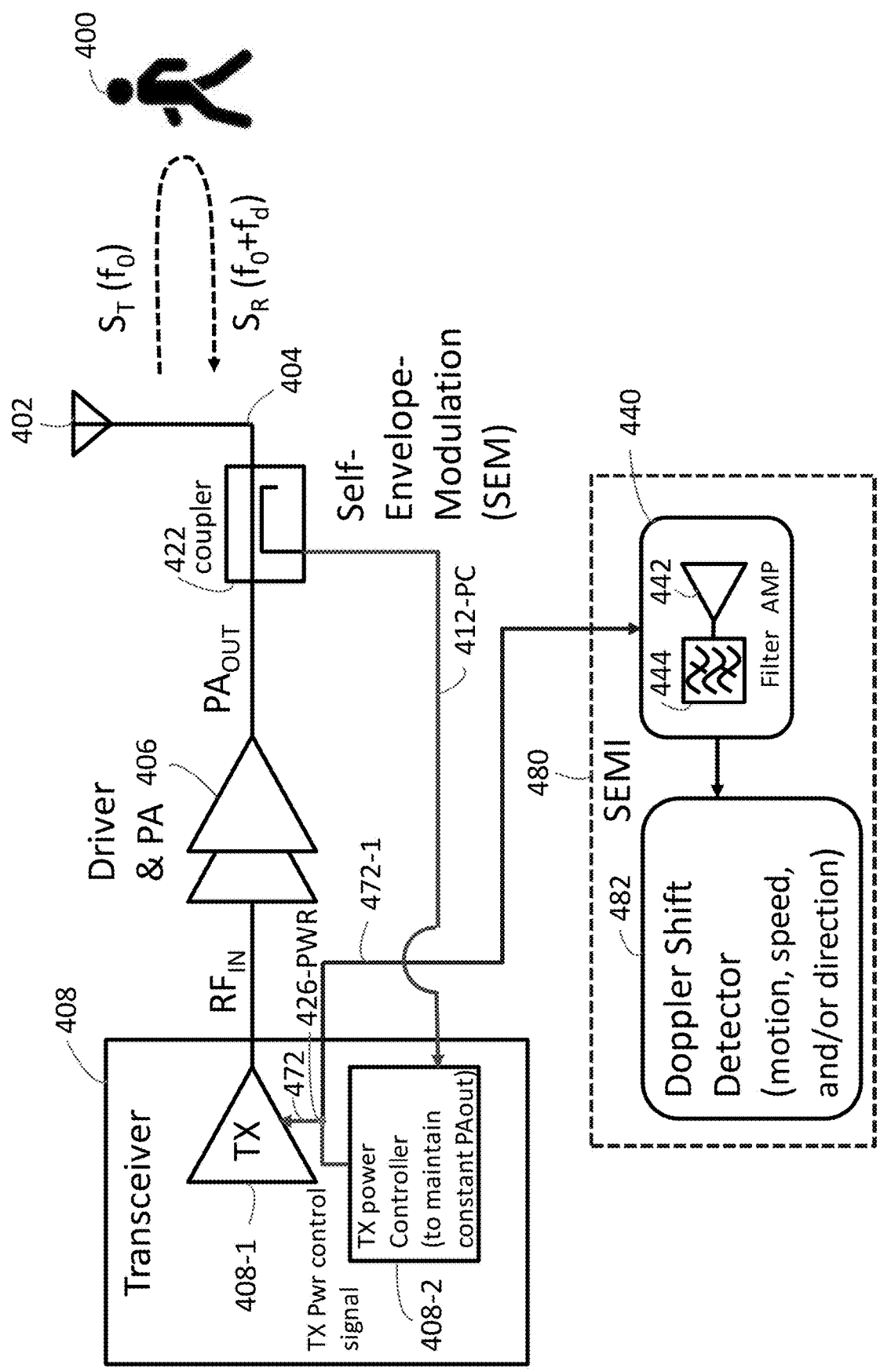
FIG. 22 illustrates an exemplary circuit using a coupler for detecting motion of an object by SEM on a power-control closed-loop circuit, according to some embodiments of the present disclosure.

FIG. 22 illustrates an exemplary circuit using coupler 422 for detecting motion of person 400 by SEM on a power-control closed-loop circuit, according to some embodiments of the present disclosure. As shown in FIG. 22, the circuit includes transceiver 408, a connection node 426-PWR, driver and power amplifier 406 (i.e., a buffer circuit 407), coupler 422 (i.e., a sensing circuit 420), antenna terminal 404, antenna 402, and SEM indicator (SEMI) circuit 480. SEMI 480 includes SEM extractor 440 and Doppler shift detector 482. SEM extractor 440 includes an amplifier 442 and a filter 444. Alternatively, SEM extractor 440 can include circuits for envelope extraction, such as circuits described with reference to FIGS. 5A, 5B, 5C, and 5D.

One or more of the elements in FIG. 22 may be included for detecting motion of person 400. These elements may be configured to transfer data and send or receive instructions between or among each other. These elements are configured to operate similar to corresponding elements illustrated and described with reference to FIG. 20A, except that connector node 426-PWR is configured to obtain an SEM signal from a transmission power control signal 472.

As shown in FIG. 22, a power-control closed-loop circuit includes transmitter 408-1, connection node 426-PWR, driver and power amplifier 406, coupler 422, and transmission power controller 408-2. Coupler 422 is configured to combine transmission and incoming signals to obtain a first SEM signal, and feed back to transmission power controller 408-2. Connector node 426-PWR is configured to obtain a second SEM signal from transmission power control signal 472 and send the second SEM signal to SEM extractor 440. The remaining operations of power-control closed-loop circuit are as illustrated and described for closed-loop circuit 421-CPL in FIG. 20A.

Figure 23:
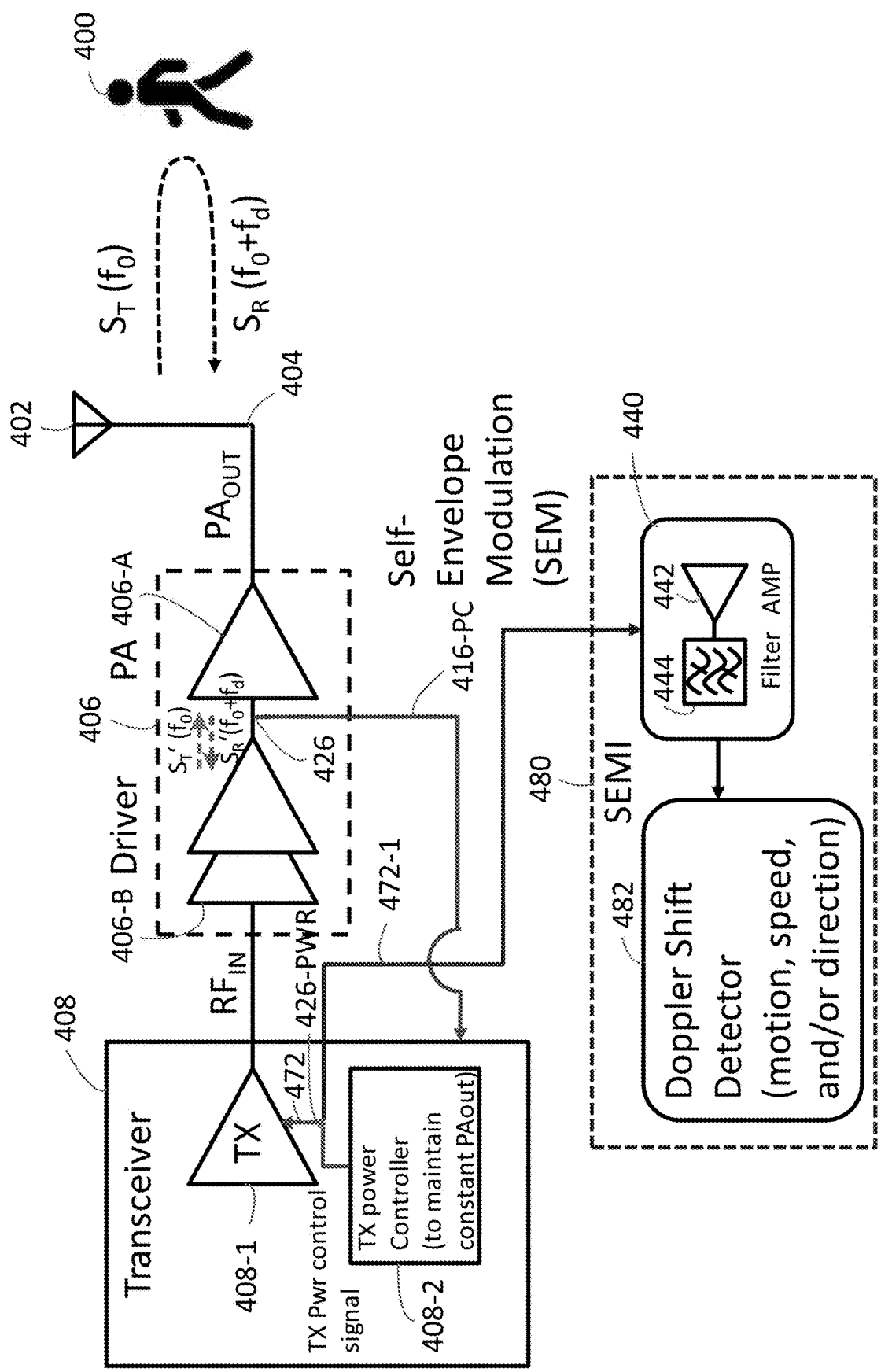
FIG. 23 illustrates an exemplary circuit using a connection node for detecting motion of an object by SEM on a power-control closed-loop circuit, according to some embodiments of the present disclosure.

FIG. 23 illustrates an exemplary circuit using a connection node 426 for detecting motion of person 400 by SEM on a power-control closed-loop circuit, according to some embodiments of the present disclosure. As shown in FIG. 23, the circuit includes transceiver 408, connection node 426-PWR, driver 406-B and power amplifier 406-A, connection node 426 (i.e., a sensing circuit), antenna terminal 404, antenna 402, and SEM indicator (SEMI) circuit 480.

One or more of the elements in FIG. 23 may be included for detecting motion of person 400. These elements may be configured to transfer data and send or receive instructions between or among each other. These elements are configured to operate as illustrated and described in FIG. 21, except that connector node 426-PWR is configured to obtain an SEM signal from transmission power control signal 472.

As shown in FIG. 23, a power-control closed-loop circuit includes transmitter 408-1, connection node 426-PWR, driver and power amplifier 406, connection node 426, and transmission power controller 408-2. Connection node 426 is configured to combine transmission and incoming signals to obtain a first SEM signal, and feed back to transmission power controller 408-2. Connector node 426-PWR is configured to obtain a second SEM signal from transmission power control signal 472 and send the second SEM signal to SEM extractor 440. The remaining operations of power-control closed-loop circuit are as illustrated and described for closed-loop circuit 421-NOD in FIG. 21.

As illustrated in FIGS. 22 and 23, the first loop signal includes transmission power control signal 472 for controlling transmission power of transmitter 408-1 in the power-control closed-loop circuit.

In some embodiments, the first loop signal includes a signal for controlling a gain of a power amplifier. An output signal of the power amplifier is applied to an antenna to transmit the first wireless signal.

Figure 24:
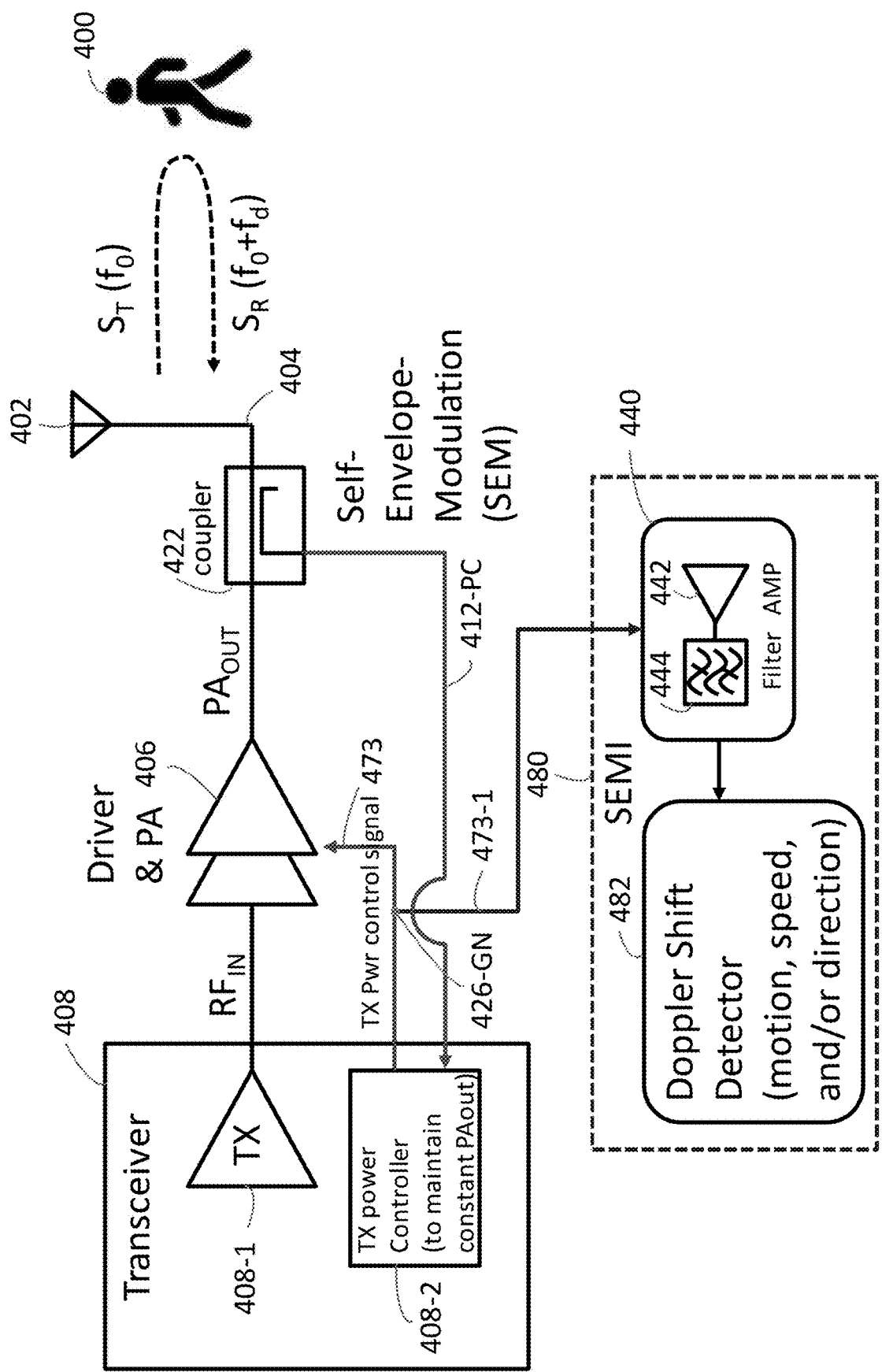
FIG. 24 illustrates an exemplary circuit using a coupler for detecting motion of an object by SEM on a power-control closed-loop circuit, according to some embodiments of the present disclosure.

FIG. 24 illustrates an exemplary circuit using a coupler 422 for detecting motion of person 400 by SEM on a power-control closed-loop circuit, according to some embodiments of the present disclosure. As shown in FIG. 24, the circuit includes transceiver 408, a connection node 426-GN, driver and power amplifier 406 (i.e., a buffer circuit), coupler 422 (i.e., a sensing circuit), antenna terminal 404, antenna 402, and SEM indicator (SEMI) circuit 480.

One or more of the elements in FIG. 24 may be included for detecting motion of person 400. These elements may be configured to transfer data and send or receive instructions between or among each other. These elements are configured to operate similar to corresponding elements illustrated and described with reference to FIG. 22, except that connector node 426-GN is configured to obtain an SEM signal from a transmission power control signal 473.

As shown in FIG. 24, a power-control closed-loop circuit includes transmitter 408-1, connection node 426-GN, driver and power amplifier 406, coupler 422, and transmission power controller 408-2. Coupler 422 is configured to combine transmission and incoming signals to obtain a first SEM signal, and feed back to transmission power controller 408-2. Connector node 426-GN is configured to obtain a second SEM signal from transmission power control signal 473 and send the second SEM signal to SEM extractor 440. The remaining operations of power-control closed-loop circuit are as illustrated and described for closed-loop circuit 421-CPL in FIG. 20A.

Figure 25:
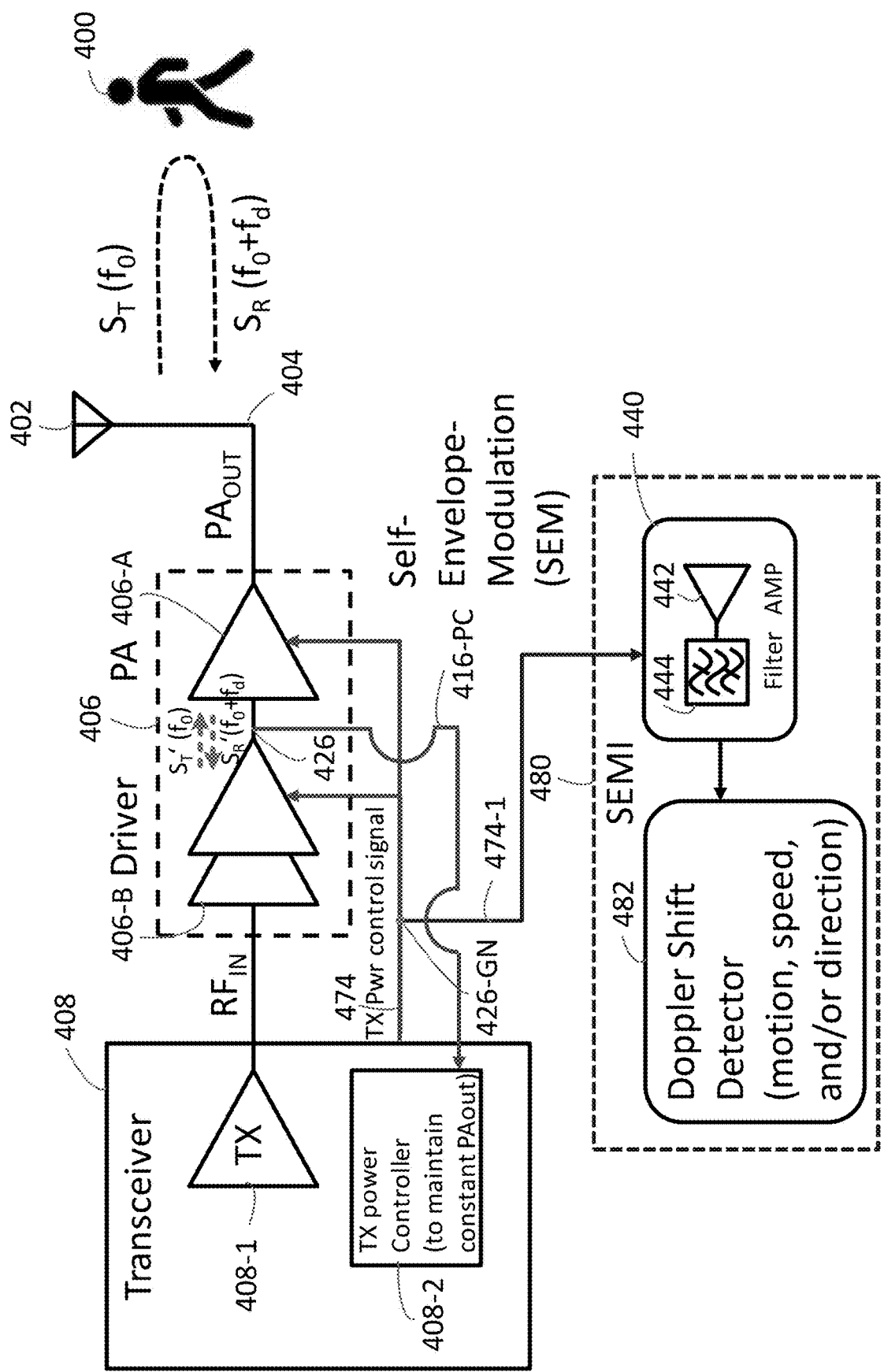
FIG. 25 illustrates an exemplary circuit using a connection node for detecting motion of an object by SEM on a power-control closed-loop circuit, according to some embodiments of the present disclosure.

FIG. 25 illustrates an exemplary circuit using a connection node 426 for detecting motion of person 400 by SEM on a power-control closed-loop circuit, according to some embodiments of the present disclosure. As shown in FIG. 25, the circuit includes transceiver 408, connection node 426-GN, driver 406-B and power amplifier 406-A, connection node 426 (i.e., a sensing circuit), antenna terminal 404, antenna 402, and SEM indicator (SEMI) circuit 480.

One or more of the elements in FIG. 25 may be included for detecting motion of person 400. These elements may be configured to transfer data and send or receive instructions between or among each other. These elements are configured to operate similar to corresponding elements illustrated and described with reference to FIG. 23, except that connector node 426-GN is configured to obtain an SEM signal from a transmission power control signal 473.

As shown in FIG. 25, a power-control closed-loop circuit includes transmitter 408-1, connection node 426-GN, driver and power amplifier 406, connection node 426, and transmission power controller 408-2. Connection node 426 is configured to combine transmission and incoming signals to obtain a first SEM signal, and feed back to transmission power controller 408-2. Connector node 426-GN is configured to obtain a second SEM signal from transmission power control signal 473 and send the second SEM signal to SEM extractor 440. The remaining operations of power-control closed-loop circuit are similar to operations of closed-loop circuit 421-NOD illustrated and described with reference to FIG. 21.

As illustrated in FIGS. 24 and 25, the first loop signal includes transmission power control signal 473 for controlling a gain of driver and power amplifier 406 in FIG. 24, or a gain of driver 406-B and power amplifier 406-A in FIG. 25. An output signal of power amplifier 406 or 406-A is applied to antenna 402 to transmit the first wireless signal.

In some embodiments, the first loop signal includes a signal combining the transmission and incoming signals and being fed back to a transmitter in the closed-loop circuit.

Figure 26:
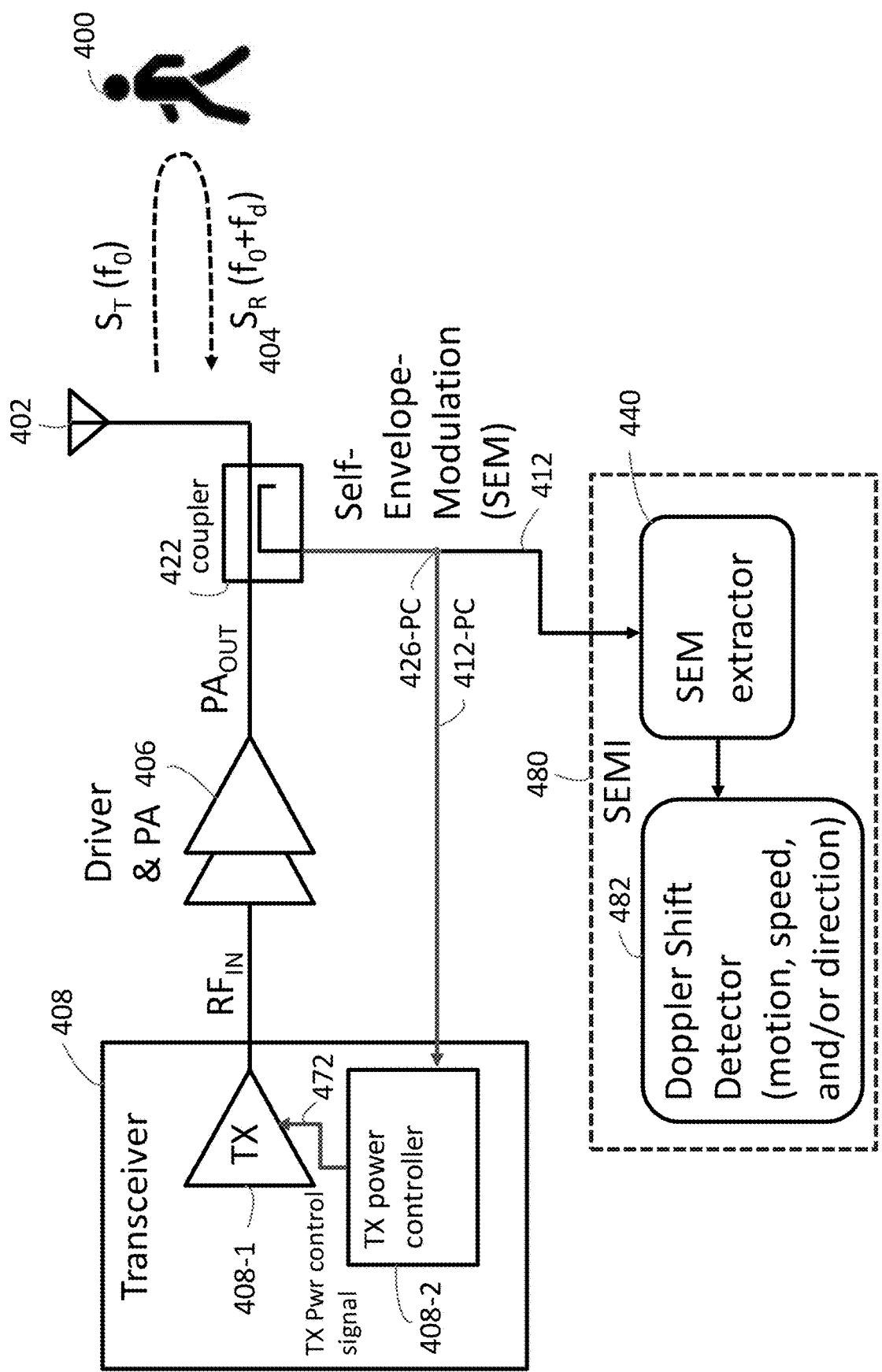
FIG. 26 illustrates an exemplary circuit using a coupler for detecting motion of an object by SEM on a power-control closed-loop circuit, according to some embodiments of the present disclosure.

FIG. 26 illustrates an exemplary circuit using coupler 422 for detecting motion of person 400 by SEM on a power-control closed-loop circuit, according to some embodiments of the present disclosure. As shown in FIG. 26, the circuit includes transceiver 408, connection node 426-PC, driver and power amplifier 406 (i.e., a buffer circuit), coupler 422 (i.e., a sensing circuit), antenna terminal 404, antenna 402, and SEM indicator (SEMI) circuit 480.

One or more of the elements in FIG. 26 may be included for detecting motion of person 400. These elements may be configured to transfer data and send or receive instructions between or among each other. These elements are configured to operate similar to corresponding elements illustrated and described with reference to FIG. 22, except that connector node 426-PC is configured to obtain an SEM signal from connection 412-PC, which is a feedback from coupler 422 to transmission power controller 408-2.

As shown in FIG. 26, a power-control closed-loop circuit includes transmitter 408-1, connection node 426-PC, driver and power amplifier 406, coupler 422, and transmission power controller 408-2. Coupler 422 is configured to combine transmission and incoming signals to obtain a first SEM signal, and feed back to transmission power controller 408-2 through connection 412-PC. Connector node 426-PC is configured to obtain a second SEM signal from connection 412-PC and send the second SEM signal to SEM extractor 440. The second SEM signal from connection 412-PC is the first SEM signal. The remaining operations of power-control closed-loop circuit are as illustrated and described for closed-loop circuit 421-CPL in FIG. 20A.

Figure 27:
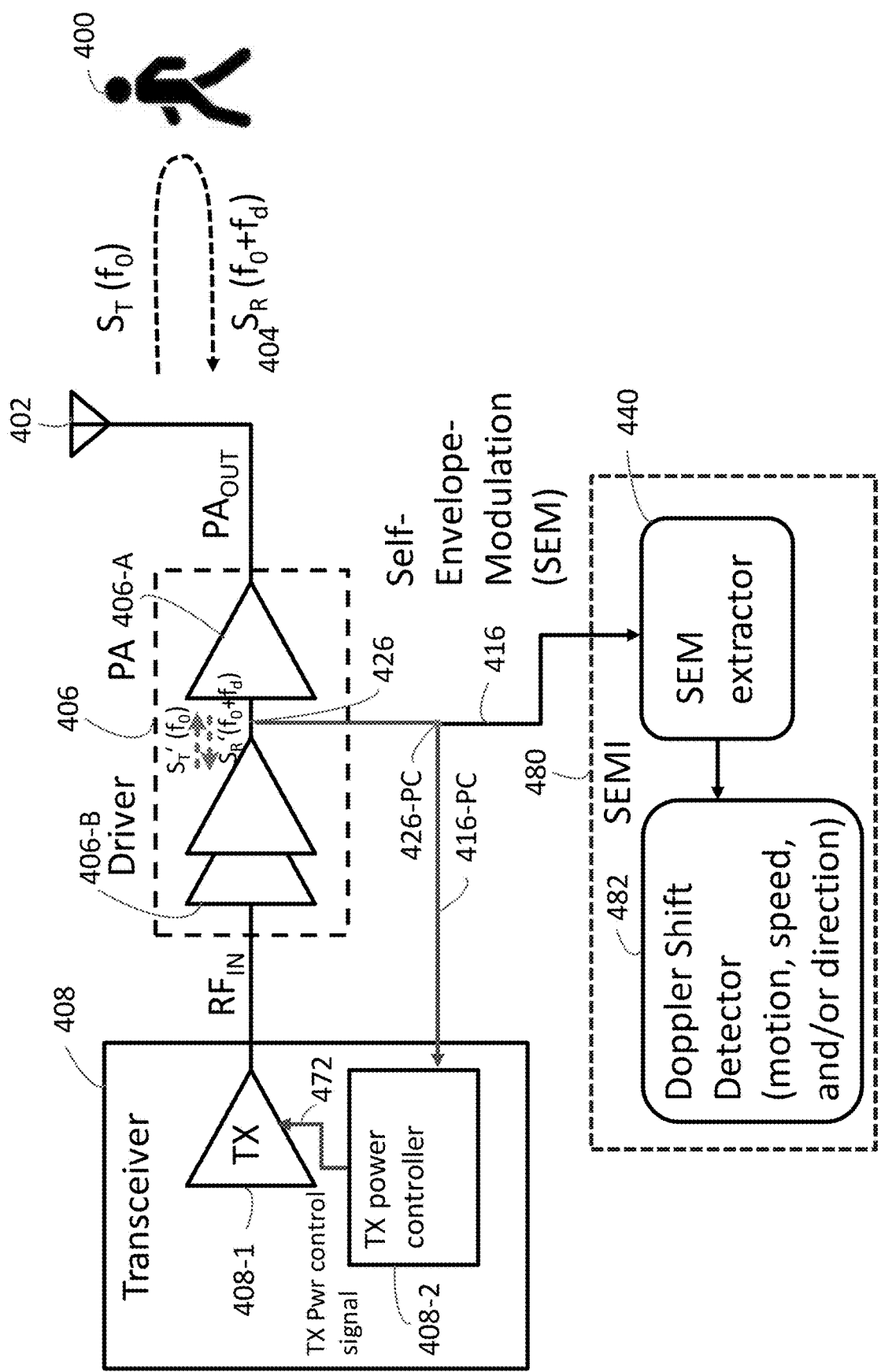
FIG. 27 illustrates an exemplary circuit using a connection node for detecting motion of an object by SEM on a power-control closed-loop circuit, according to some embodiments of the present disclosure.

FIG. 27 illustrates an exemplary circuit using connection node 426 for detecting motion of person 400 by SEM on a power-control closed-loop circuit, according to some embodiments of the present disclosure. As shown in FIG. 27, the circuit includes transceiver 408, connection node 426-PC, driver 406-B and power amplifier 406-A, connection node 426 (i.e., a sensing circuit), antenna terminal 404, antenna 402, and SEM indicator (SEMI) circuit 480.

One or more of the elements in FIG. 27 may be included for detecting motion of person 400. These elements may be configured to transfer data and send or receive instructions between or among each other. These elements are configured to operate similar to corresponding elements illustrated and described with reference to FIG. 23, except that connector node 426-PC is configured to obtain an SEM signal from connection 416-PC, which is a feedback from connection node 426 to transmission power controller 408-2.

As shown in FIG. 27, a power-control closed-loop circuit includes transmitter 408-1, connection node 426-PC, driver and power amplifier 406, connection node 426, and transmission power controller 408-2. Connection node 426 is configured to combine transmission and incoming signals to obtain a first SEM signal, and feed back to transmission power controller 408-2 through connection 416-PC. Connector node 426-PC is configured to obtain a second SEM signal from connection 416-PC and send the second SEM signal to SEM extractor 440. The second SEM signal from connection 416-PC is the first SEM signal. The remaining operations of power-control closed-loop circuit are as illustrated and described for closed-loop circuit 421-NOD in FIG. 21.

As illustrated in FIGS. 26 and 27, the first loop signal includes a signal, from connection node 426-PC, combining the transmission and incoming signals and being fed back to a transmitter in the power-control closed-loop circuit In some embodiments, obtaining the modulation signal of step 320 of method 300 includes obtaining the modulation signal from a first loop signal of a power amplification and linearization loop circuit. A second loop signal of the power amplification and linearization loop circuit includes the combination of the transmission and incoming signals.

Figure 28:
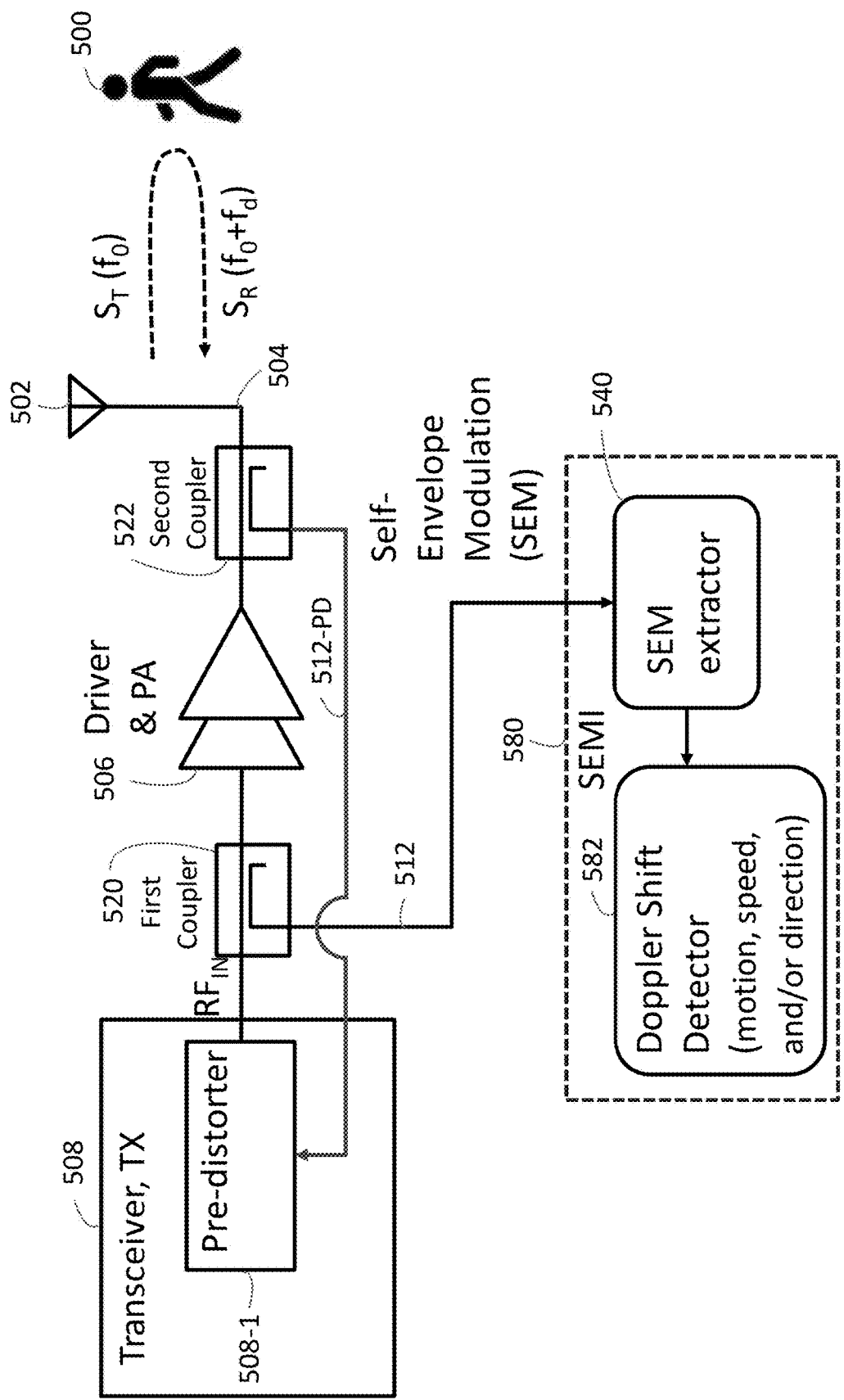
FIG. 28 illustrates an exemplary circuit using a coupler for detecting motion of an object by SEM on a power amplification and linearization loop circuit, according to some embodiments of the present disclosure.

FIG. 28 illustrates an exemplary circuit using a coupler 522 for detecting motion of person 500 by SEM on a power amplification and linearization loop circuit, according to some embodiments of the present disclosure. As shown in FIG. 28, the circuit includes a transceiver 508, a first coupler 520 (i.e., a sensing circuit), a driver and power amplifier 506 (i.e., a buffer circuit), a second coupler 522 (i.e., a sensing circuit), an antenna terminal 504, an antenna 502, and a SEM indicator (SEMI) circuit 580. Transceiver 508 includes a pre-distorter 508-1. SEMI 580 includes a SEM extractor 540 and a Doppler shift detector 582.

One or more of the elements in FIG. 28 may be included for detecting motion of person 500. These elements may be configured to transfer data and send or receive instructions between or among each other. These elements are configured to operate similar to corresponding elements illustrated and described with reference to FIG. 17A, except that coupler 522 is configured to send a sensed SEM signal to pre-distorter 508-1, not to SEM extractor 540.

As shown in FIG. 28, a power amplification and linearization loop circuit includes pre-distorter 508-1, coupler 520, driver and power amplifier 506, and coupler 522. Coupler 522 is configured to combine transmission and incoming signals to obtain a first SEM signal, and feed back to pre-distorter 508-1. The first SEM signal can propagate through pre-distorter 508-1 to transceiver 508. Transceiver 508 is configured to pre-distort a transmission signal based on the first SEM signal. Thus, transceiver 508 is configured to transmit a transmission signal including the first SEM signal. Coupler 520 at the $RF_{IN}$ is configured to sense the transmission signal to obtain a second SEM signal and send the second SEM signal through connection 516 to SEM extractor 440 for extracting a signal envelope.

As illustrated in FIG. 28, the power amplification and linearization loop circuit includes transceiver 508, coupler 520 (i.e., a second sensing circuit), driver and power amplifier 506 (i.e., a radio frequency circuit), and coupler 522 (i.e., a first sensing circuit). The sensing circuit, coupler 520, is configured to obtain the second SEM signal from $RF_{IN}$ signal of the power amplification and linearization loop circuit. The sensing circuit, coupler 522, is configured to obtain the first SEM signal including the combination of the transmission and incoming signals.

In some embodiments, method 300 further includes pre-distorting, based on the second loop signal, a signal that a transmitter transmits to be the first wireless signal. For example, as illustrated in FIG. 28, transmitter 508 includes a pre-distorter 508-1. Pre-distorter 508-1 is configured to pre-distort, based on the first SEM signal, a transmission signal that transceiver 508 transmits to be the first wireless signal.

In some embodiments, the first loop signal includes an input signal of a radio frequency circuit in the power amplification and linearization loop circuit. An output signal of the radio frequency circuit is applied to an antenna to transmit the first wireless signal. For example, as shown in FIG. 28, the first loop signal is $RF_{IN}$ signal of the power amplification and linearization loop circuit. An output signal of driver and power amplifier 506 (i.e., the radio frequency circuit) is applied to antenna 502 to transmit the first wireless signal $S_T(f_0)$.

Figure 29:
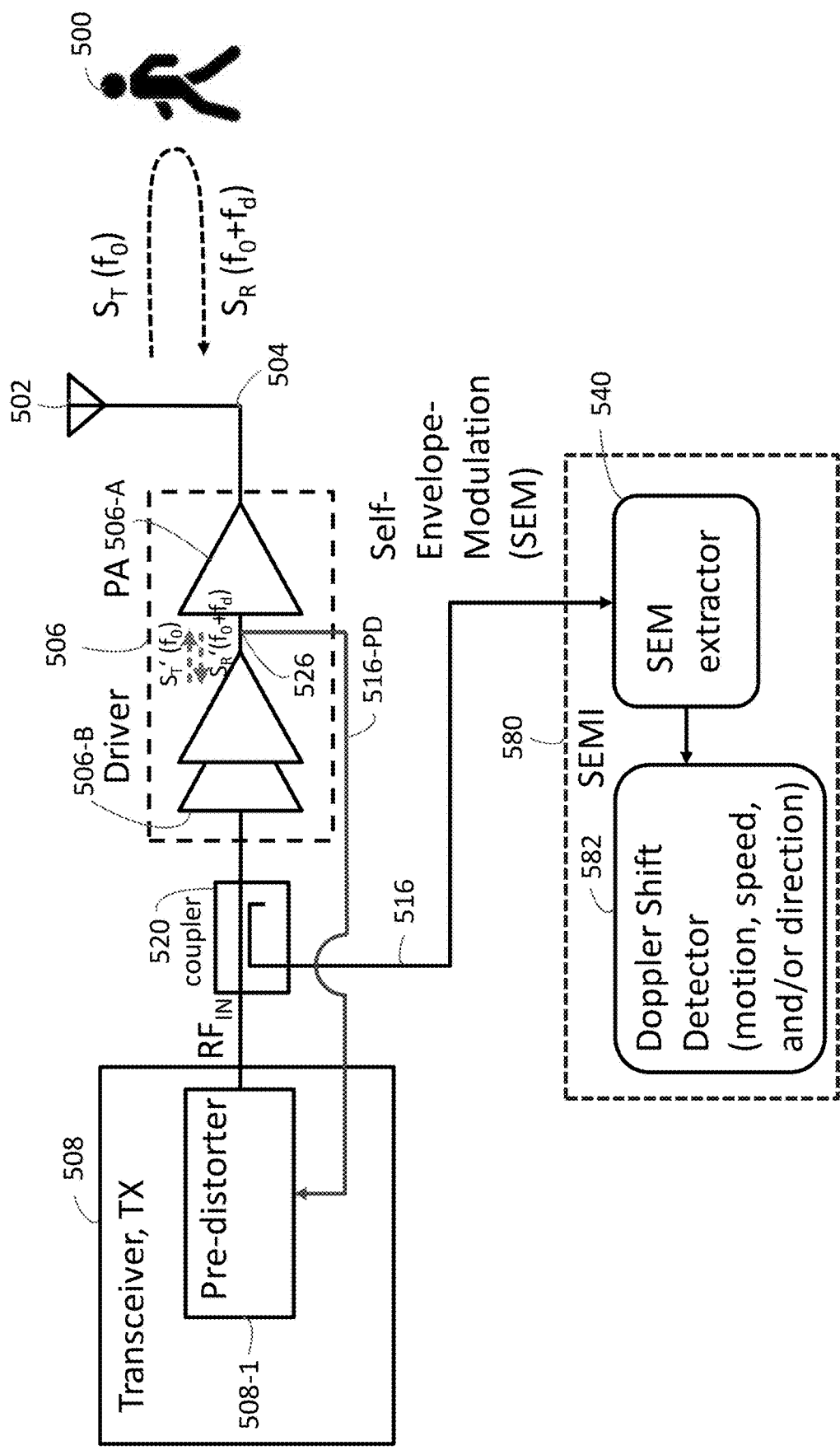
FIG. 29 illustrates an exemplary circuit using a connection node for detecting motion of an object by SEM on a power amplification and linearization loop circuit, according to some embodiments of the present disclosure.

FIG. 29 illustrates an exemplary circuit using a connection node 526 for detecting motion of person 500 by SEM on a power amplification and linearization loop circuit, according to some embodiments of the present disclosure. As shown in FIG. 29, the circuit includes transceiver 508, coupler 520 (i.e., a sensing circuit), a driver 506-B (i.e., a buffer circuit) and a power amplifier 506-A, connection node 526 (i.e., another sensing circuit), antenna terminal 504, antenna 502, and SEM indicator (SEMI) circuit 580.

One or more of the elements in FIG. 29 may be included for detecting motion of person 500. These elements may be configured to transfer data and send or receive instructions between or among each other. These elements are configured to operate similar to corresponding elements illustrated and described with reference to FIG. 18, except that connection node 526 is configured to send a sensed SEM signal to pre-distorter 508-1, not to SEM extractor 540.

As shown in FIG. 29, a power amplification and linearization loop circuit includes pre-distorter 508-1, coupler 520, driver 506-B and power amplifier 506-A, and connection node 526. Connection node 526 is configured to combine transmission and incoming signals to obtain a first SEM signal, and feed back to pre-distorter 508-1. The remaining operations of the power amplification and linearization loop are as illustrated and described for the power amplification and linearization loop circuit in FIG. 28.

In some embodiments, the first loop signal includes a signal for controlling signal pre-distortion in the transmitter.

Figure 30:
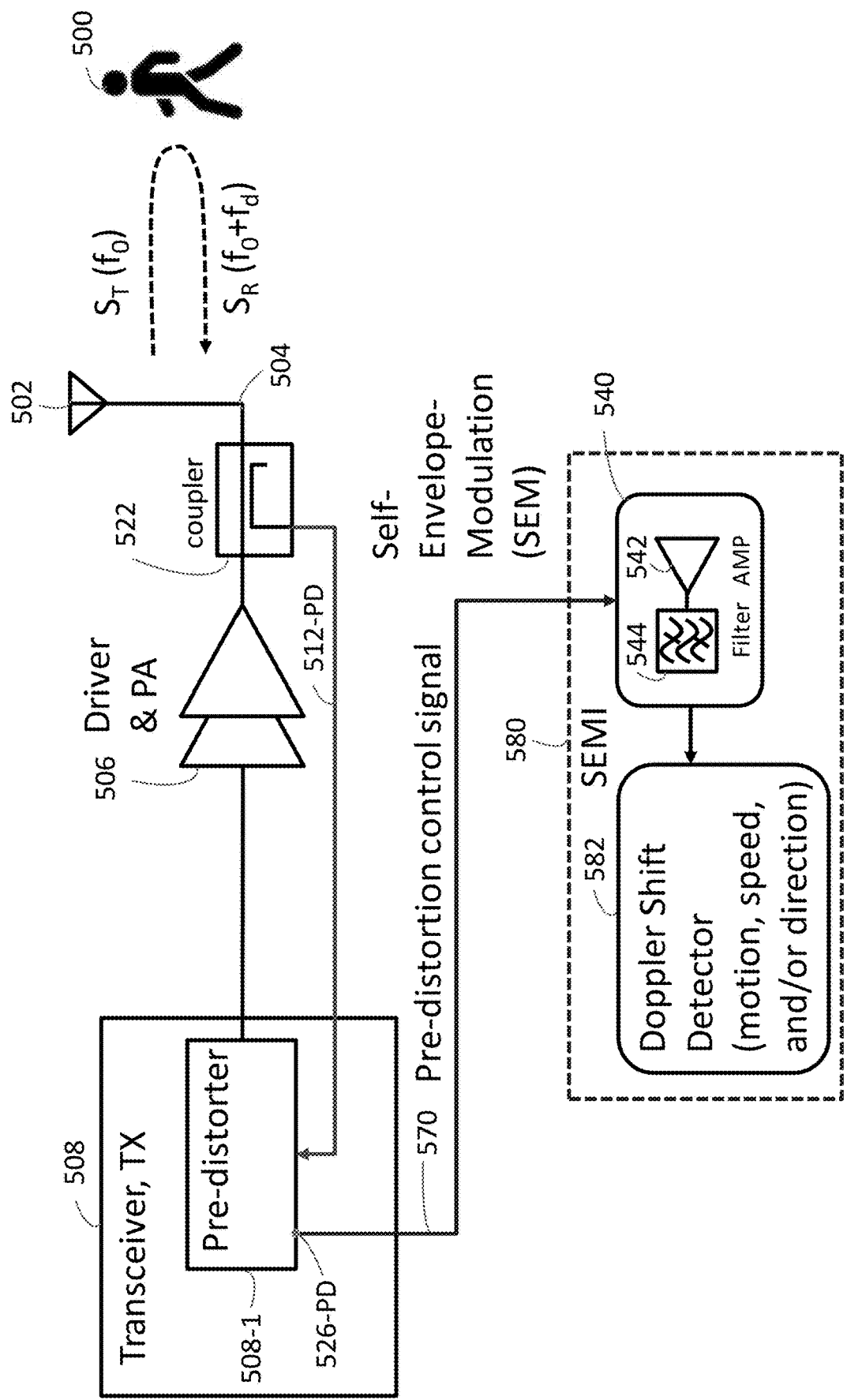
FIG. 30 illustrates an exemplary circuit using a coupler for detecting motion of an object by SEM on a power amplification and linearization loop circuit, according to some embodiments of the present disclosure.

FIG. 30 illustrates an exemplary circuit using coupler 522 for detecting motion of person 500 by SEM on a power amplification and linearization loop circuit, according to some embodiments of the present disclosure. As shown in FIG. 30, the circuit includes transceiver 508, driver and power amplifier 506 (i.e., a buffer circuit), coupler 522 (i.e., a sensing circuit), antenna terminal 504, antenna 502, and SEM indicator (SEMI) circuit 580. Transceiver 508 includes a pre-distorter 508-1 and a connection node 526-PD. SEMI 580 includes SEM extractor 540 and Doppler shift detector 582. SEM extractor 540 includes an amplifier 542 and a filter 544.

One or more of the elements in FIG. 30 may be included for detecting motion of person 500. These elements may be configured to transfer data and send or receive instructions between or among each other. These elements are configured to operate similar to corresponding elements illustrated and described with reference to FIG. 28, except that coupler 520 is not used and that connection node 526-PD is configured to sense a pre-distortion control signal of pre-distorter 508-1 and send it to SEM extractor 540.

As shown in FIG. 30, a power amplification and linearization loop circuit includes pre-distorter 508-1, connection node 526-PD, driver and power amplifier 506, and coupler 522. Coupler 522 is configured to combine transmission and incoming signals to obtain a first SEM signal, and feed back to pre-distorter 508-1. The first SEM signal can propagate through pre-distorter 508-1 to transceiver 508. Transceiver 508 is configured to pre-distort a transmission signal based on the first SEM signal. Thus, a pre-distortion control signal of pre-distorter 508-1 contains the first SEM signal. Connection node 526-PD is configured to sense the pre-distortion control signal of pre-distorter 508-1 to obtain a second SEM signal and send the second SEM signal through connection 570 to SEM extractor 440 for extracting a signal envelope.

Figure 31:
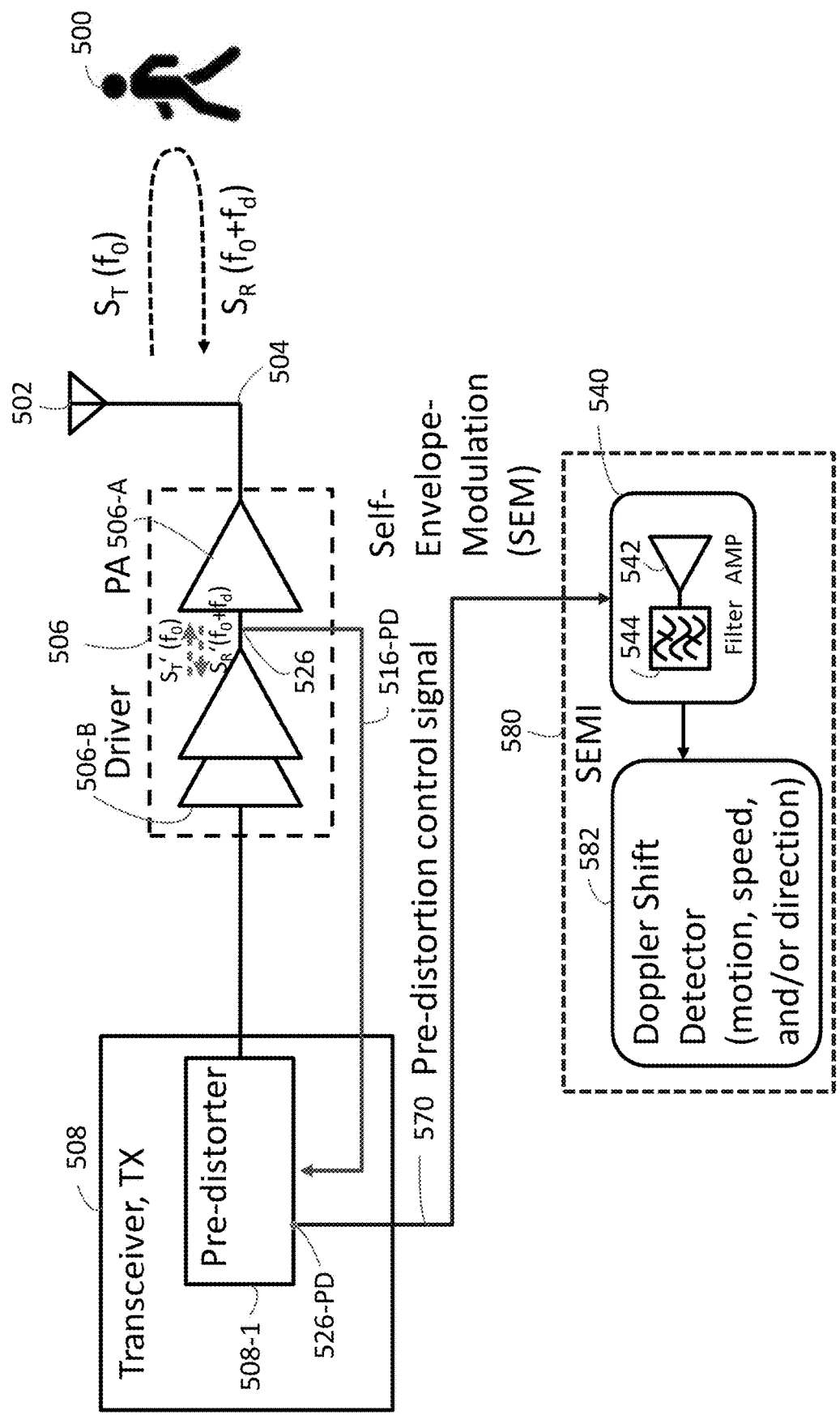
FIG. 31 illustrates an exemplary circuit using a connection node for detecting motion of an object by SEM on a power amplification and linearization loop circuit, according to some embodiments of the present disclosure.

FIG. 31 illustrates an exemplary circuit using connection node 526 for detecting motion of person 500 by SEM on a power amplification and linearization loop circuit, according to some embodiments of the present disclosure. As shown in FIG. 31, the circuit includes transceiver 508, driver 506-B (i.e., a buffer circuit) and power amplifier 506-A, connection node 526 (i.e., a sensing circuit), antenna terminal 504, antenna 502, and SEM indicator (SEMI) circuit 580. Transceiver 508 includes pre-distorter 508-1 and connection node 526-PD. SEMI 480 includes SEM extractor 540 and Doppler shift detector 582. SEM extractor includes amplifier 542 and filter 544.

One or more of the elements in FIG. 31 may be included for detecting motion of person 500. These elements may be configured to transfer data and send or receive instructions between or among each other. These elements are configured to operate as illustrated and described in FIG. 29, except that coupler 520 is not used and that connection node 526-PD is configured to sense a pre-distortion control signal of pre-distorter 508-1 and sent it to SEM extractor 540.

As shown in FIG. 31, a power amplification and linearization loop circuit includes pre-distorter 508-1, connection node 526-PD, driver 506-B and power amplifier 506-A, and connection node 526. Connection node 526 is configured to combine transmission and incoming signals to obtain a first SEM signal, and feed back to pre-distorter 508-1. The first SEM signal can propagate through pre-distorter 508-1 to transceiver 508. Transceiver 508 is configured to pre-distort a transmission signal based on the first SEM signal. Thus, a pre-distortion control signal of pre-distorter 508-1 contains the first SEM signal. Connection node 526-PD is configured to sense the pre-distortion control signal of pre-distorter 508-1 to obtain a second SEM signal and send the second SEM signal through connection 570 to SEM extractor 440 for extracting a signal envelope.

As illustrated in FIGS. 30 and 31, the first loop signal can be the pre-distortion control signal of pre-distorter 508-1, which is for controlling signal pre-distortion in transceiver 508.

In some embodiments, the first loop signal includes a signal combining the transmission and incoming signals and being fed back to the transmitter in the power amplification and linearization loop circuit.

Figure 32:
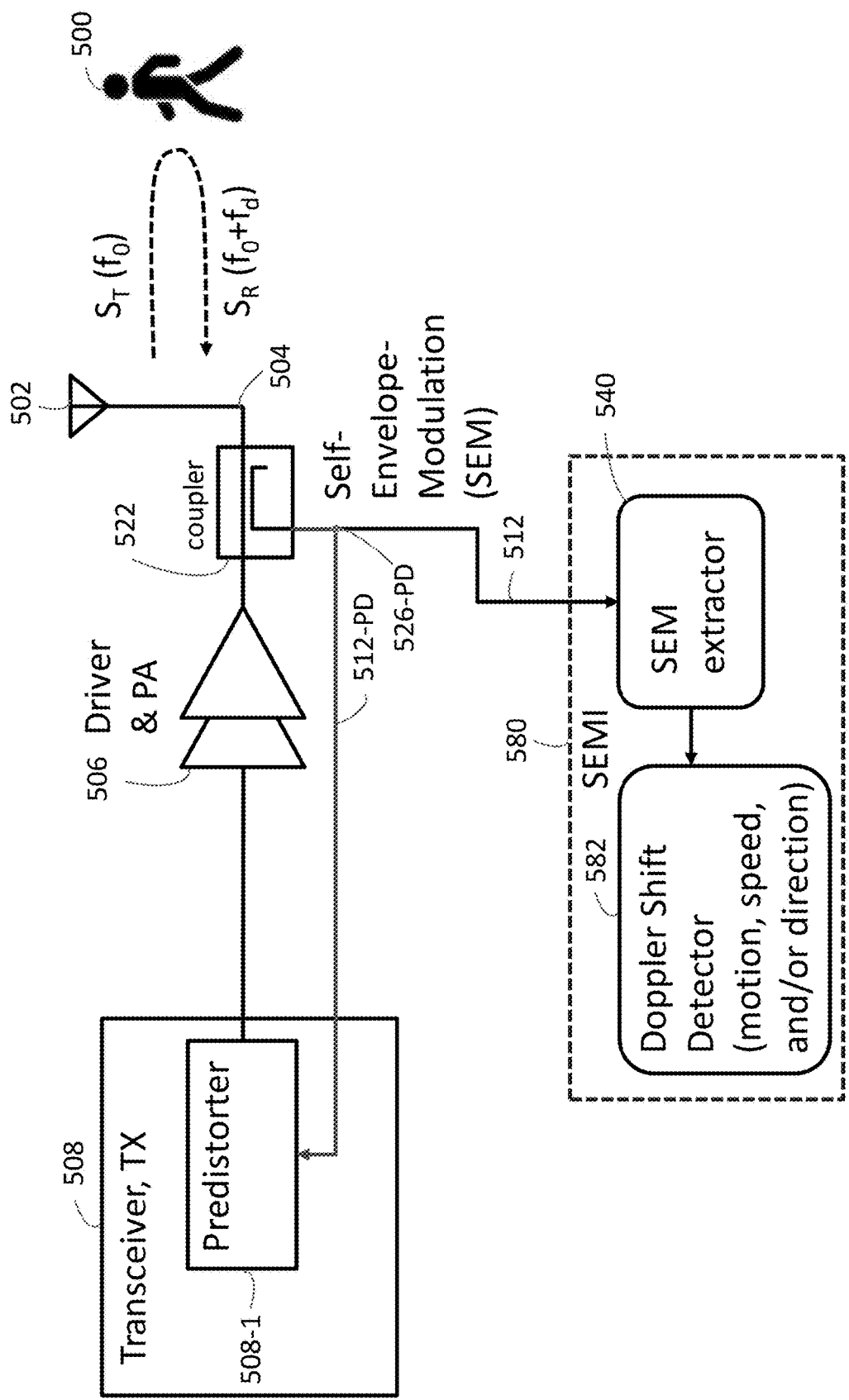
FIG. 32 illustrates an exemplary circuit using a coupler for detecting motion of an object by SEM on a power amplification and linearization loop circuit, according to some embodiments of the present disclosure.

FIG. 32 illustrates an exemplary circuit using coupler 522 for detecting motion of person 500 by SEM on a power amplification and linearization loop circuit, according to some embodiments of the present disclosure. As shown in FIG. 32, the circuit includes transceiver 508, driver and power amplifier 506 (i.e., a buffer circuit), coupler 522 (i.e., a sensing circuit), a connection node 526-PD (i.e., another sensing circuit), antenna terminal 504, antenna 502, and SEM indicator (SEMI) circuit 580. Transceiver 508 includes pre-distorter 508-1. SEMI 480 includes SEM extractor 540 and Doppler shift detector 582.

One or more of the elements in FIG. 32 may be included for detecting motion of person 500. These elements may be configured to transfer data and send or receive instructions between or among each other. These elements are configured to operate similar to corresponding elements illustrated and described with reference to FIG. 30, except that connection node 526-PD is instead configured to sense an SEM signal sensed by coupler 522 and fed back to pre-distorter 508-1 on a connection 512-PD, and send it to SEM extractor 540.

As shown in FIG. 32, a power amplification and linearization loop circuit includes pre-distorter 508-1, driver and power amplifier 506, coupler 522, and connection node 526-PD. Coupler 522 is configured to combine transmission and incoming signals to obtain a first SEM signal, and feed back to pre-distorter 508-1 through connection 512-PD. Connection node 526-PD is configured to sense the first SEM signal on connection 512-PD to obtain a second SEM signal and send the second SEM signal through connection 512 to SEM extractor 440 for extracting a signal envelope.

Figure 33:
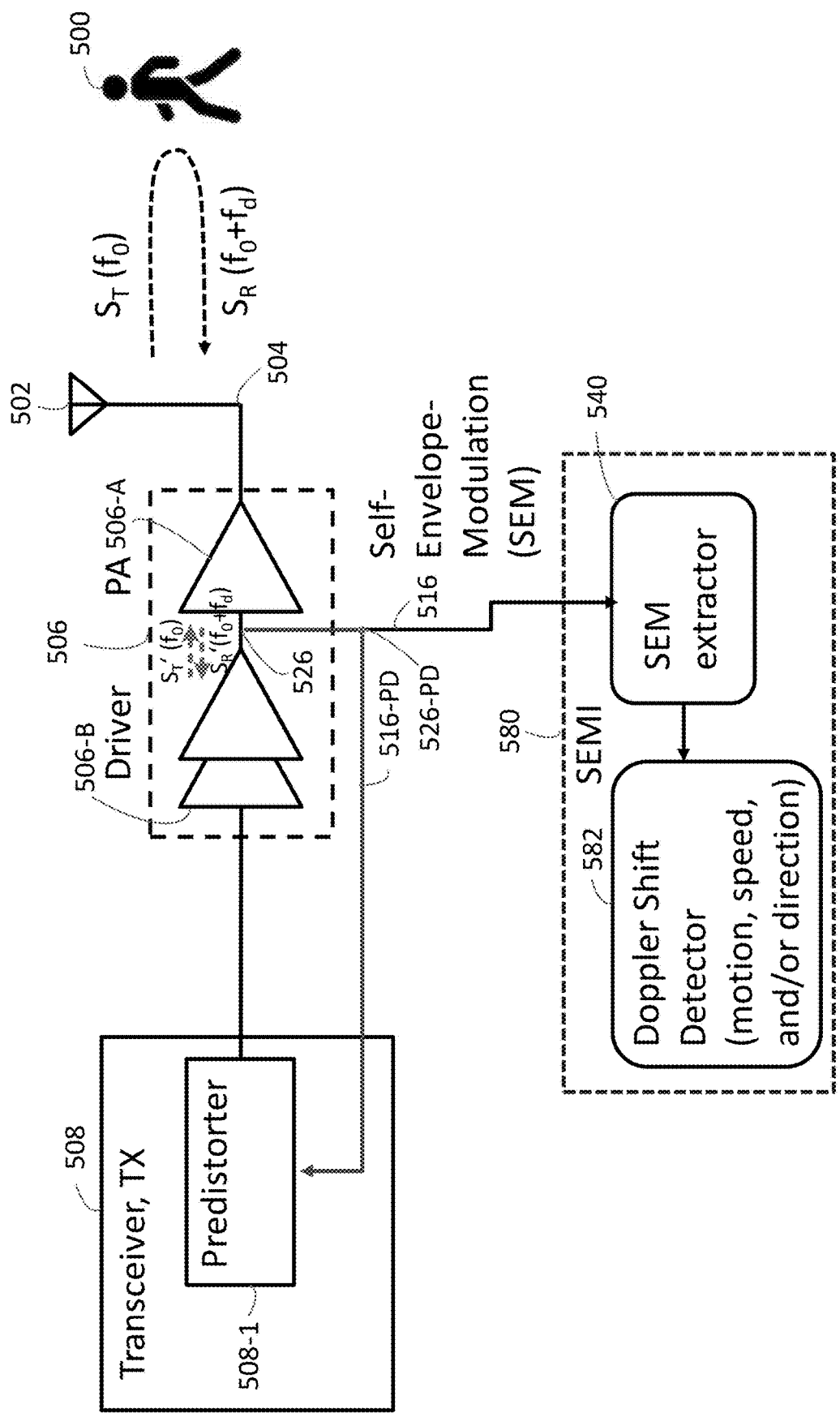
FIG. 33 illustrates an exemplary circuit using a connection node for detecting motion of an object by SEM on a power amplification and linearization loop circuit, according to some embodiments of the present disclosure.

FIG. 33 illustrates an exemplary circuit using a connection node 526 for detecting motion of person 500 by SEM on a power amplification and linearization loop circuit, according to some embodiments of the present disclosure. As shown in FIG. 33, the circuit includes transceiver 508, driver 506-B (i.e., a buffer circuit) and power amplifier 506-A, connection node 526 (i.e., a sensing circuit), connection node 526-PD (i.e., another sensing circuit), antenna terminal 504, antenna 502, and SEM indicator (SEMI) circuit 580. Transceiver 508 includes pre-distorter 508-1 and connection node 526-PD. SEMI 480 includes SEM extractor 540 and Doppler shift detector 582.

One or more of the elements in FIG. 33 may be included for detecting motion of person 500. These elements may be configured to transfer data and send or receive instructions between or among each other. These elements are configured to operate as illustrated and described in FIG. 31, except that coupler 522 is not used and that connection node 526-PD is configured to sense a pre-distortion control signal of pre-distorter 508-1 and sent it to SEM extractor 540.

As shown in FIG. 33, a power amplification and linearization loop circuit includes pre-distorter 508-1, driver 506-B and power amplifier 506-A, connection node 526, and connection node 526-PD. Connection node 526 is configured to combine transmission and incoming signals to obtain a first SEM signal, and feed back to pre-distorter 508-1 through connection 516-PD. Connection node 526-PD is configured to sense the first SEM signal to obtain a second SEM signal and send the second SEM signal through connection 516 to SEM extractor 440 for extracting a signal envelope.

As illustrated in FIGS. 32 and 33, the first loop signal can be the second SEM signal combining the transmission and incoming signals and being fed back to transceiver 508 in the power amplification and linearization loop circuit.

In some embodiments, the incoming signal in method 300 is a first incoming signal, and the second wireless signal in method 300 is a first reflected first wireless signal from the object. Obtaining the modulation signal of step 320 includes combining the transmission and first incoming signals as a sensed signal, and combining the sensed signal and a second incoming signal to obtain the modulation signal. The second incoming signal is obtained from a third wireless signal. The third wireless signal is a second reflected first wireless signal from the object. The first incoming signal is received via a first antenna port. The second incoming signal is received via a second antenna port. The first incoming signal includes a first Doppler shift. The second incoming signal includes a second Doppler shift.

Figure 34:
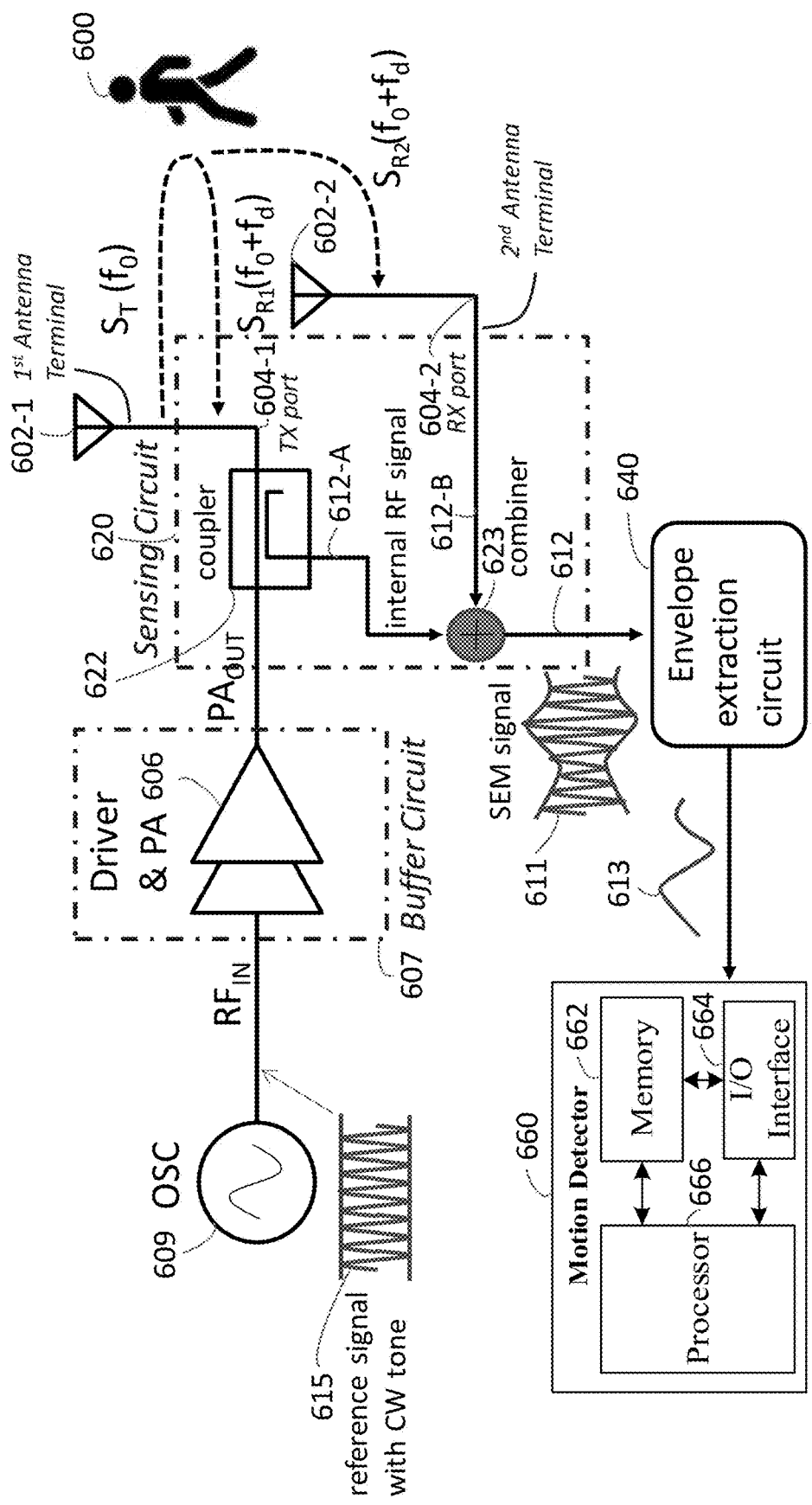
FIG. 34 illustrates an exemplary circuit using a coupler for detecting motion of an object by SEM on two antenna ports, according to some embodiments of the present disclosure.

FIG. 34 illustrates an exemplary circuit using a coupler 620 for detecting motion of person 600 by SEM on two antenna ports, according to some embodiments of the present disclosure. As shown in FIG. 34, the circuit includes an oscillator 609, a buffer circuit 607, a sensing circuit 620, antenna terminals 604-1 and 604-2, antennae 602-1 and 602-2, an envelope extraction circuit 640, and a motion detector 660. Buffer circuit 607 includes a driver and power amplifier (PA) 606. Sensing circuit 620 includes a coupler 622 and a combiner 623. Motion detector 660 includes a memory 662, a I/O interface 664, and a processor 666. One or more of these elements in FIG. 34 may be included for detecting motion of person 600. These elements may be configured to transfer data and send or receive instructions between or among each other. These elements are configured to operate similar to corresponding elements illustrated and described with reference to FIG. 6A.

A transmission chain in FIG. 34 is configured to transmit wireless signal $S_T(f_0)$ toward person 600. When person 600 is moving, the transmitted wireless signal $S_T(f_0)$ is reflected by person 600 as a first reflected wireless signal $S_{R1}(f_0+f_d)$ and a second reflected wireless signal $S_{R2}(f_0+f_d)$. The first reflected wireless signal $S_{R1}(f_0+f_d)$ is received by antenna 602-1 and enters the transmission chain as a first incoming signal. The second reflected wireless signal $S_{R2}(f_0+f_d)$ is received by antenna 602-2, enters antenna terminal 604-2, and is a second incoming signal 612-B.

Coupler 622 of sensing circuit 620 is configured to couple a transmission signal from $PA_{OUT}$ to the first incoming signal as a sensed signal 612-A. Combiner 623 of sensing circuit 620 is configured to combine sensed signal 612-A and second incoming signal 612-B as a SEM signal 611, and send the SEM signal 611 through connection 612 to envelope extraction circuit 640.

The first incoming signal is received via antenna terminal 604-1, which is a transmission port. The second incoming signal is received via antenna terminal 604-2, which is a reception port.

As illustrated in FIG. 34, the first reflected wireless signal $S_{R1}(f_0+f_d)$, received via antenna 602-1, enters the transmission chain as a first incoming signal. Coupler 622 of sensing circuit 620 is configured to combine the transmission and first incoming signals as a sensed signal. The second incoming signal 612-B, is obtained via antenna 602-2, is obtained from the second reflected wireless signal $S_{R2}(f_0+f_d)$ from person 600. Combiner 623 of sensing circuit 620 is configured to combine the sensed signal and a second incoming signal to obtain modulation signal 611.

The first incoming signal is received via the transmission port at antenna terminal 604-1. The second incoming signal 612-B is received via the reception port at antenna terminal 604-2.

The first incoming signal includes a first Doppler shift $f_d$ from the first reflected wireless signal $S_{R1}(f_0+f_d)$. The second incoming signal includes a second Doppler shift $f_d$ from the second reflected wireless signal $S_{R2}(f_0+f_d)$. The first and second Doppler shifts can be the same or different, depending on locations of antenna 602-1 and 602-2.

FIGS. 35A, 35B, and 35C illustrate exemplary antenna port configurations for detecting motion of person 600 by SEM on two antenna ports, according to some embodiments of the present disclosure. FIG. 35A illustrate a first type of antenna port configuration. In FIG. 35A, a transmission port 605-1 is connected to antenna terminal 604-1 and antenna 602-1. A reception port 605-2 is connected to antenna terminal 604-2 and antenna 602-2. FIG. 35B illustrate a second type of antenna port configuration. In FIG. 35B, a transmission port 605-1 and a reception port 605-2 are coupled to an antenna 602-3. FIG. 35C illustrate a third type of antenna port configuration. In FIG. 35C, a transmission port 605-1 is connected to port 624-1 of circulator 624. A port 624-2 of circulator 624 is connected to antenna terminal 604 and antenna 602. A reception port 605-2 is connected to a port 624-3 of circulator 624. All of these antenna port configurations can be applied to the circuit in FIG. 34 to receive two incoming signals.

In some embodiments, method 300 further includes amplifying the second incoming signal. Combining the sensed and second incoming signals of method 300 includes combining the sensed signal and the amplified second incoming signal to obtain the modulation signal.

Figure 36:
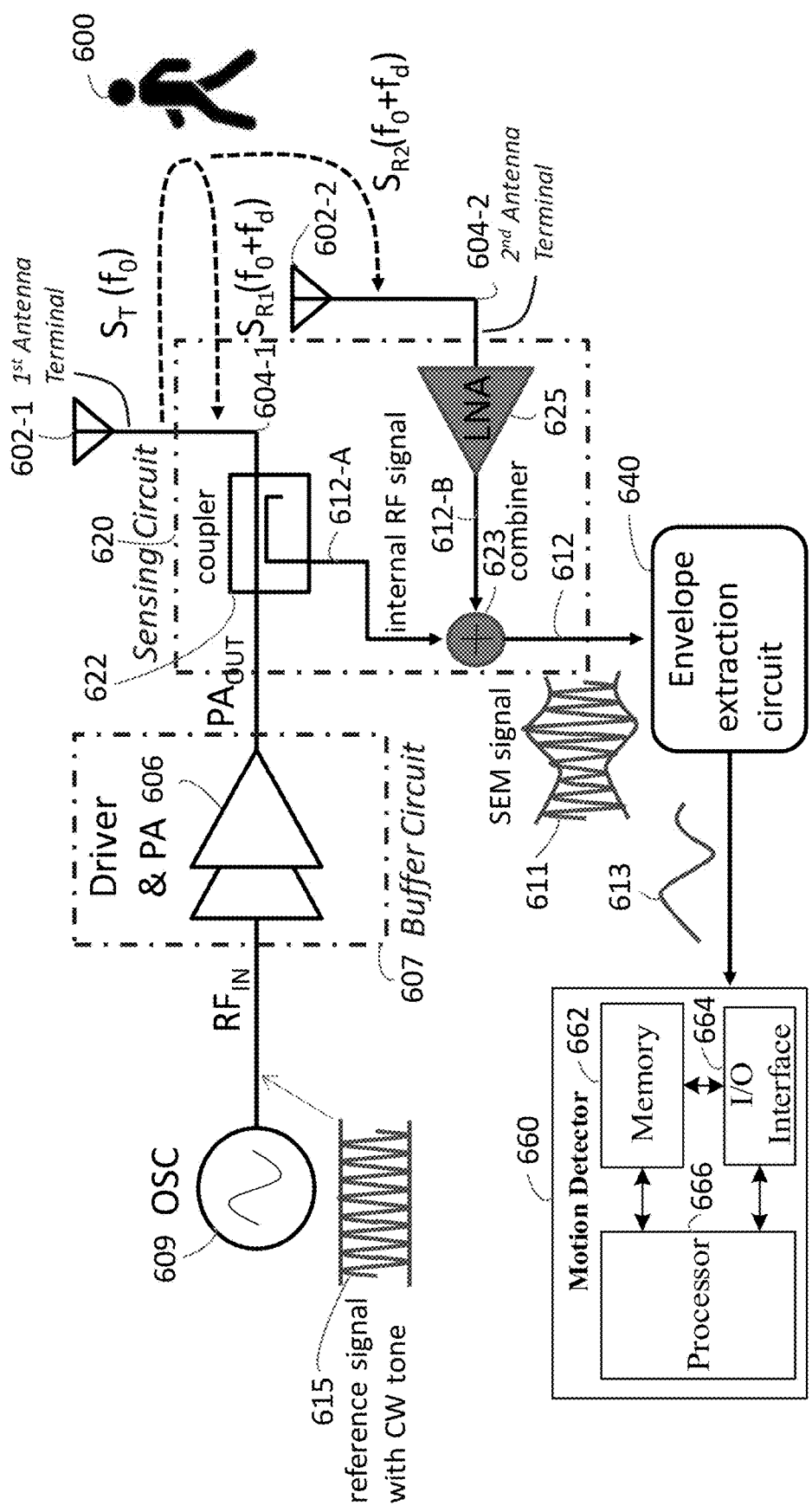
FIG. 36 illustrates an exemplary circuit using an amplifier for detecting motion of an object by SEM on two antenna ports, according to some embodiments of the present disclosure.

FIG. 36 illustrates an exemplary circuit using an amplifier 625 for detecting motion of person 600 by SEM on two antenna ports, according to some embodiments of the present disclosure. As shown in FIG. 36, the circuit includes oscillator 609, buffer circuit 607, sensing circuit 620, antenna terminals 604-1 and 604-2, antennae 602-1 and 602-2, envelope extraction circuit 640, and motion detector 660. Sensing circuit 620 includes coupler 622, combiner 623, and low noise amplifier (LNA) 625. One or more of the elements in FIG. 36 may be included for detecting motion of person 600. These elements may be configured to transfer data and send or receive instructions between or among each other.

These elements are configured to operate similar to corresponding elements illustrated and described with reference to FIG. 34, except LNA 625 of sensing circuit 620 is configured to amplify the second incoming signal 612-B. Combiner 623 of sensing circuit 620 is configured to combine sensed signal 612-A and amplified second incoming signal 612-B to obtain SEM signal 611.

As illustrated in FIG. 36, sensing circuit 620 further includes LNA 625. LNA 625 is configured to amplify second incoming signal 612-B. Combiner 623 of sensing circuit 620 is configured to combine sensed signal 612-A and amplified second incoming signal 612-B to obtain SEM signal 611.

In some embodiments, the modulation signal in method 300 is a first modulation signal. The signal envelope in method 300 is a first signal envelope. The Doppler shift in method 300 is a first Doppler shift. Method 300 further includes shifting a phase of the sensed signal, obtaining a second modulation signal by combining the phase-shifted sensed signal and the second incoming signal, extracting a second signal envelope varied by a second Doppler shift from the second modulation signal, and determining whether motion of the object is detected in accordance with the first and second signal envelopes.

Figure 37:
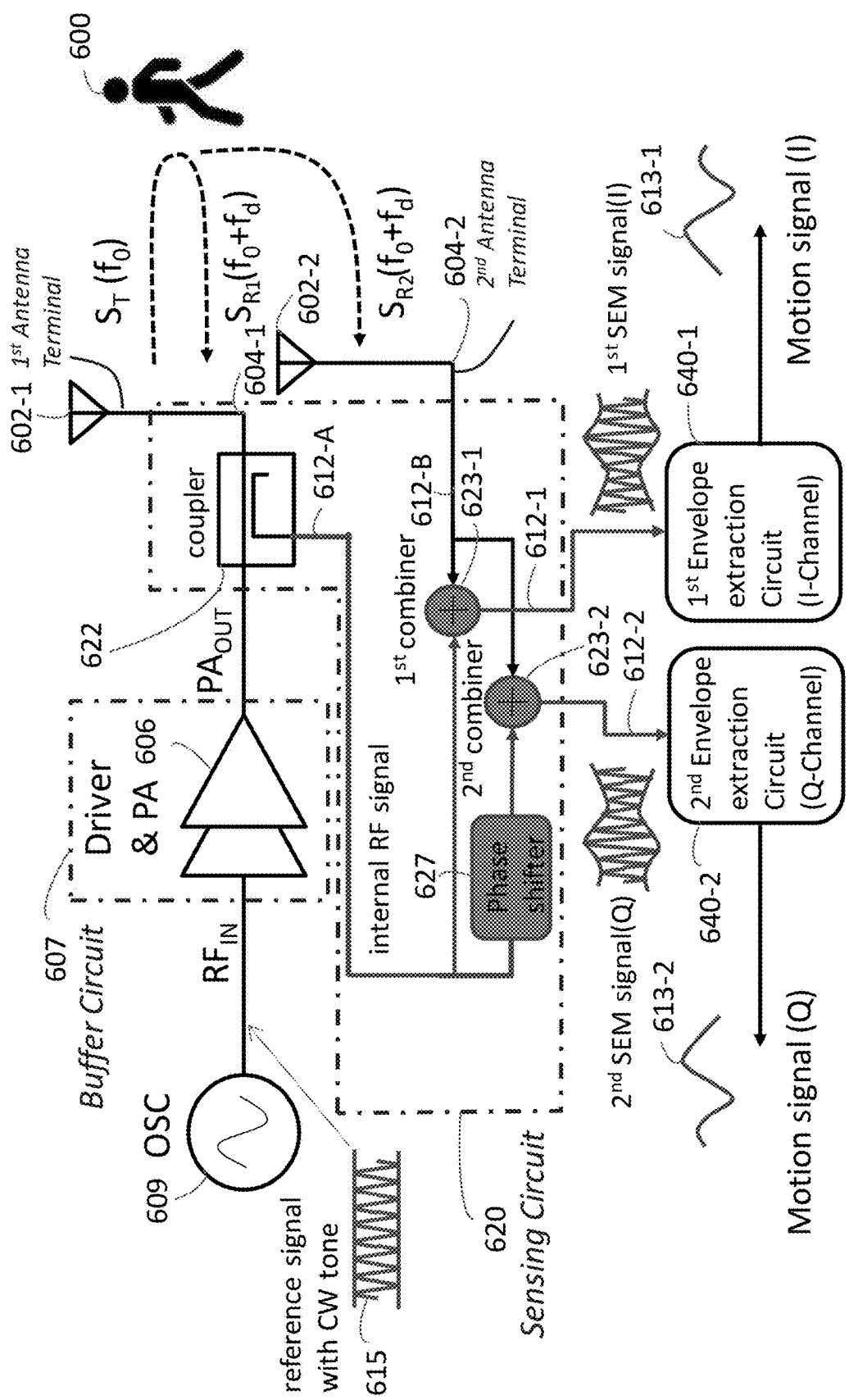
FIG. 37 illustrates an exemplary circuit using a phase shifter for detecting motion of an object by SEM on two antenna ports, according to some embodiments of the present disclosure.

FIG. 37 illustrates an exemplary circuit using a phase shifter 627 for detecting motion of person 600 by SEM on two antenna ports, according to some embodiments of the present disclosure. As shown in FIG. 37, the circuit includes oscillator 609, buffer circuit 607, sensing circuit 620, antenna terminals 604-1 and 604-2, antennae 602-1 and 602-2, and envelope extraction circuits 640-1 and 640-2. Sensing circuit 620 includes coupler 622, combiners 623-1 and 623-2, and a phase shifter 627. The circuit of FIG. 37 further includes a motion detector, which is not shown therein. One or more of these elements in FIG. 37 may be included for detecting motion of person 200. These elements may be configured to transfer data and send or receive instructions between or among each other.

These elements are configured to operate similar to corresponding elements illustrated and described with reference to FIG. 34. Combiner 623-1 of sensing circuit 620 is configured to combine sensed signal 612-A and second incoming signal 612-B to obtain a first SEM signal, as combiner 623 in FIG. 34. Envelope extraction circuits 640-1 is configured to extract a first signal envelope 613-1 from the first SEM signal. Signal envelope 613-1 is varied by a first Doppler shift from the first reflected wireless signal $S_{R1}(f_0+f_d)$.

Phase shifter 627 is configured to shift a phase of sensed signal 612-A and send the phase-shifted sensed signal 612-A to combiner 623-2. Combiner 623-2 is configured to combine phase-shifted sensed signal 612-A and second incoming signal 612-B to obtain a second SEM signal. Envelope extraction circuit 640-2 is configured to extract a second signal envelope 613-2 from the second SEM signal. Signal envelope 613-2 is varied by a second Doppler shift from the second reflected wireless signal $S_{R2}(f_0+f_d)$.

The circuit of FIG. 37 further includes a motion detector configured to determine whether motion of person 600 is detected in accordance with first and second signal envelopes 613-1 and 613-3. When one of first and second signal envelopes 613-1 and 613-3 contains a varied envelope, the motion detector is configured to determine that motion of person 600 is detected.

As shown in FIG. 37, combiner 623-1 is a first combiner. Envelope extraction circuit 640-1 is a first envelope extraction circuit. SEM signal obtain by combiner 623-1 is a first modulation signal. Signal envelope 613-1 is a first signal envelope. The Doppler shift is a first Doppler shift. Sensing circuit 620 includes phase shifter 627 configured to shift a phase of sensed signal 612-A. Sensing circuit 620 includes combiner 623-2 configured to combine phase-shifted sensed signal 612-A and second incoming signal 612-B to obtain a second modulation signal. Envelope extraction circuit 640-2 is configured to extract second signal envelope 613-2 varied by the second Doppler shift from the second reflected wireless signal $S_{R2}(f_0+f_d)$. The motion detector is configured to determine whether motion of person 600 is detected in accordance with first and second signal envelopes 613-1 and 613-2.

In some embodiments, obtaining the modulation signal of method 300 includes combining the transmission and incoming signals. The transmission signal is an input signal of a radio frequency circuit, and an output signal of the radio frequency circuit is applied to a first antenna port for transmitting the first wireless signal. The incoming signal is obtained from the second wireless signal via a second antenna port.

Figure 38:
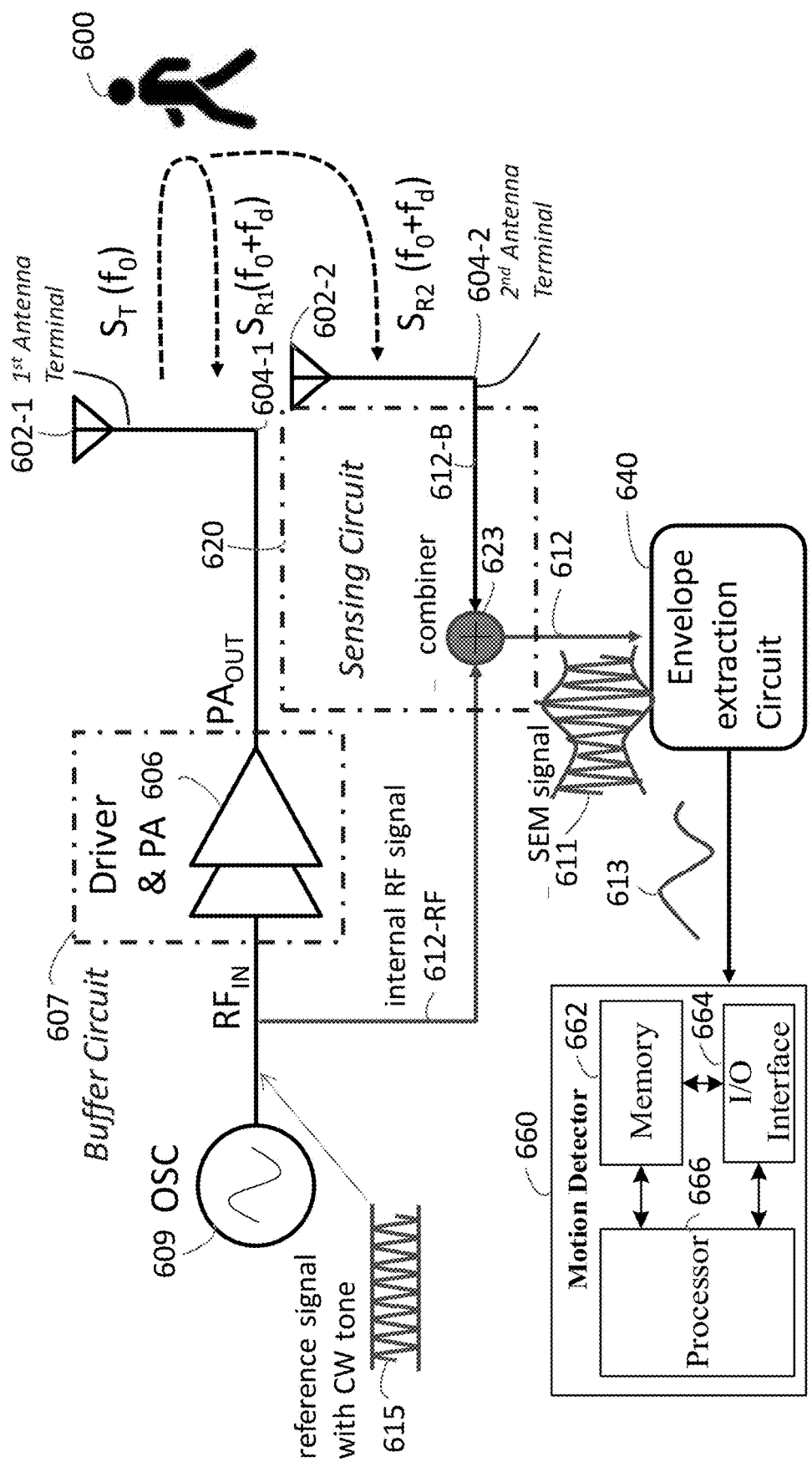
FIG. 38 illustrates an exemplary circuit using a combiner for detecting motion of an object by SEM on two antenna ports, according to some embodiments of the present disclosure.

FIG. 38 illustrates an exemplary circuit using a combiner 623 for detecting motion of person 600 by SEM on two antenna ports, according to some embodiments of the present disclosure. As shown in FIG. 38, the circuit includes oscillator 609, buffer circuit 607, sensing circuit 620, antenna terminals 604-1 and 604-2, antennae 602-1 and 602-2, envelope extraction circuit 640, and motion detector 660. Sensing circuit 620 includes combiner 623. One or more of these elements in FIG. 38 may be included for detecting motion of person 600. These elements may be configured to transfer data and send or receive instructions between or among each other. These elements are configured to operate similar to corresponding elements illustrated and described with reference to FIG. 6A.

A transmission chain in FIG. 38 is configured to transmit wireless $S_T(f_0)$ toward person 600. When person 600 is moving, the transmitted wireless signal $S_T(f_0)$ is reflected by person 600 as a first reflected wireless signal $S_{R1}(f_0+f_d)$ and a second reflected wireless signal $S_{R2}(f_0+f_d)$. The first reflected wireless signal $S_{R1}(f_0+f_d)$ is received by antenna 602-1 and enter the transmission chain as a first incoming signal. The second reflected wireless signal $S_{R2}(f_0+f_d)$ is received by antenna 602-2, enter antenna terminal 604-2, and be a second incoming signal 612-B.

Combiner 623 of sensing circuit 220 is configured to combine an $RF_{IN}$ signal, i.e., 612-RF, of the transmission chain and second incoming signal 612-B as a SEM signal 611, and send the SEM signal 611 through connection 612 to envelope extraction circuit 640. The $RF_{IN}$ signal is a transmission signal and an input signal of driver and power amplifier 606 (i.e., a radio frequency circuit). An output signal of driver and power amplifier 606 (i.e., the radio frequency circuit) is applied to antenna terminal 604-1 for antenna 602-1 to transmit the first wireless signal. Second incoming signal 612-B is obtained from the second reflected wireless signal $S_{R2}(f_0+f_d)$, which is received via antenna terminal 602-2 and antenna terminal 604-2.

As illustrated in FIG. 38, sensing circuit 620 includes combiner 623 configured to combine a transmission signal $RF_{IN}$ (i.e., 612-RF) and second incoming signal 612-B to obtain SEM signal 611. The $RF_{IN}$ transmission signal is an input signal of driver and power amplifier 606 (i.e., a radio frequency circuit). An output signal of driver and power amplifier 606 (i.e., the radio frequency circuit) is applied to antenna terminal 604-1 and antenna 602-1 for transmitting the first wireless signal $S_T(f_0)$. Second incoming signal 612-B is obtained from the second reflected wireless signal $S_{R2}(f_0+f_d)$, which is received via antenna 602-2 and antenna terminal 604-2.

In some embodiments, method 300 further includes amplifying the incoming signal. The combination of the transmission and incoming signals includes combining the transmission signal and the amplified incoming signal to obtain the modulation signal.

Figure 39:
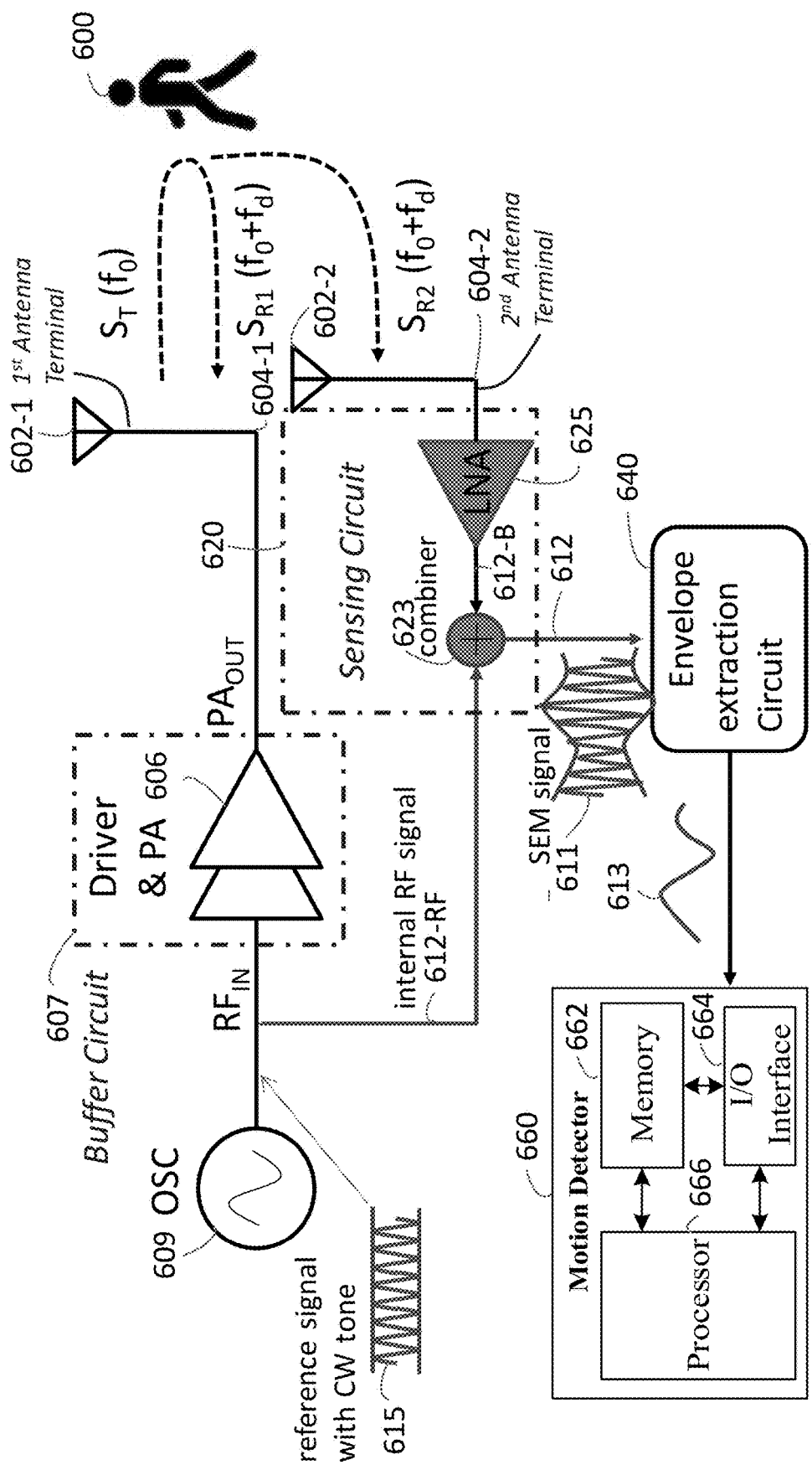
FIG. 39 illustrates an exemplary circuit using an amplifier and a combiner for detecting motion of an object by SEM on two antenna ports, according to some embodiments of the present disclosure.

FIG. 39 illustrates an exemplary circuit using amplifier 625 and combiner 623 for detecting motion of person 600 by SEM on two antenna ports, according to some embodiments of the present disclosure. As shown in FIG. 39, the circuit includes oscillator 609, buffer circuit 607, sensing circuit 620, antenna terminals 604-1 and 604-2, antennae 602-1 and 602-2, envelope extraction circuit 640, and motion detector

660. Sensing circuit 620 includes low noise amplifier 625 and combiner 623. One or more of the elements in FIG. 39 may be included for detecting motion of person 200. These elements may be configured to transfer data and send or receive instructions between or among each other.

These elements are configured to operate as illustrated and described in FIG. 38, except LNA 625 of sensing circuit 620 is configured to amplify the second incoming signal 612-B. Combiner 623 of sensing circuit 620 is configured to combine transmission signal $RF_{IN}$ (i.e., 612-RF) and amplified second incoming signal 612-B to obtain SEM signal 611.

As illustrated in FIG. 39, sensing circuit 620 further includes LNA 625. LNA 625 is configured to amplify second incoming signal 612-B. Combiner 623 of sensing circuit 620 is configured to combine transmission signal $RF_{IN}$ i.e., 612-RF) and amplified second incoming signal 612-B to obtain SEM signal 611.

In some embodiments, the modulation signal in method 300 is a first modulation signal. The signal envelope in method 300 is a first signal envelope. The Doppler shift in method 300 is a first Doppler shift. Method 300 further includes obtaining a second modulation signal by combining a source signal and the incoming signal, the source signal being obtained from an oscillator; extracting a second signal envelope varied by a second Doppler shift from the second modulation signal; and determining whether motion of the object is detected in accordance with the first and second signal envelopes. In some embodiments, the transmission signal is an in-phase signal. The source signal is a quadrature signal.

Figure 40:
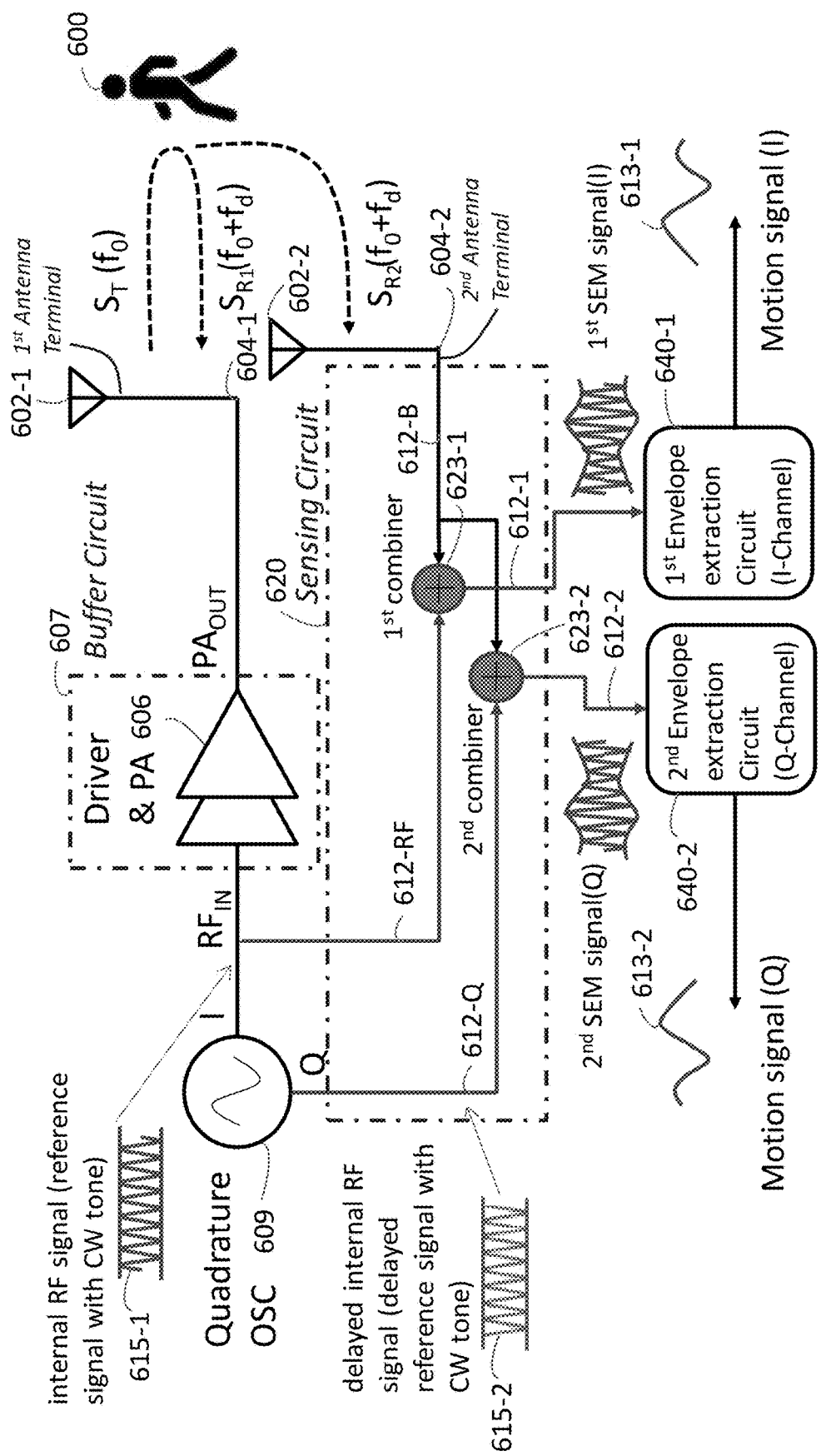
FIG. 40 illustrates an exemplary circuit for detecting motion of an object by two SEM signals, according to some embodiments of the present disclosure.

FIG. 40 illustrates an exemplary circuit for detecting motion of person 600 by two SEM signals, according to some embodiments of the present disclosure. As shown in FIG. 40, the circuit includes oscillator 609 including in-phase and quadrature signals, buffer circuit 607, sensing circuit 620, antenna terminals 604-1 and 604-2, antennae 602-1 and 602-2, and envelope extraction circuits 640-1 and 640-2. Sensing circuit 620 includes combiners 623-1 and 623-2. The circuit of FIG. 40 further includes a motion detector, which is not shown therein. One or more of the elements in FIG. 40 may be included for detecting motion of person 600. These elements may be configured to transfer data and send or receive instructions between or among each other. These elements are configured to operate similar to corresponding elements illustrated and described with reference to FIG. 38.

Combiner 623-1 of sensing circuit 620 is configured to combine transmission signal $RF_{IN}$ i.e., 612-RF) and second incoming signal 612-B to obtain a first SEM signal, as combiner 623 in FIG. 38. Envelope extraction circuits 640-1 is configured to extract a first signal envelope 613-1 from the first SEM signal. Signal envelope 613-1 is varied by a first Doppler shift from the first reflected wireless signal $S_{R1}(f_0+f_d)$.

Combiner 623-2 is configured to combine a source signal 612-Q and second incoming signal 612-B to obtain a second SEM signal. Envelope extraction circuits 640-2 is configured to extract a second signal envelope 613-2 from the second SEM signal. Signal envelope 613-2 is varied by a second Doppler shift from the second reflected wireless signal $S_{R2}(f_0+f_d)$.

The motion detector of FIG. 40 is configured to determine whether motion of person 600 is detected in accordance with first and second signal envelopes 613-1 and 613-3. When one of first and second signal envelopes 613-1 and 613-3 contains a varied envelope, the motion detector is configured to determine that motion of person 600 is detected.

As shown in FIG. 40, the transmission signal $RF_{IN}$ i.e., 612-RF) is an in-phase signal from oscillator 609. The source signal 612-Q is a quadrature signal from oscillator 609.

As illustrated in FIG. 40, combiner 623-1 is a first combiner. Envelope extraction circuit 640-1 is a first envelope extraction circuit. The SEM signal on 612-1 is a first modulation signal. Signal envelope 613-1 is a first signal envelope. The Doppler shift is a first Doppler shift. Sensing circuit 620 includes combiner 623-2 configured to combine source signal 612-Q and incoming signal 612-B to obtain a second SEM signal on 612-2. Envelope extraction circuit 640-2 is configured to extract second signal envelope 613-2 varied by a second Doppler shift from the second SEM signal. The motion detector is configured to determine whether motion of person 600 is detected in accordance with first and second signal envelopes 613-1 and 613-2.

The transmission signal 612-RF is an in-phase signal from oscillator 609. The source signal 612-Q is a quadrature signal from oscillator 609.

In some embodiments, the modulation signal in method 300 is a first modulation signal. The signal envelope in method 300 is a first signal envelope. The Doppler shift in method 300 is a first Doppler shift. Method 300 further includes shifting a phase of the transmission signal; obtaining a second modulation signal by combining the phase-shifted transmission signal and the incoming signal; extracting a second signal envelope varied by a second Doppler shift from the second modulation signal; and determining whether motion of the object is detected in accordance with the first and second signal envelopes.

Figure 41:
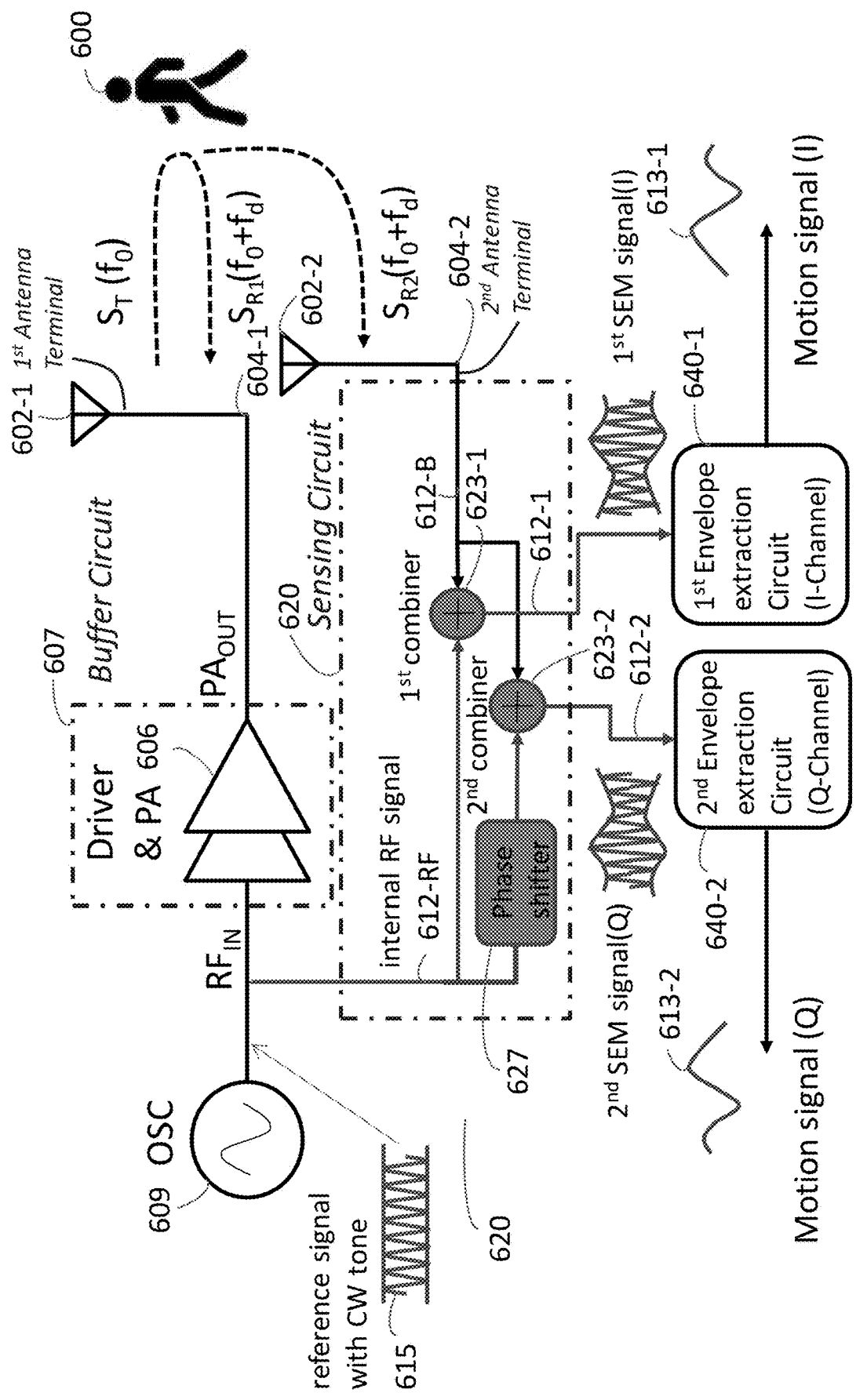
FIG. 41 illustrates an exemplary circuit using a phase shifter for detecting motion of an object by two SEM signals, according to some embodiments of the present disclosure.

FIG. 41 illustrates an exemplary circuit using a phase shifter 627 for detecting motion of person 600 by two SEM signals, according to some embodiments of the present disclosure. As shown in FIG. 41, the circuit includes oscillator 609, buffer circuit 607, sensing circuit 620, antenna terminals 604-1 and 604-2, antennae 602-1 and 602-2, and envelope extraction circuits 640-1 and 640-2. Sensing circuit 620 includes combiners 623-1 and 623-2 and phase shifter 627. The circuit of FIG. 41 further includes a motion detector, which is not shown therein. One or more of the elements in FIG. 41 may be included for detecting motion of person 200. These elements may be configured to transfer data and send or receive instructions between or among each other.

These elements are configured to operate as illustrated and described in FIG. 40, except that phase shifter 627 is configured to shift a phase of transmission signal 612-RF. Combiner 623-2 is configured to combine phase-shifted transmission signal 612-RF and second incoming signal 612-B to obtain a second SEM signal.

As illustrated in FIG. 41, combiner 623-1 is a first combiner. Envelope extraction circuit 640-1 is a first envelope extraction circuit. SEM signal on 612-1 is a first modulation signal. Signal envelope 613-1 is a first signal envelope. The Doppler shift is a first Doppler shift. Sensing circuit 620 includes phase shifter 627 configured to shift a phase of transmission signal 612-RF. Sensing circuit 620 further includes combiner 623-2 configured to combine phase-shifted transmission signal 612-RF and incoming signal 612-B to obtain SEM modulation signal on 612-2. Envelope extraction circuit 640-2 is configured to extract second signal envelope 613-2 varied by a second Doppler shift from the SEM modulation signal on 612-2. The motion detector is configured to determine whether motion of person 600 is detected in accordance with first and second signal envelopes 613-1 and 613-2.

In some embodiments, the modulation signal in method 300 is a first modulation signal. The Doppler shift in method 300 is a first Doppler shift. The signal envelope in method 300 is a first signal envelope. Method 300 further includes extracting a second signal envelope varied by a second Doppler shift from the sensed signal; and determining whether motion of the object is detected in accordance with the first and second signal envelopes. In some embodiments, the first incoming signal is received via a first antenna port, and the second incoming signal is received via a second antenna port.

Figure 42:
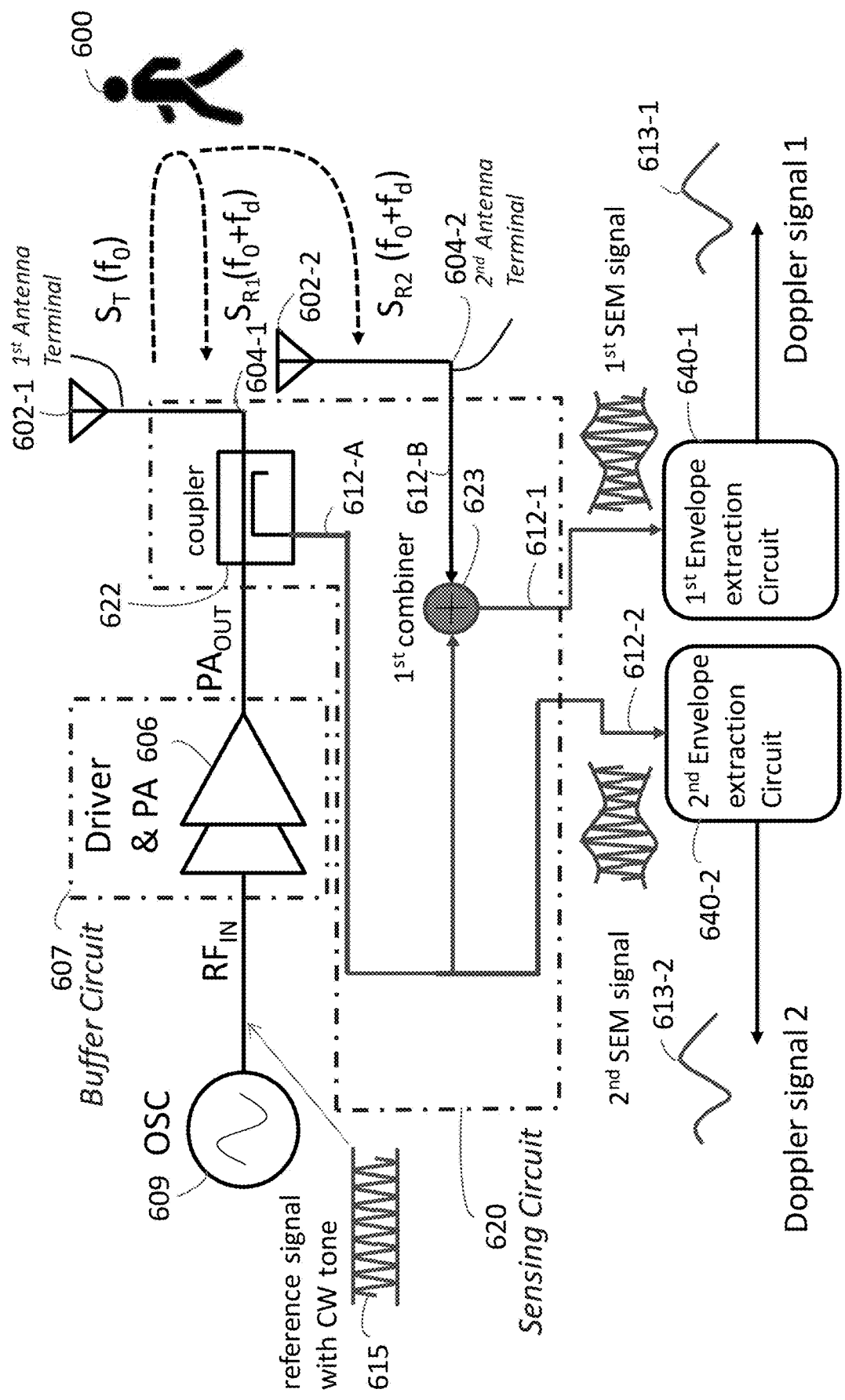
FIG. 42 illustrates an exemplary circuit using a coupler for detecting motion of an object by two SEM signals, according to some embodiments of the present disclosure.

FIG. 42 illustrates an exemplary circuit using coupler 622 for detecting motion of person 600 by two SEM signals, according to some embodiments of the present disclosure. As shown in FIG. 42, the circuit includes oscillator 609, buffer circuit 607, sensing circuit 620, antenna terminals 604-1 and 604-2, antennae 602-1 and 602-2, envelope extraction circuits 640-1 and 640-2. Sensing circuit 620 includes coupler 622 and combiner 623. The circuit of FIG. 42 further includes a motion detector, which is not shown therein. One or more of the elements in FIG. 42 may be included for detecting motion of person 600. These elements may be configured to transfer data and send or receive instructions between or among each other.

These elements are configured to operate similar to corresponding elements illustrated and described with reference to FIG. 34. Envelope extraction circuit 640-1 is configured to extract first signal envelope 613-1. Moreover, envelope extraction circuit 640-2 is configured to extract a second signal envelope 613-2 from sensed signal 612-A.

The first incoming signal is received via antenna terminal 604-1, which is a transmission port. The second incoming signal is received via antenna terminal 604-2, which is a reception port.

As illustrated in FIG. 42, envelope extraction circuit 640-1 is a first envelope extraction circuit. The SEM signal on connection 612 is a first modulation signal. The Doppler shift in the first modulation signal is a first Doppler shift. Signal envelope 613-1 is a first signal envelope. Envelope extraction circuit 640-2 is configured to extract second signal envelope 613-2 varied by a second Doppler shift from sensed signal 612-A. The motion detector is configured to determine whether motion of person 600 is detected in accordance with first and second signal envelopes 613-1 and 613-2.

The first incoming signal is received via antenna terminal 604-1, which is a transmission port. The second incoming signal is received via antenna terminal 604-2, which is a reception port.

In some embodiments, method 300 further includes determining a phase difference between the first and second signal envelopes; and determining a direction of the object based on the phase difference.

Figure 43:
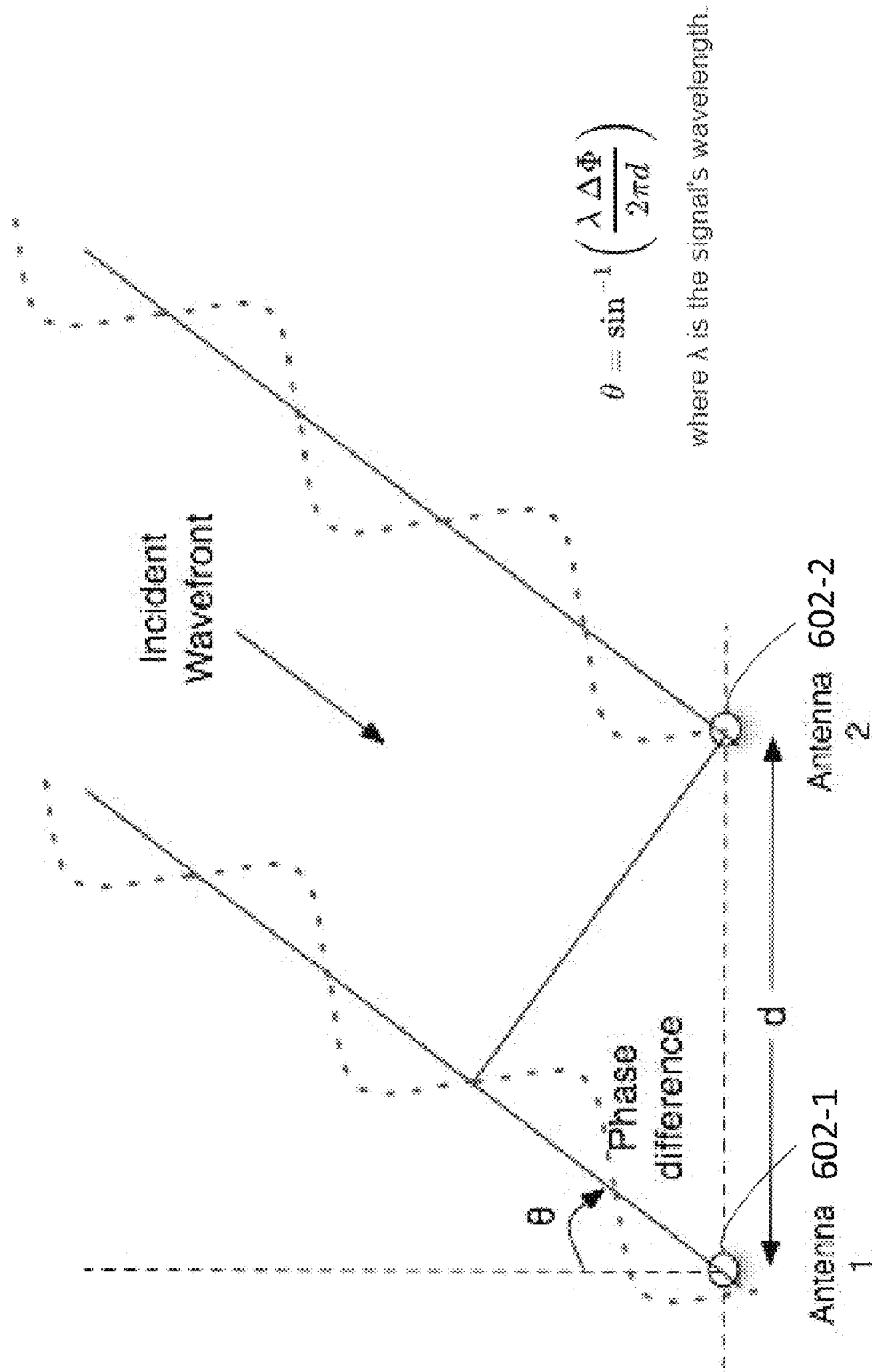
FIG. 43 illustrates an exemplary method for detecting direction of an object by two SEM signals, according to some embodiments of the present disclosure.

FIG. 43 illustrates an exemplary method for detecting direction of an object by two SEM signals, according to some embodiments of the present disclosure. As shown in FIG. 43, antennae 602-1 and 602-2 are separated by a distance d. Wireless signals arrive at antennae 602-1 and 602-2, in which arriving signals at antennae 602-1 and 602-2 have a phase difference $\Delta\phi$. The angle $\theta$ between a direction of antennae 602-1 and 602-2 and the position of person 600 is defined by:

$$\theta = \sin^{-1}\left(\frac{\lambda\Delta\Phi}{2\pi d}\right),$$

where $\lambda$ is the wireless signal's wavelength.

In FIG. 42, antenna 602-1 is configured to transmit the first wireless signal $S_T(f_0)$ toward person 600. When person 600 is moving, the transmitted wireless signal $S_T(f_0)$ is reflected by person 600 as a first reflected wireless signal $S_{R1}(f_0+f_d)$ and a second reflected wireless signal $S_{R2}(f_0+f_d)$. The first reflected wireless signal $S_{R1}(f_0+f_d)$ is received by antenna 602-1 and enters the transmission chain as a first incoming signal. The second reflected wireless signal $S_{R2}(f_0+f_d)$ is received by antenna 602-2, enters antenna terminal 604-2, and be a second incoming signal 612-B.

Because the first reflected wireless signal $S_{R1}(f_0+f_d)$ and the second reflected wireless signal $S_{R2}(f_0+f_d)$ are both reflected signals of the transmitted wireless signal $S_T(f_0)$, the first reflected wireless signal $S_{R1}(f_0+f_d)$ and the second reflected wireless signal $S_{R2}(f_0+f_d)$ are considered as the same signal from a single source, i.e., person 600 or antenna 602-1. Thus, a phase difference $\Delta\phi$ exists between the first reflected wireless signal $S_{R1}(f_0+f_d)$ and the second reflected wireless signal $S_{R2}(f_0+f_d)$. The phase difference $\Delta\phi$ also exists between the first incoming signal, which is sensed as sensed signal 612-A, and second incoming signal 612-B. When the first incoming signal and second incoming signal 612-B are sensed and combined into two SEM signals, the phase difference $\Delta\phi$ also exists between the two SEM signals. When signal envelopes 613-1 and 613-2 are extracted, the phase difference $\Delta\phi$ also exists between signal envelopes 613-1 and 613-2. Accordingly, a Doppler shift detector can be configured to determine the phase difference $\Delta\phi$ between signal envelopes 613-1 and 613-2. The Doppler shift detector can be further configured determine a direction of person 600 based on the determined phase difference $\Delta\phi$ and a direction of antennae 602-1 and 602-2, as shown in FIG. 43.

According to illustration and descriptions for FIGS. 42 and 43, a motion detector or a Doppler shift detector can be configured determine the phase difference $\Delta\phi$ between signal envelopes 613-1 and 613-2. The motion detector or the Doppler shift detector can also be configured to determine a direction of person based on the phase difference $\Delta\phi$ and a direction of antennae 602-1 and 602-2, as shown in FIG. 43.

In some embodiments, the modulation signal in method 300 is a first modulation signal. The Doppler shift in method 300 is a first Doppler shift. The signal envelope in method 300 is a first signal envelope. Method 300 further includes combining the sensed signal and a third incoming signal to obtain a second modulation signal, wherein the third incoming signal is obtained from a fourth wireless signal, the fourth wireless signal being a third reflected first wireless signal from the object; extracting a second signal envelope varied by a second Doppler shift from the second modulation signal; and determining whether motion of the object is detected in accordance with the first and second signal envelopes. In some embodiments, the first incoming signal is received via a first antenna port. The second incoming signal is received via a second antenna port. The third incoming signal is received via a third antenna port.

Figure 44:
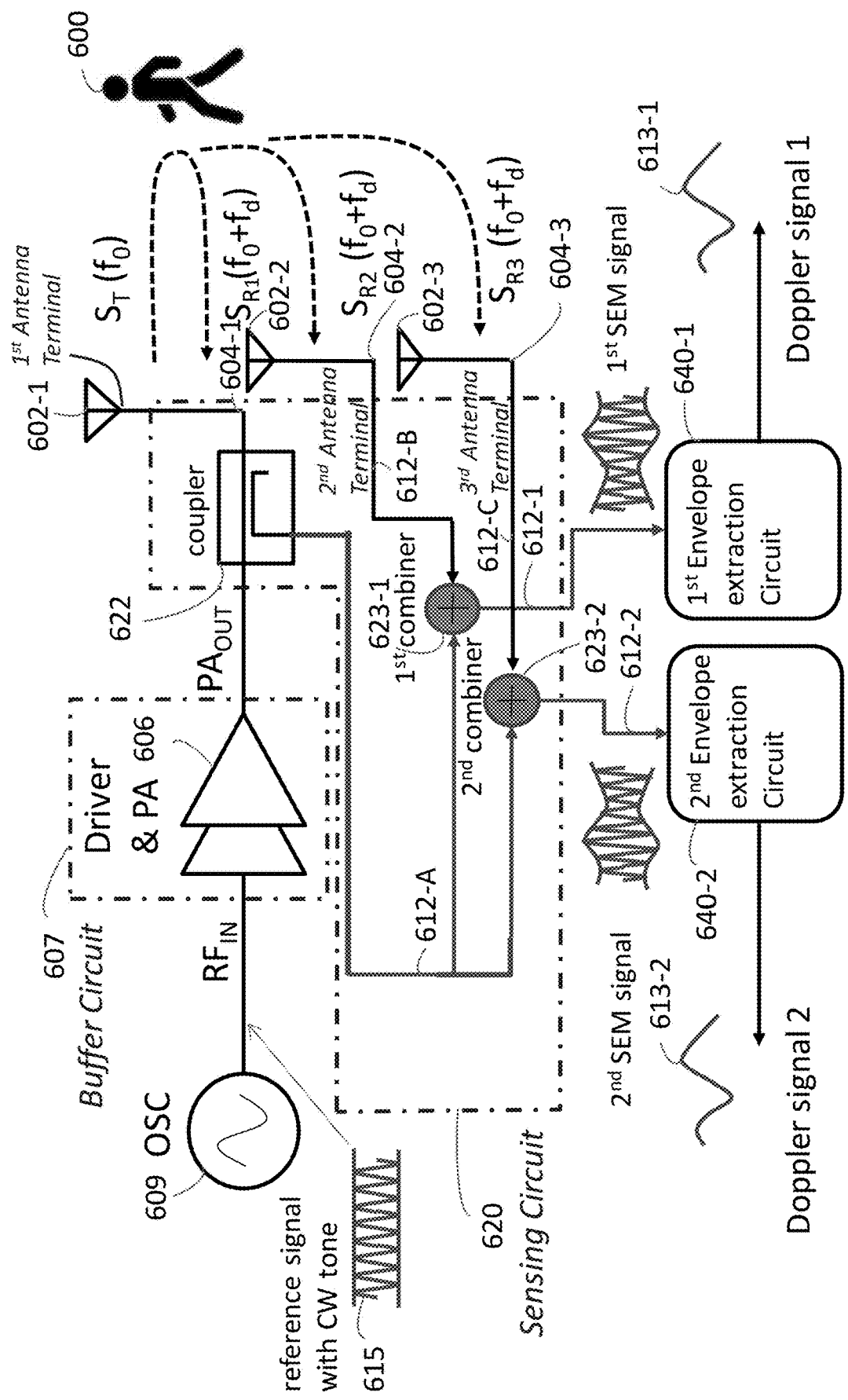
FIG. 44 illustrates an exemplary circuit using a coupler for detecting motion of an object by two SEM signals, according to some embodiments of the present disclosure.

FIG. 44 illustrates an exemplary circuit using a coupler 622 for detecting motion of person 600 by two SEM signals, according to some embodiments of the present disclosure. As shown in FIG. 44, the circuit includes oscillator 609, buffer circuit 607, sensing circuit 620, antenna terminals 604-1, 604-2, and 604-3, antennae 602-1, 602-2, and 602-3, and envelope extraction circuits 640-1 and 640-2. Sensing circuit 620 includes coupler 622 and combiners 623-1 and 623-2. The circuit of FIG. 44 further includes a motion detector, not shown therein. One or more of the elements in FIG. 44 may be included for detecting motion of person 600. These elements may be configured to transfer data and send or receive instructions between or among each other.

These elements are configured to operate similar to corresponding elements illustrated and described with reference to FIG. 42. Combiner 623-1 is configured to combine sensed signal 612-A with second incoming signal 612-B, as combiner 623 of FIG. 42, to obtain the first SEM signal for envelope extraction circuit 640-1 to extract signal envelope 613-1.

Antenna 602-3 is configured to receive a third reflected wireless signal $S_{R3}(f_0+f_d)$ from person 600 based on the transmitted wireless signal $S_T(f_0)$. The third reflected wireless signal $S_{R3}(f_0+f_d)$ is sent via antenna terminal 604-3 to combiner 623-2 as a third incoming signal 612-C. Combiner 623-2 of sensing circuit 620 is configured to combine sensed signal 612-A and third incoming signal 612-C to obtain a second SEM signal on connection 612-2. Envelope extraction circuit 640-2 is configured to extract a second signal envelope 613-2 from the second SEM signal on connection 612-2. The motion detector is configured to determine whether motion of person 600 is detected in accordance with first and second signal envelopes 613-1 and 613-2.

Third incoming signal 612-3 is obtained from the third reflected wireless signal $S_{R3}(f_0+f_d)$, which is a third reflected signal of the transmitted wireless signal $S_T(f_0)$ from person 600. The third reflected wireless signal $S_{R3}(f_0+f_d)$ contains a third Doppler shift $f_d$ that varies second envelope 613-2. The third Doppler shift $f_d$ can be the same Doppler shift as the first Doppler shift $f_d$ in the first reflected wireless signal $S_{R1}(f_0+f_d)$ and/or the second Doppler shift $f_d$ in the second reflected wireless signal $S_{R2}(f_0+f_d)$. The third Doppler shift $f_d$ can also be different from the first Doppler shift $f_d$ in the first reflected wireless signal $S_{R1}(f_0+f_d)$ and/or the second Doppler shift $f_d$ in the second reflected wireless signal $S_{R2}(f_0+f_d)$.

Moreover, the first incoming signal is received via antenna terminal 604-1, which is a transmission port. Second incoming signal 612-B is received via antenna terminal 604-2, which can be a first reception port. Third incoming signal 612-C is received via antenna terminal 604-3, which can be a second reception port.

As illustrated in FIG. 44, envelope extraction circuit 640-1 is a first envelope extraction circuit. The first SEM signal on connection 612-1 is a first modulation signal. The Doppler shift in the first incoming signal via antenna terminal 604-1 is a first Doppler shift. Signal envelope 613-1 is a first signal envelope. Combiner 623-2 is configured to combine sensed signal 612-A and third incoming signal 612-C to obtain a second modulation signal. Third incoming signal 612-C is obtained from the third reflected wireless signal $S_{R3}(f_0+f_d)$, which is the third reflected signal of the transmitted wireless signal $S_T(f_0)$ from person 600. Envelope extraction circuit 640-2 is configured to extract second signal envelope 613-2 varied by the third Doppler shift from the second SEM signal on connection 612-2. The detector circuit is configured to determine whether motion of person 600 is detected in accordance with first and second signal envelopes 613-1 and 613-2.

In some embodiments, method 300 further includes determining a phase difference between the first and second signal envelopes; and determining a direction of the object based on the phase difference.

For example, as illustrated in FIG. 44, antennae 602-2 and 602-3 can be antennae 1 and 2 of FIG. 43. Because the second reflected wireless signal $S_{R2}(f_0+f_d)$ and the third reflected wireless signal $S_{R3}(f_0+f_d)$ via antennae 602-2 and 602-3 are both reflected signals of the transmitted wireless signal $S_T(f_0)$, the motion detector can be configured to determine a phase difference between first and second signal envelopes 613-1 and 613-2; and determining a direction of person 600 based on the phase difference, in accordance with the method illustrated and described in FIGS. 42 and 43.

As illustrated in FIGS. 43 and 44, the detector circuit can be further configured to determine a phase difference between first and second signal envelopes 613-1 and 613-2; and determine a direction of person 600 based on the phase difference. First and second signal envelopes 613-1 and 613-2 are extracted from two SEM signals that are obtained by two incoming signals received via two antenna terminals 604-2 and 604-3. The two antenna terminals 604-2 and 604-3 are different from antenna terminal 604-1 that is used for transmitting wireless signal $S_T(f_0)$.

In some embodiments, the motion of the object in method 300 includes one or more of a plurality of gestures. Method 300 further includes determining whether one of the plurality of gestures is detected in accordance with the signal envelope.

Figure 45:
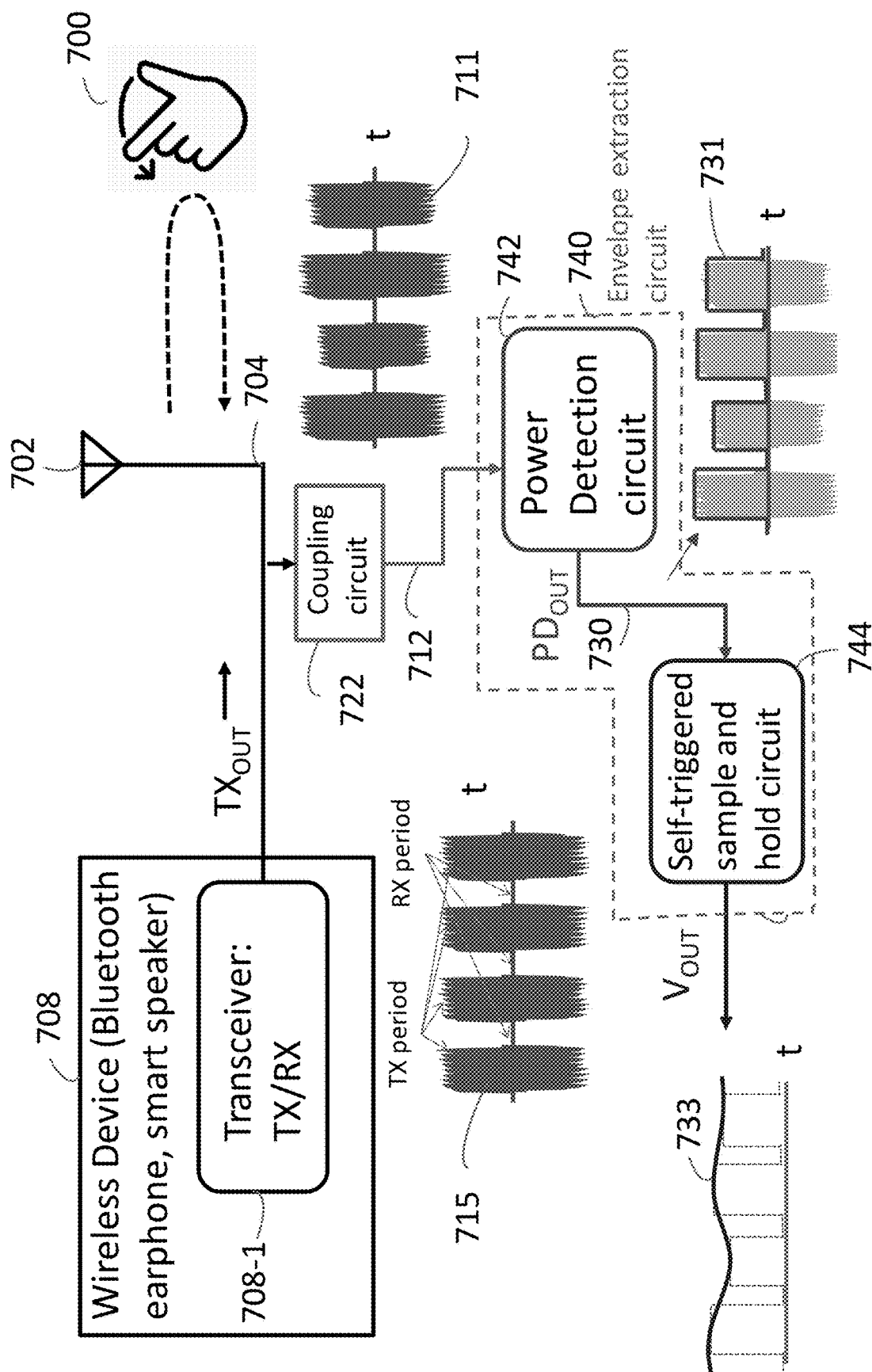
FIG. 45 illustrates an exemplary circuit for detecting a gesture by SEM, according to some embodiments of the present disclosure.

FIG. 45 illustrates an exemplary circuit for detecting a gesture 700 by SEM, according to some embodiments of the present disclosure. As shown in FIG. 45, the circuit includes a wireless device 708, an antenna terminal 704, an antenna 702, a coupling circuit 722, and an envelope extraction circuit 740. Wireless device 708 includes a transceiver 708-1. Envelope extraction circuit 740 includes a power detection circuit 742 and a self-triggered sample and hold circuit 744. The circuit of FIG. 45 further includes a motion detector, which is not shown therein.

As shown in FIG. 45, transceiver 708-1 of wireless device 708 is configured to transmit a $TX_{OUT}$ signal to antenna terminal 704 for antenna 702 to transmit a wireless signal toward gesture 700. The $TX_{OUT}$ signal can be a packet-based signal 715, such as a packet-based Bluetooth signal. Because of movement of gesture 700, a reflected wireless signal from gesture 700 includes a Doppler shift $f_d$, as illustrated in FIG. 1. Antenna 702 is configured to receive the reflected wireless signal as an incoming signal to antenna terminal 704 and coupling circuit 722. Coupling circuit 722, which is a sensing circuit, is configured to couple transmission signal $TX_{OUT}$ to the incoming signal as an SEM signal 711 on connection 712. Envelope extraction circuit 740 is configured to extract a signal envelope 733 from SEM signal 711. The motion detector is configured to determine whether one of a plurality of gestures is detected in accordance with signal envelope 733.

For example, when signal envelope 733 includes a varied envelope, as illustrated and described with reference to FIG. 10, the motion detector is configured to determine one of the gestures is detected in accordance with signal envelope 733. When signal envelope 733 includes a different varied envelope, signal envelope 733 includes a different envelope. The motion detector is configured to determine another of the gestures is detected in accordance with signal envelope 733. When signal envelope 733 includes a constant envelope, the motion detector is configured to determine none of the gestures is detected in accordance with signal envelope 733.

As illustrated in FIG. 45, motion 700 can be one or more of a plurality of gestures. The detector circuit is configured to determine whether one of the plurality of gestures is detected in accordance with signal envelope 733.

In some embodiments, extracting the signal envelope of step 330 includes detecting power of the signal envelope to obtain a pulse signal; and sampling and holding the pulse signal to obtain the signal envelope. In some embodiments, method 300 further includes triggering the sampling and holding by the pulse signal.

Figure 46:
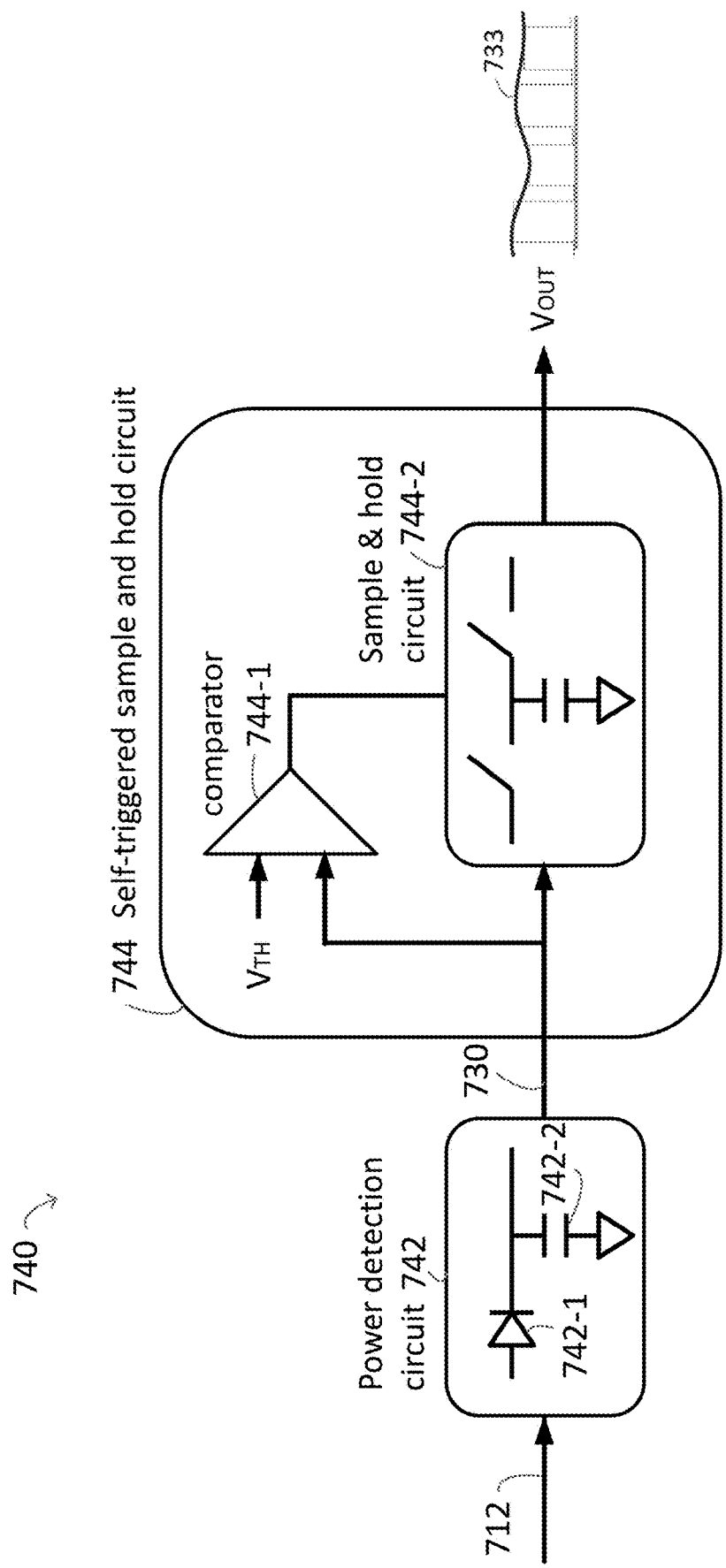
FIG. 46 illustrates a block diagram of an exemplary envelope extraction circuit for detecting a gesture by SEM, according to some embodiments of the present disclosure.

FIG. 46 illustrates a block diagram of exemplary envelope extraction circuit 740 for detecting gesture 700 by SEM, according to some embodiments of the present disclosure. As shown in FIG. 46, envelope extraction circuit 740 includes a power detection circuit 742 and a self-triggered sample and hold circuit 744. Power detection circuit 742 includes a diode 742-1 and a capacitor 742-2 coupled to each other as shown. Self-triggered sample and hold circuit 744 includes a comparator 744-1 and sample and hold circuit 744-2 coupled to each other as shown.

When power detection circuit 742 receives SEM signal 711 on connection 712, power detection circuit 742 is configured to detect power of an envelope of SEM signal 711 to obtain a pulse signal 731 as shown in FIG. 45. Power detection circuit 742 is configured to send pulse signal 731 to self-triggered sample and hold circuit 744. Self-triggered sample and hold circuit 744 is configured to sample and hold pulse signal 731 to obtain signal envelope 733.

When power detection circuit 742 sends pulse signal 731 to self-triggered sample and hold circuit 744, pulse signal 731 itself triggers self-triggered sample and hold circuit 744 to sample and hold pulse signal 731 to obtain signal envelope 733. For example, when pulse signal 731 has a signal level higher than a threshold $V_{TH}$ of comparator 744-1, pulse signal 731 triggers sample and hold circuit 744-2 to sample and hold pulse signal 731 and output to $V_{OUT}$ as signal envelope 733.

As illustrated in FIGS. 45 and 46, envelope extraction circuit 740 is configured to extract signal envelope 733 varied by the Doppler shift from SEM signal 711. Envelope extraction circuit 740 is configured to detect power of the envelope of SEM signal to obtain pulse signal 731 by power detection circuit 742. Envelope extraction circuit 740 is further configured to sample and hold pulse signal 731 to obtain signal envelope 733. Envelope extraction circuit 740 is configured to trigger the sampling and holding by pulse signal 731.

In some embodiments, the signal envelope in method 300 includes a pattern of variation. Determining whether one of the plurality of gestures is detected of method 300 includes determining whether one of the plurality of gestures is detected in accordance with the pattern of variation.

In some embodiments, the signal envelope in method 300 includes at least one of a first pattern or a second pattern of variation. Determining whether one of the plurality of gestures is detected of method 300 includes determining whether a first one of the plurality of gestures is detected in accordance with the first pattern of variation; and determining whether a second one of the plurality of gestures is detected in accordance with the second pattern of variation.

FIGS. 47A, 47B, and 47C illustrate exemplary gestures and exemplary SEM signals, according to some embodiments of the present disclosure. FIG. 47A illustrates a gesture G0 in front of a Bluetooth earphone 708-BTEP. Gesture G0 is not moving. A signal envelope, received in Bluetooth earphone 708-BTEP according to methods illustrated in FIG. 45, can be a constant envelope as shown in FIG. 47A, which represents "No action."

FIG. 47B illustrates a gesture G1 in front of Bluetooth earphone 708-BTEP. Gesture G1 is a swiping down gesture. A signal envelope, received in Bluetooth earphone 708-BTEP according to methods illustrated in FIG. 45, can be an envelope with a first pattern of variation PT1 as shown in FIG. 47B, which represents "Volume down by 1-step."

FIG. 47C illustrates a gesture G2 in front of Bluetooth earphone 708-BTEP. Gesture G2 is a swiping up gesture. A signal envelope, received in Bluetooth earphone 708-BTEP according to methods illustrated in FIG. 45, can be an envelope with a second pattern of variation PT2 as shown in FIG. 47C, which represents "Volume up by 1-step."

As illustrated in FIGS. 45-47, signal envelope 733 includes first and second patterns of variation PT1 and PT2. The motion detector is configured to determine whether one of gestures G1 and G2 is detected in accordance with first and second patterns of variation PT1 and PT2.

Alternatively, signal envelope 733 may contain at least one of first pattern of variation PT1 or second pattern of variation PT2. The motion detector can be configured to determine whether gesture G1 is detected in accordance with first pattern of variation PT1; and determine whether gesture G2 is detected in accordance with second pattern of variation PT2.

In some embodiments, method 300 further includes determining a number of detected times a gesture occurs in accordance with the signal envelope.

FIGS. 48A, 48B, and 48C illustrate exemplary gestures and exemplary SEM signals, according to some embodiments of the present disclosure. FIG. 48A illustrates a gesture G1 for three times in front of Bluetooth earphone 708-BTEP. Gesture G1 is a swiping down gesture. A signal envelope, received in Bluetooth earphone 708-BTEP according to methods illustrated in FIG. 45, can be an envelope with three first pattern of variation PT1-1, PT1-2, and PT1-3 as shown in FIG. 48A, which represents "Volume down by 3-step."

FIG. 48B illustrates a gesture G2 for three times in front of Bluetooth earphone 708-BTEP. Gesture G2 is a swiping up gesture. A signal envelope, received in Bluetooth earphone 708-BTEP according to methods illustrated in FIG. 45, can be an envelope with three second patterns of variation PT2-1, PT2-2, and PT2-3 as shown in FIG. 48B, which represents "Volume up by 3-step."

FIG. 48C illustrates a gesture G3 for three times in front of Bluetooth earphone 708-BTEP. Gesture G3 is a swiping around gesture. A signal envelope, received in Bluetooth earphone 708-BTEP according to methods illustrated in FIG. 45, can be an envelope with three third pattern of variation PT3-1, PT3-2, and PT3-3 as shown in FIG. 48C, which represents "Next songs."

As illustrated in FIGS. 45-48, the motion detector circuit can be configured to determine a number of detected times gesture G1, G2, or G3 occurs in accordance with signal envelope 733. For example, the motion detector circuit is configured to determine three times gesture G1 occurs in accordance with signal envelope 733 with first patterns of variation PT1-1, PT1-2, and PT1-3. Alternatively, the motion detector circuit can be configured to determine two times gesture G2 occurs in accordance with signal envelope 733 with second patterns of variation PT2-1 and PT2-2.

Figure 49:
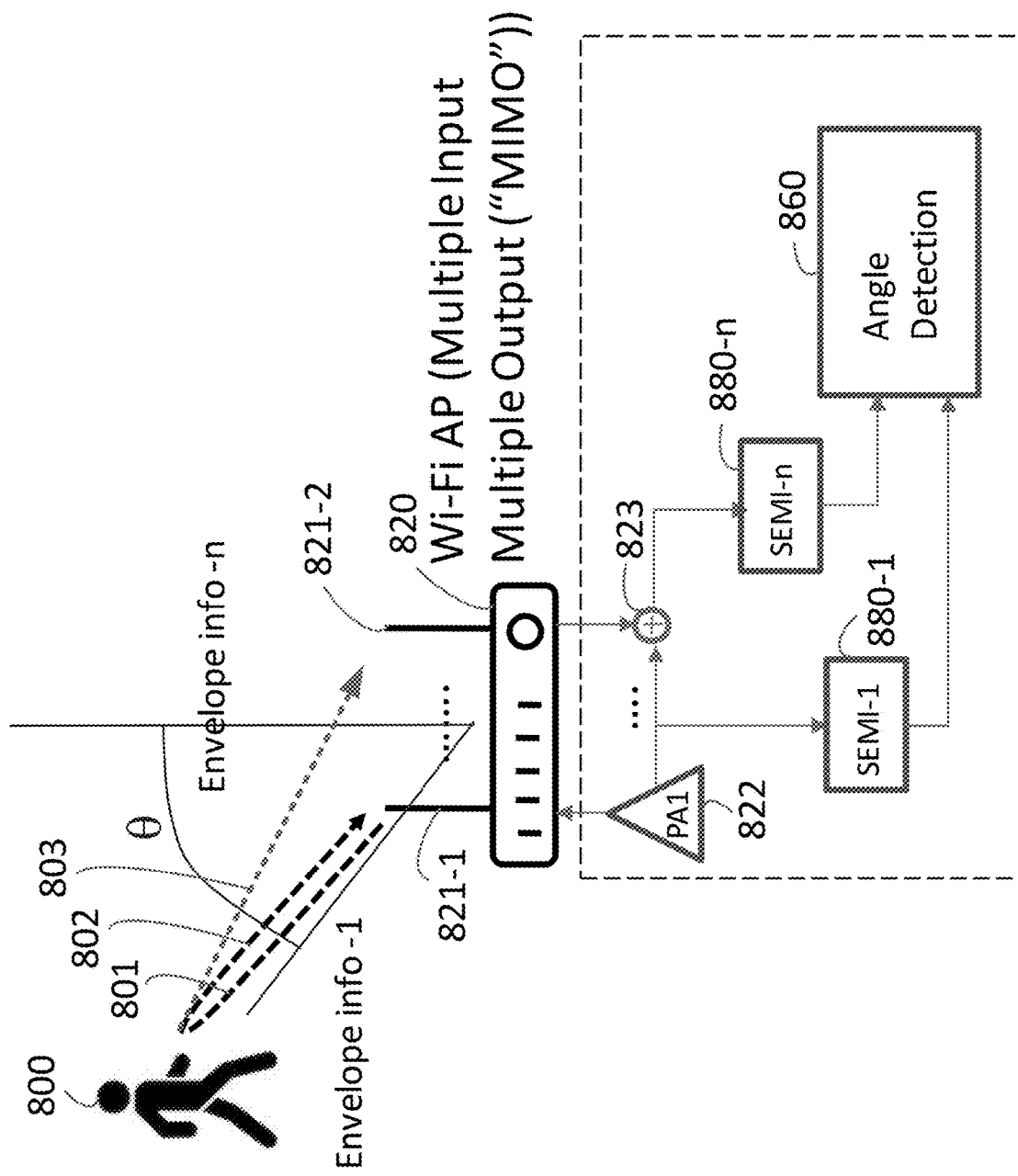
FIG. 49 illustrates an exemplary scenario for determining a position of an object by SEM, according to some embodiments of the present disclosure.

FIG. 49 illustrates an exemplary scenario for determining a position of a person 800 by SEM, according to some embodiments of the present disclosure. As shown in FIG. 49, a Wi-Fi access point (AP) 820 is configured to detect a position of person 800. Wi-Fi AP 820 includes antennae 821-1 and 821-2, a power amplifier 822, a combiner 823, an SEMI-1 880-1, an SEMI-n 880-n, an angle detection circuit 860, and other elements similar to them. For example, Wi-Fi AP 820 may include n power amplifiers, n sensing circuits, and n SEMIs coupled to n antennae, respectively. All results of SEMIs are sent to angle detection circuit 860 for determining the position of person 800.

As shown in FIG. 49, Wi-Fi AP 820 is configured to transmit a wireless signal 801 toward person 800. Wireless signal 801 is reflected from person 800 as reflected wireless signal 802 and 803 arriving antennae 821-1 and 821-2, respectively. When person 800 is moving, reflected wireless signal 802 and 803 contain Doppler shifts. The Doppler shifts cause variation of SEM signals sensed via antennae 821-1 and 821-2. SEMI-1 880-1, SEMI-n 880-n, and other SEMIs of Wi-Fi AP 820 are configured to extract varied signal envelopes from the SEM signals, as illustrated in methods in the present disclosure. Angle detection circuit 860 is configured to detect an angle θ based on a phase difference between reflected wireless signal 802 and 803 arriving at antennae 821-1 and 821-2, or between two signal envelopes, as illustrated in FIG. 43. Wi-Fi AP 820 is configured to determine a direction of person 800 relative to a position of Wi-Fi AP 820 in accordance with the two signal envelopes.

Figure 50:
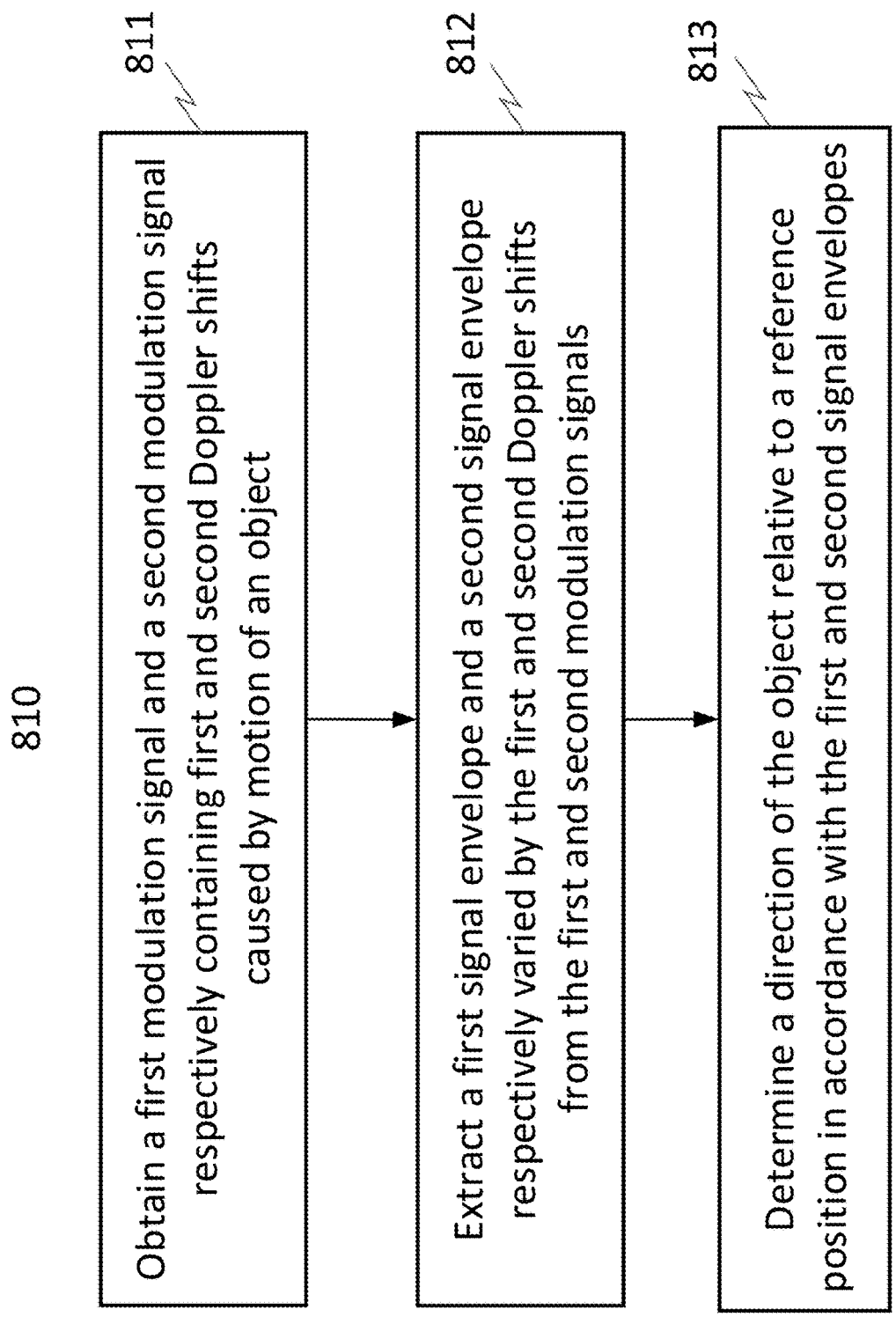
FIG. 50 illustrates an exemplary method for determining a position of an object by SEM, according to some embodiments of the present disclosure.

FIG. 50 illustrates an exemplary method 810 for determining a position of person 800 by SEM, according to some embodiments of the present disclosure. Motion detectors, Doppler shift detectors, and/or angle detection circuit 860 in the present disclosure may be configured to implement method 810. Method 810 includes obtaining a first modulation signal and a second modulation signal respectively related to a first signal and a second signal respectively containing first and second Doppler shifts caused by motion of an object (step 811), extracting a first signal envelope and a second signal envelope respectively varied by the first and second Doppler shifts from the first and second modulation signals (step 812); and determining a direction of the object relative to a reference position in accordance with the first and second signal envelopes (step 813).

Step 811 includes obtaining a first modulation signal and a second modulation signal respectively related to a first signal and a second signal respectively containing first and second Doppler shifts caused by motion of an object. For example, as illustrated in FIG. 49, sensing circuits of Wi-Fi AP 820 are configured to obtain a first SEM signal and a second SEM signal respectively related to first and second incoming signals via antennae 821-1 and 821-2. The first and second incoming signals are respectively obtained from reflected wireless signals 802 and 803 that are received via antennae 821-1 and 821-2. Reflected wireless signals 802 and 803 respectively contain first and second Doppler shifts caused by motion of person 800. Thus, the first and second SEM signals respectively contain the first and second Doppler shifts caused by motion of person 800. Reflected wireless signals 802 and 803 are two reflected signals of wireless signal 801 from the object.

Step 812 includes extracting a first signal envelope and a second signal envelope respectively varied by the first and second Doppler shifts from the first and second modulation signals. For example, as illustrated in FIG. 49, envelope extraction circuits in SEMI-1 and SEMI-n of Wi-Fi AP 820 are configured to extract a first signal envelope and a second signal envelope respectively varied by the first and second Doppler shifts from the first and second SEM signals.

Step 813 includes determining a direction of the object relative to a reference position in accordance with the first and second signal envelopes. For example, as illustrated in FIG. 49, angle detection circuit 860 of Wi-Fi AP 820 is configured to determine a direction of person 800 relative to the position of Wi-Fi AP 820 in accordance with the first and second signal envelopes.

As illustrated in FIG. 49, Wi-Fi AP 820 can be configured to implement method 800. The sensing circuits of Wi-Fi AP 820, e.g., combiner 823, are configured to obtain the first and second SEM signals respectively related to first and second incoming signals received via antennae 821-1 and 821-2. The first and second incoming signals are respectively obtained from reflected wireless signals 802 and 803 that are received via antennae 821-1 and 821-2. Reflected wireless signals 802 and 803 respectively contain first and second Doppler shifts caused by motion of person 800. Thus, the first and second SEM signals respectively contain the first and second Doppler shifts caused by motion of person 800. Reflected wireless signals 802 and 803 are two reflected signals of wireless signal 801 from the object.

Moreover, envelope extraction circuits of SEMIs in Wi-Fi AP 820 are configured to extract the first signal envelope varied by the first Doppler shift from the first SEM signal, and the second signal envelope varied by the second Doppler shift from the second SEM signal. Angle detection circuit 860 can be configured to determine the direction of person 800 relative to the position of Wi-Fi AP 820 in accordance with the first and second signal envelopes.

In some embodiments, determining the direction of the object of step 813 includes determining an angle of the object relative to the reference position in accordance with the first and second signal envelopes. For example, as illustrated in FIG. 49, angle detection circuit 860 is configured to determine the angle θ of person 800 relative to the position of Wi-Fi AP 820 in accordance with the first and second signal envelopes. According the angle θ and a direction of antennae 821-1 and 821-2, angle detection circuit 860 is configured to determine the direction of person 800.

In some embodiments, determining the angle of the object of step 813 includes determining a phase difference between the first and second signal envelopes; and determining the angle of the object relative to the reference position in accordance with the phase difference. For example, as illustrated in FIG. 49, angle detection circuit 860 is configured to determine the phase difference between the first and second signal envelopes, and determine the angle θ of person 800 relative to the position of Wi-Fi AP 820 in accordance with the phase difference.

In some embodiments, method 810 further includes determining presence of the object in accordance with at least one of the first or second signal envelope. For example, angle detection circuit 860 can be configured to determine presence of person 800 in accordance with at least one of the first or second signal envelope. When one of the first and second signal envelopes includes a varied envelope, angle detection circuit 860 can be configured to determine presence of person 800, or at least an object moving in the determined direction.

Figure 51:
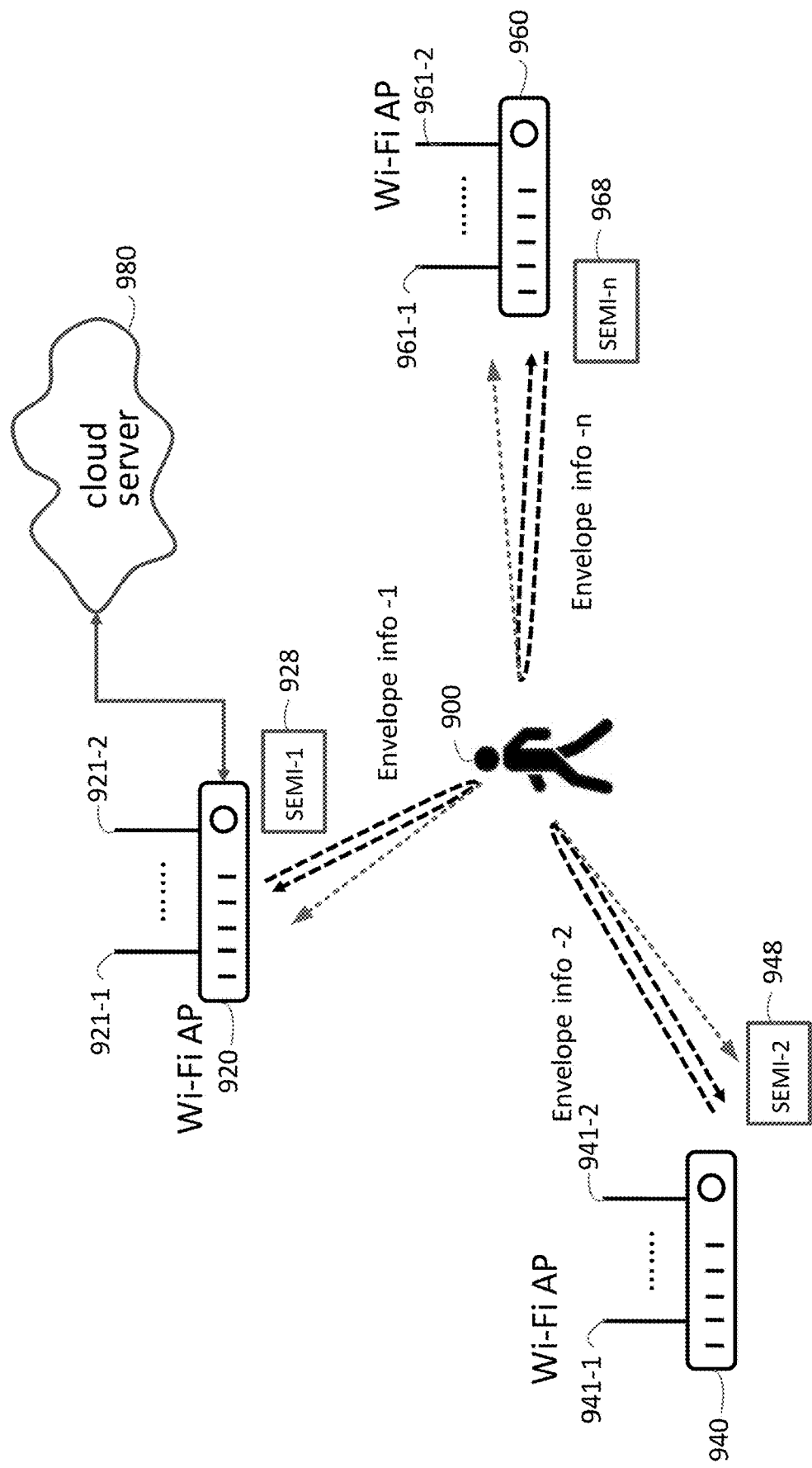
FIG. 51 illustrates an exemplary positioning system by multiple SEM signals, according to some embodiments of the present disclosure.

FIG. 51 illustrates an exemplary positioning system by multiple SEM signals, according to some embodiments of the present disclosure. As shown in FIG. 51, the positioning system includes Wi-Fi APs 920, 940, and 960 and a cloud server 980 for positioning person 900. Wi-Fi AP 920 includes antennae 921-1 and 921-2 and SEMI-1 928. Wi-Fi AP 940 includes antennae 941-1 and 941-2 and SEMI-2 948.

Wi-Fi AP 960 includes antennae 961-1 and 961-2 and SEMI-n 968. Cloud server 980 includes one or more processors and memory. Cloud server 980 includes information about positions of Wi-Fi APs 920, 940, and 960.

The positioning system for determining the position of person 900 is configured to perform the following operations. Wi-Fi AP 920 is configured to perform operations of method 810 as described in FIGS. 49 and 50, and determine a first direction of person 900 relative to a position of Wi-Fi AP 920 in accordance with first and second signal envelopes, i.e., Envelope info-1 shown in FIG. 51. Wi-Fi AP 920 is configured to send the first direction to cloud server 980.

Wi-Fi AP 940 is configured to perform operations of method 810 as described in FIGS. 49 and 50, and determine a second direction of person 900 relative to a position of Wi-Fi AP 940 in accordance with third and fourth signal envelopes, i.e., Envelope info-2 shown in FIG. 51. Wi-Fi AP 940 is configured to send the second direction to cloud server 980.

Cloud server 980 is configured to determine the position of person 900 based on the first and second directions and positions of Wi-Fi APs 920 and 940. For example, cloud server 980 is configured to determine the position of person 900 as a cross point of two lines of sight respectively extended from positions of Wi-Fi APs 920 and 940 according to the first and second directions.

Figure 52:
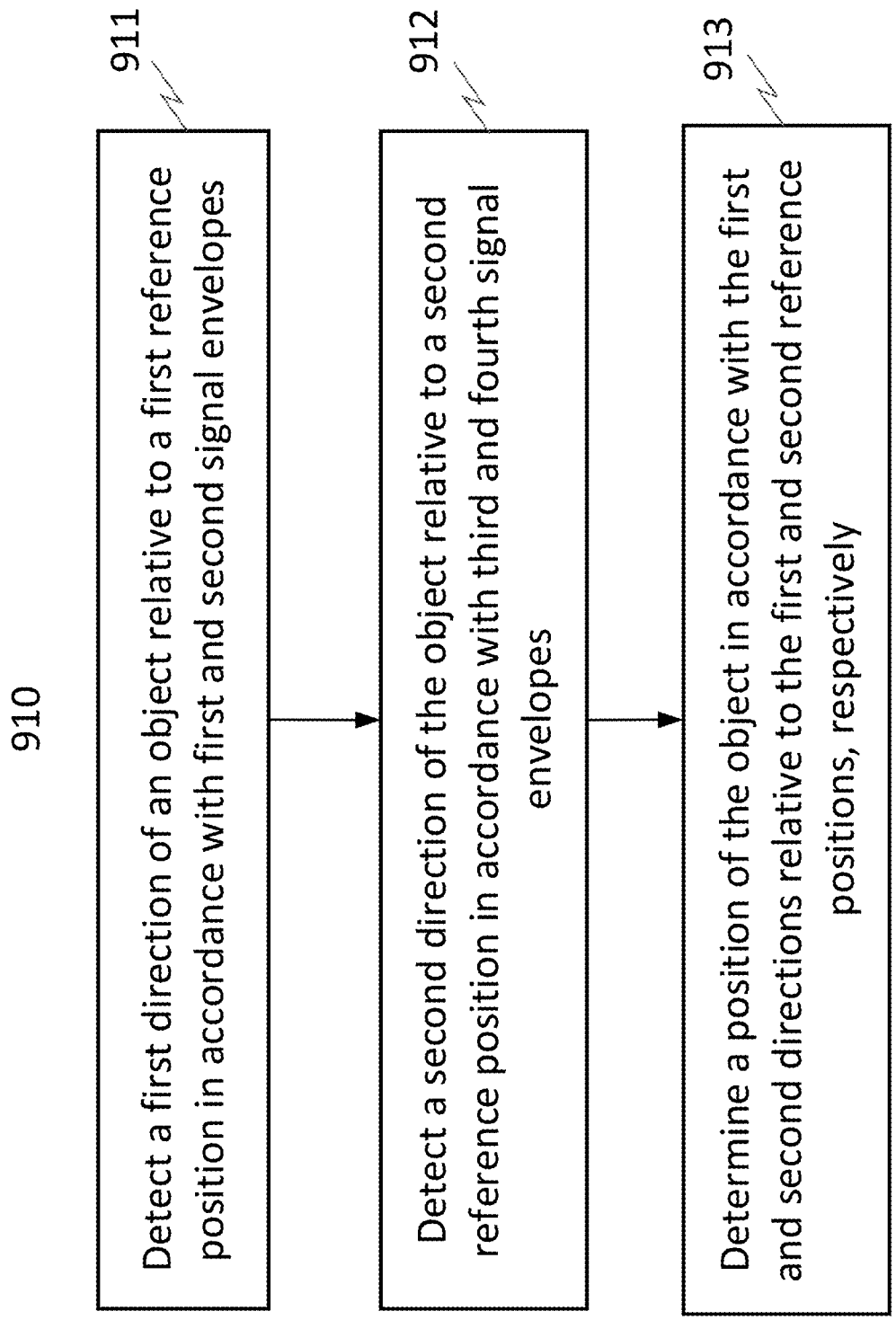
FIG. 52 illustrates an exemplary method for positioning an object by multiple SEM signals, according to some embodiments of the present disclosure.

FIG. 52 illustrates an exemplary method 910 for positioning an object by multiple SEM signals, according to some embodiments of the present disclosure. The Wi-Fi APs and cloud server in FIG. 51 and other figures may be configured to implement method 910. Method 910 includes detecting a first direction of an object relative to a first reference position in accordance with first and second signal envelopes (step 911), detecting a second direction of the object relative to a second reference position in accordance with third and fourth signal envelopes (step 912), and determining a position of the object in accordance with the first and second directions relative to the first and second reference positions, respectively (step 913).

Step 911 includes detecting a first direction of an object relative to a first reference position in accordance with first and second signal envelopes. For example, as illustrated in FIG. 51, Wi-Fi AP 920 is configured to perform operations of method 810 and determine the first direction of person 900 relative to the position of Wi-Fi AP 920 in accordance with first and second signal envelopes, i.e., Envelope info-1 shown in FIG. 51.

Step 912 includes detecting a second direction of the object relative to a second reference position in accordance with third and fourth signal envelopes. For example, as illustrated in FIG. 51, Wi-Fi AP 940 is configured to perform operations of method 810, and determine a second direction of person 900 relative to a position of Wi-Fi AP 940 in accordance with third and fourth signal envelopes, i.e., Envelope info-2 shown in FIG. 51.

Step 913 includes determining a position of the object in accordance with the first and second directions relative to the first and second reference positions, respectively. For example, as illustrated in FIG. 51, cloud server 980 is configured to determine the position of person 900 based on the first and second directions and positions of Wi-Fi APs 920 and 940.

In some embodiments, method 910 further includes detecting a third direction of the object relative to a third reference position in accordance with fifth and fifth signal envelopes. Determining the position of the object of step 913 includes determining the position of the object in accordance with the first, second, and third angles relative to the first, second, and third reference positions, respectively.

For example, as shown in FIG. 51, Wi-Fi AP 960 is configured to perform operations of method 810, and determine a third direction of person 900 relative to a position of Wi-Fi AP 960 in accordance with fifth and sixth signal envelopes, i.e., Envelope info-3 shown in FIG. 51. Wi-Fi AP 960 is configured to send the second direction to cloud server 980.

Cloud server 980 is configured to determine the position of person 900 based on the first, second, and third directions and positions of Wi-Fi APs 920, 940, and 960. For example, cloud server 980 is configured to determine the position of person 900 as a cross point or triangular area of three lines of sight respectively extended from positions of Wi-Fi APs 920, 940, and 960 according to the first, second, and third directions.

Wi-Fi APs 920, 940, and 960 determine the first, second, and third directions. Wi-Fi APs 920, 940, and 960 also determine first, second, and third angles of person 900 relative to the positions of Wi-Fi APs 920, 940, and 960.

In some embodiments, method 910 further includes determining the second reference position by wireless positioning operations.

Figure 53:
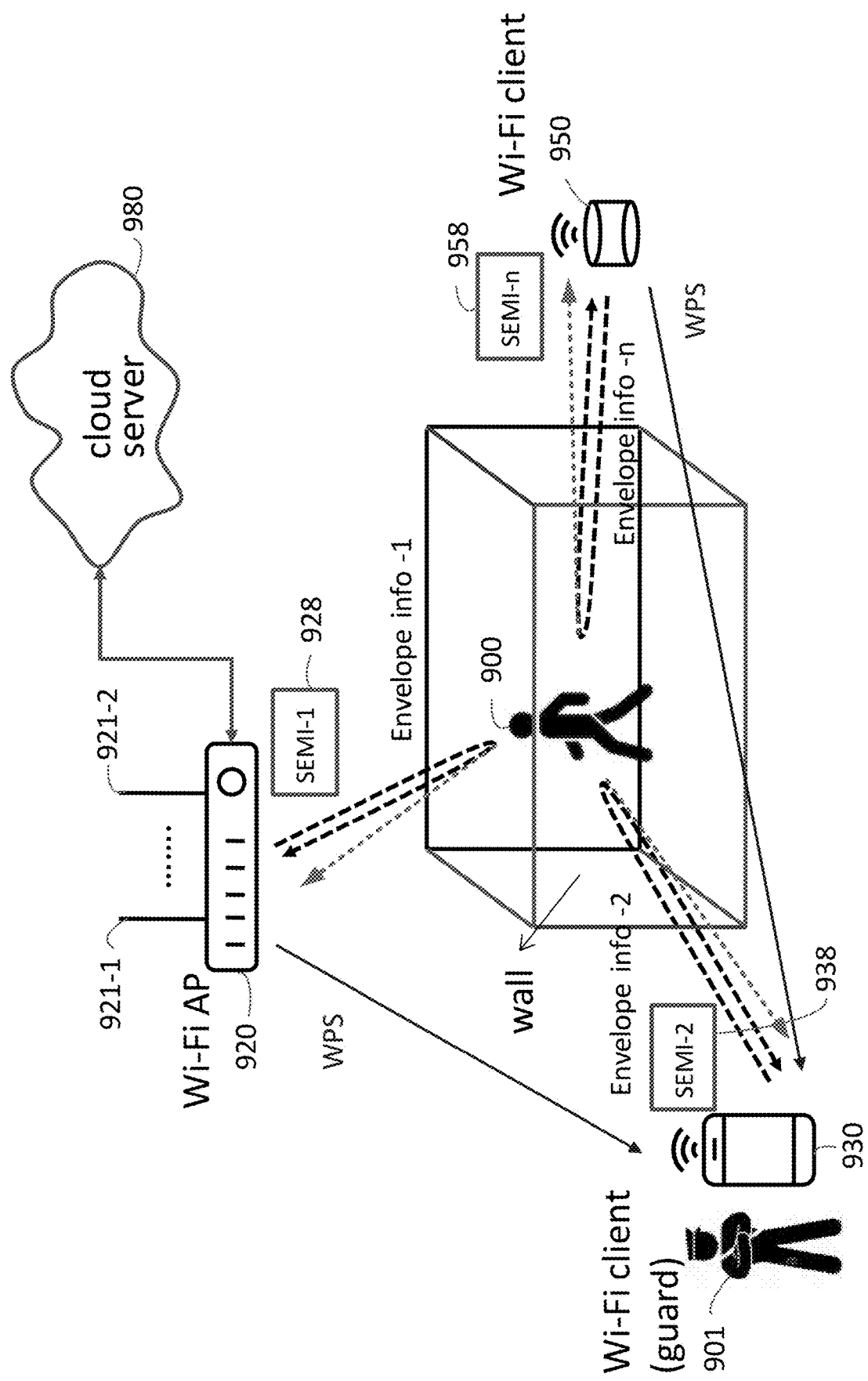
FIG. 53 illustrates an exemplary positioning system by multiple SEM signals and a Wi-Fi positioning system, according to some embodiments of the present disclosure.

FIG. 53 illustrates an exemplary positioning system by multiple SEM signals and a Wi-Fi positioning system, according to some embodiments of the present disclosure. As shown in FIG. 53, the positioning system includes Wi-Fi AP 920, Wi-Fi clients 930 and 950 and cloud server 980 for positioning person 900. Wi-Fi AP 920 includes antennae 921-1 and 921-2 and SEMI-1 928. Wi-Fi client 930 may include two antenna ports and SEMI-2 938. Wi-Fi client 950 may include two antenna ports and SEMI-n 958. Cloud server 980 includes one or more processors and memory.

The positioning system of FIG. 53 is configured to perform operations as the positioning system of FIG. 51, except that positions of Wi-Fi clients 930 and 950 are determined by wireless positioning operations. For example, cloud server 980 is configured to determine the positions of Wi-Fi clients 930 and 950 by operations of a Wi-Fi positioning system (WPS). The operations of the WPS are configured to utilize characteristics of nearby Wi-Fi hotspots and other wireless access points to discover where Wi-Fi clients 930 and 950 are located.

After cloud server 980 obtains the positions of Wi-Fi clients 930 and 950, cloud server 980, Wi-Fi AP 920, and Wi-Fi clients 930 and 950 are configured to operate as cloud server 980 and Wi-Fi APs 920, 940, and 960 of FIG. 51 to determine a position of person 900 by SEM. It is helpful for positioning person 900 when cloud server 980 does not have positions of Wi-Fi clients 930 and 950. For example, when Wi-Fi APs 940 and 960 are not available, cloud server 980 can determine positions of Wi-Fi clients 930 and 950, and determine the position of person 900 based on the positions of Wi-Fi clients 930 and 950.

As illustrated in FIG. 53, cloud server 980 is configured to determine the position of Wi-Fi client 830 by WPS operations.

In some embodiments, method 910 further includes performing an operation associated with the position of the object. For example, as shown in FIG. 53, cloud server 980 is configured to determine the position of person 900 in a room. Cloud server 980 is configured to gather information associated with the room, such as available appliances and their on/off statuses.

In some embodiments, the object in method 910 is a person. The operation associated with the position of the object includes at least one of turning on a light, determining a space occupied by the object, or providing guide information to the person.

For example, cloud server 980 in FIG. 53 is configured to determine the position of person 900 in a room. Cloud server 980 can be configured to turn on a light or turn on air conditioner for person 900. Alternatively, cloud server 980 can be configured to determining the room occupied by person 900 as a living room. Alternatively, cloud server 980 can be configured to provide guide information to person 900 when the room is a demonstration room.

In some embodiments, method 910 further includes obtaining information about the position of the object; and providing the information or a service based on the position of the object. For example, cloud server 980 is configured to obtain information about the demonstration room at which person 900 is located. Cloud server 980 is configured to project demonstration information for person 900. Alternatively, cloud server 980 is configured to provide an audio guide service for person 900 based on his position.

Figure 54:
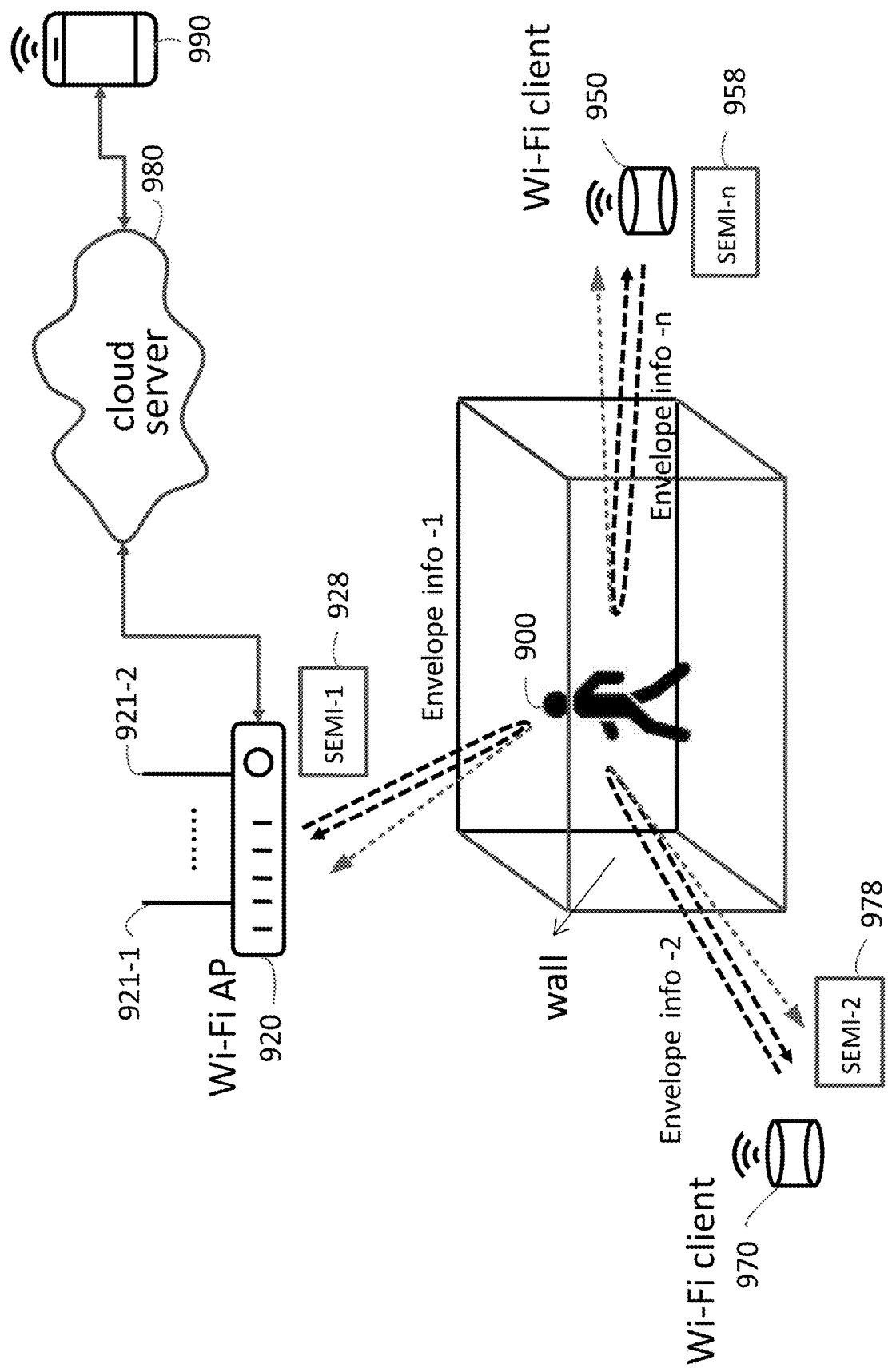
FIG. 54 illustrates an exemplary positioning system by multiple SEM signals, according to some embodiments of the present disclosure.

FIG. 54 illustrates an exemplary positioning system by multiple SEM signals, according to some embodiments of the present disclosure. As shown in FIG. 54, the positioning system includes Wi-Fi AP 920, Wi-Fi clients 950 and 970, a cloud server 980, and a mobile terminal 990 for positioning person 900. Wi-Fi AP 920 includes antennae 921-1 and 921-2 and SEMI-1 928. Wi-Fi client 950 may include two antenna ports and SEMI-n 958. Wi-Fi client 970 may include two antenna ports and SEMI-2 978. Cloud server 980 includes one or more processors and memory. Mobile terminal 990 includes one or more processors and memory.

Wi-Fi AP 920, Wi-Fi clients 950 and 970, and cloud server 980 of FIG. 54 operate for positioning person 900 as Wi-Fi AP 920, Wi-Fi clients 950 and 930, and cloud server 980 of FIG. 53. Mobile terminal 990 is configured to connect to cloud server 980. Mobile terminal 990 is configured to associate, for example, Envelope info-1 with a bedroom, Envelope info-2 with a kitchen, and Envelope info-3 with a living room.

After cloud server 980 determines the position of person 900, cloud server 980 can be configured to determine which room person 900 is in based on the envelope information and association with the bedroom, kitchen, and living room.

Another aspect of the disclosure is directed to a non-transitory processor-readable medium storing instructions which, when executed, cause one or more processors to perform the methods discussed above. The processor-readable medium may include volatile or non-volatile, magnetic, semiconductor, tape, optical, removable, non-removable, or other types of processor-readable medium or processor-readable storage devices. For example, the processor-readable medium may be the storage device or the memory module having the processor instructions stored thereon, as disclosed. In some embodiments, the processor-readable medium may be a disc or a flash drive having the processor instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

The present disclosure is also related to features described in the following numbered embodiments ("E"). The numbered embodiments are illustrated and described according to some embodiments of the present disclosure, including a circuit for detecting motion of an object in an environment, the circuit comprising: a transmission chain configured to transmit a first wireless signal related to a transmission signal; a sensing circuit configured to obtain a modulation signal related to a combination of the transmission signal and an incoming signal, wherein: the modulation signal contains a Doppler shift caused by the motion of the object, and the incoming signal is obtained from a second wireless signal, the second wireless signal being a reflected first wireless signal from the object; an envelope extraction circuit configured to extract a signal envelope varied by the Doppler shift from the modulation signal; and a detector circuit configured to determine whether motion of the object is detected in accordance with the signal envelope.

E1. The circuit of the previous paragraph, wherein the transmission signal is an output signal of a power amplifier, or an input signal of the power amplifier,
    wherein the power amplifier is configured to send the output signal to an antenna to transmit the first wireless signal.

E2. The circuit of E1, wherein the incoming signal contains the Doppler shift.

E3. The circuit of E1, wherein the transmission signal includes:
    a continuous-wave signal, or
    a signal that a transmitter transmits to be the first wireless signal.

E4. The circuit of E1, wherein the envelope extraction circuit is configured to extract the signal envelope varied by the Doppler shift from the modulation signal by:
    rectifying the modulation signal; and
    filtering the rectified modulation signal.

E5. The circuit of E1, wherein the detector circuit is further configured to:
    determine whether the signal envelope comprises a varied envelope,
    wherein a signal level of the varied envelope is at least one of higher than a first threshold or lower than a second threshold, the first threshold being higher than the second threshold.

E6. The circuit of E5, wherein responsive to a determination that the signal envelope comprises the varied envelope, the detector circuit is configured to:
    determine detection of motion of the object in accordance with the varied envelope.

E7. The circuit of E1, wherein the sensing circuit is configured to obtain the modulation signal by:
    modulating the incoming signal by the transmission signal; or
    modulating the transmission signal by the incoming signal.

E8. The circuit of E1, wherein the sensing circuit includes at least one of:
    a coupler,
    a circulator with a leakage path,
    a connection node,
    a capacitor,
    a power divider, or
    a duplexer.

E9. The circuit of E1, wherein the sensing circuit is configured to obtain the modulation signal by:
    adding the transmission and incoming signals; or
    coupling the transmission signal to the incoming signal; or
    degrading the transmission signal, and adding the degraded transmission signal with the incoming signal.

E10. The circuit of E1, wherein the transmission signal is obtained from a source signal, wherein the source signal is one of:
- a constant envelope signal, or
- a non-constant envelope signal, or
- a packet-based signal.

E11. The circuit of E1, wherein the detector circuit is configured to:
- obtain a control signal from a transmitter; and
- determine whether the Doppler shift is detected in accordance with the signal envelope and the control signal.

E12. The circuit of E11, wherein:
- the modulation signal is a first modulation signal;
- the signal envelope is a first signal envelope;
- the detector circuit is configured to determine to extract one of the first signal envelope or a second signal envelope varied by the Doppler shift in accordance with the control signal;
- responsive to determination to extract the second signal envelope,
- the sensing circuit is configured to obtain a second modulation signal;
- the envelope extraction circuit is configured to extract the second signal envelope from the second modulation signal; and
- the detector circuit is configured to determine whether the Doppler shift is detected in accordance with the control signal and the one of the first or second signal envelope.

E13. The circuit of E12, wherein the incoming signal is a first incoming signal, the circuit further comprising:
- an oscillator is configured to generate a source signal,
- wherein the sensing circuit is configured to obtain the second modulation signal by:
- combining the source signal and a second incoming signal to obtain the second modulation signal, wherein the second incoming signal is obtained from the second wireless signal.

E14. The circuit of E1, wherein the sensing circuit is a first sensing circuit, and the modulation signal is a first modulation signal, the circuit further comprising:
- a closed-loop circuit comprising a transmitter, the first sensing circuit, a radio frequency circuit, and a second sensing circuit, wherein:
- the first sensing circuit is configured to obtain the first modulation signal from a signal of the closed-loop circuit; and
- the second sensing circuit is configured to obtain a second modulation signal including the combination of the transmission and incoming signals.

E15. The circuit of E14, wherein the transmitter is configured to adjust transmission power based on the second modulation signal.

E16. The circuit of E14, wherein the signal of the closed-loop circuit includes at least one of:
- an input signal of the radio frequency circuit in the closed-loop circuit, wherein an output signal of the radio frequency circuit is applied to an antenna to transmit the first wireless signal; or
- a signal combining the transmission and incoming signals and being fed back to the transmitter in the closed-loop circuit by the sensing circuit.

E17. The circuit of E14, wherein the signal of the closed-loop circuit includes:
- a signal for controlling transmission power of the transmitter; or
- a signal for controlling a gain of a power amplifier of the radio frequency circuit, wherein an output signal of the power amplifier is applied to an antenna to transmit the first wireless signal.

E18. The circuit of E1, wherein the sensing circuit is a first sensing circuit, and the modulation signal is a first modulation signal, the circuit further comprising:
- a power amplification and linearization loop circuit comprising a transmitter, the first sensing circuit, a radio frequency circuit, and a second sensing circuit, wherein:
- the first sensing circuit is configured to obtain the first modulation signal from a signal of the power amplification and linearization loop circuit; and
- the second sensing circuit is configured to obtain a second modulation signal including the combination of the transmission and incoming signals.

E19. The circuit of E18, wherein the transmitter comprises a pre-distorter configured to:
- pre-distort, based on the second modulation signal, a signal that the transmitter transmits to be the first wireless signal.

E20. The circuit of E18, wherein the signal of the power amplification and linearization loop circuit includes at least one of:
- an input signal of the radio frequency circuit in the power amplification and linearization loop circuit, wherein an output signal of the radio frequency circuit is applied to an antenna to transmit the first wireless signal;
- a signal for controlling signal pre-distortion in the transmitter; or
- a signal combining the transmission and incoming signals and being fed back to the transmitter in the power amplification and linearization loop circuit.

E21. The circuit of E1, wherein:
- the incoming signal is a first incoming signal;
- the second wireless signal is a first reflected first wireless signal from the object;
- the sensing circuit is configured to combine the transmission and first incoming signals as a sensed signal; and
- the sensing circuit comprises:
- a combiner configured to combine the sensed signal and a second incoming signal to obtain the modulation signal, wherein the second incoming signal is obtained from a third wireless signal, the third wireless signal being a second reflected first wireless signal from the object.

E22. The circuit of E21, wherein:
- the first incoming signal is received via a first antenna port; and
- the second incoming signal is received via a second antenna port.

E23. The circuit of E21, wherein:
- the Doppler shift is a first Doppler;
- the first incoming signal includes the first Doppler shift; and
- the second incoming signal includes a second Doppler shift.

E24. The circuit of E21, wherein the sensing circuit further comprises:
- an amplifier configured to amplify the second incoming signal,
- wherein the combiner is configured to combine the sensed signal and the amplified second incoming signal to obtain the modulation signal.

E25. The circuit of E21, wherein:
- the combiner is a first combiner, the envelope extraction circuit is a first envelope extraction circuit,
the modulation signal is a first modulation signal,
the signal envelope is a first signal envelope,
the Doppler shift is a first Doppler shift,
the sensing circuit further comprises:
a phase shift circuit configured to shift a phase of the sensed signal; and
a second combiner configured to combine the phase-shifted sensed signal and the second incoming signal to obtain a second modulation signal; and
the circuit further comprises:
a second envelope extraction circuit configured to extract a second signal envelope varied by a second Doppler shift from the second modulation signal,
wherein the detector circuit is configured to determine whether motion of the object is detected in accordance with the first and second signal envelopes.

E26. The circuit of E1, wherein the sensing circuit comprises:
a combiner configured to combine the transmission and incoming signals to obtain the modulation signal,
wherein:
the transmission signal is an input signal of a radio frequency circuit, wherein an output signal of the radio frequency circuit is applied to a first antenna port for transmitting the first wireless signal; and
the incoming signal is obtained from the second wireless signal via a second antenna port.

E27. The circuit of E26, wherein the sensing circuit comprises:
an amplifier configured to amplify the incoming signal,
wherein the combiner is configured to combine the transmission signal and the amplified incoming signal to obtain the modulation signal.

E28. The circuit of E26, wherein:
the combiner is a first combiner,
the envelope extraction circuit is a first envelope extraction circuit,
the modulation signal is a first modulation signal,
the signal envelope is a first signal envelope,
the Doppler shift is a first Doppler shift,
the sensing circuit comprises:
a second combiner configured to combine a source signal and the incoming signal to obtain a second modulation signal; and
the circuit further comprises:
a second envelope extraction circuit configured to extract a second signal envelope varied by a second Doppler shift from the second modulation signal,
wherein the detector circuit is configured to determine whether motion of the object is detected in accordance with the first and second signal envelopes.

E29. The circuit of E28, wherein:
the transmission signal is an in-phase signal, and
the source signal is a quadrature signal.

E30. The circuit of E26, wherein:
the combiner is a first combiner,
the envelope extraction circuit is a first envelope extraction circuit,
the modulation signal is a first modulation signal,
the signal envelope is a first signal envelope,
the Doppler shift is a first Doppler shift,
the sensing circuit further comprises:
a phase shift circuit configured to shift a phase of the transmission signal; and
a second combiner configured to combine the phase-shifted transmission signal and the incoming signal to obtain a second modulation signal; and
the circuit further comprises:
a second envelope extraction circuit configured to extract a second signal envelope varied by a second Doppler shift from the second modulation signal,
wherein the detector circuit is configured to determine whether motion of the object is detected in accordance with the first and second signal envelopes.

E31. The circuit of E21, wherein:
the envelope extraction circuit is a first envelope extraction circuit,
the modulation signal is a first modulation signal,
the Doppler shift is a first Doppler shift, and
the signal envelope is a first signal envelope,
the circuit further comprising:
a second envelope extraction circuit configured to extract a second signal envelope varied by a second Doppler shift from the sensed signal,
wherein the detector circuit is configured to determine whether motion of the object is detected in accordance with the first and second signal envelopes.

E32. The circuit of E31, wherein:
the first incoming signal is received via a first antenna port; and
the second incoming signal is received via a second antenna port.

E33. The circuit of E32, wherein the detector circuit is further configured to:
determine a phase difference between the first and second signal envelopes; and
determine a direction of the object based on the phase difference.

E34. The circuit of E21, wherein:
the envelope extraction circuit is a first envelope extraction circuit,
the modulation signal is a first modulation signal,
the Doppler shift is a first Doppler shift,
the signal envelope is a first signal envelope,
the sensing circuit further comprises:
a second combiner configured to combine the sensed signal and a third incoming signal to obtain a second modulation signal, wherein the third incoming signal is obtained from a fourth wireless signal, the fourth wireless signal being a third reflected first wireless signal from the object; and
the circuit further comprises:
a second envelope extraction circuit configured to extract a second signal envelope varied by a second Doppler shift from the second modulation signal,
wherein the detector circuit is configured to determine whether motion of the object is detected in accordance with the first and second signal envelopes.

E35. The circuit of E34, wherein:
the first incoming signal is received from a first antenna port;
the second incoming signal is received from a second antenna port; and
the third incoming signal is received from a third antenna port.

E36. The circuit of E35, wherein the detector circuit is further configured to:
determine a phase difference between the first and second signal envelopes; and
determine a direction of the object based on the phase difference.

E37. The circuit of E1, wherein:
the motion of the object includes one or more of a plurality of gestures; and
the detector circuit is configured to determine whether one of the plurality of gestures is detected in accordance with the signal envelope.

E38. The circuit of E37, wherein:
the signal envelope comprises a pattern of variation; and
the detector circuit is configured to determine whether one of the plurality of gestures is detected in accordance with the pattern of variation.

E39. The circuit of E37, wherein:
the signal envelope contains at least one of a first pattern or a second pattern of variation; and
the detector circuit is configured to:
determine whether a first one of the plurality of gestures is detected in accordance with the first pattern of variation; and
determine whether a second one of the plurality of gestures is detected in accordance with the second pattern of variation.

E40. The circuit of E37, wherein the detector circuit is configured to:
determine a number of detected times a gesture occurs in accordance with the signal envelope.

E41. The circuit of E37, wherein the envelope extraction circuit is configured to extract the signal envelope varied by the Doppler shift from the modulation signal by:
detecting power of the signal envelope to obtain a pulse signal; and
sampling and holding the pulse signal to obtain the signal envelope.

E42. The circuit of E41, wherein the envelope extraction circuit is configured to trigger the sampling and holding by the pulse signal.

E43. A non-transitory processor-readable medium storing instructions that are executable by one or more processors of an apparatus to perform operations for detecting motion of an object in an environment, the operations comprising:
transmitting a first wireless signal related to a transmission signal and receiving a second wireless signal related to an incoming signal, wherein the second wireless signal is a reflected first wireless signal from the object;
obtaining a modulation signal related to a combination of the transmission and incoming signals, wherein the modulation signal contains a Doppler shift caused by the motion of the object;
extracting a signal envelope varied by the Doppler shift from the modulation signal; and
determining whether motion of the object is detected in accordance with the signal envelope.

E44. A circuit for determining a position of an object in an environment, comprising:
a sensing circuit configured to obtain a first modulation signal and a second modulation signal respectively related to a first signal and a second signal, wherein:
the first and second modulation signals respectively contain a first Doppler shift and a second Doppler shift caused by motion of the object, and
the first and second signals are respectively obtained from first and second wireless signals that are received via first and second antennae, the first and second wireless signals respectively being first and second reflected signals of a third wireless signal from the object;
an envelope extraction circuit configured to extract a first signal envelope varied by the first Doppler shift from the first modulation signal, and a second signal envelope varied by the second Doppler shift from the second modulation signal; and
a detector circuit configured to determine a direction of the object relative to a reference position in accordance with the first and second signal envelopes.

E45. The circuit of E44, wherein the detector circuit is configured to determine the direction of the object relative to the reference position by:
determining an angle of the object relative to the reference position in accordance with the first and second signal envelopes.

E46. The circuit of E45, wherein the detector circuit is configured to determine the angle of the object relative to the reference position by:
determining a phase difference between the first and second signal envelopes; and
determining the angle of the object relative to the reference position in accordance with the phase difference.

E47. The circuit of E44, wherein the detector circuit is configured to:
determine presence of the object in accordance with at least one of the first or second signal envelope.

E48. A system for determining a position of an object in an environment, comprising:
a first device comprising:
a sensing circuit configured to obtain a first modulation signal and a second modulation signal respectively related to a first signal and a second signal, wherein:
the first and second modulation signals respectively contain a first Doppler shift and a second Doppler shift caused by motion of the object, and
the first and second signals are respectively obtained from first and second wireless signals that are received via first and second antennae, the first and second wireless signals respectively being first and second reflected signals of a third wireless signal from the object;
an envelope extraction circuit configured to extract a first signal envelope varied by the first Doppler shift from the first modulation signal, and a second signal envelope varied by the second Doppler shift from the second modulation signal; and
a detector circuit configured to determine a direction of the object relative to a reference position in accordance with the first and second signal envelopes.
a second device configured to detect a second direction of the object relative to a second reference position in accordance with third and fourth signal envelopes respectively varied by third and fourth Doppler shifts caused by the motion of the object; and
a controller configured to determine a position of the object in accordance with the first and second directions relative to the first and second reference positions, respectively.

E49. The system of E48, further comprising:
a third devices configured to detect a third direction of the object relative to a third reference position in accordance with fifth and sixth signal envelopes respectively varied by fifth and sixth Doppler shifts caused by the motion of the object,
wherein the controller is configured to determine the position of the object in accordance with the first, second, and third angles relative to the first, second, and third reference positions, respectively.

E50. The system of E48, wherein the controller is configured to:

determine the second reference position by wireless positioning operations.

E51. The system of E48, wherein the controller is configured to:
perform an operation associated with the position of the object.

E52. The system of E51, wherein the object is a person and the operation associated with the position of the object comprises at least one of:
turning on a light;
determining a space occupied by the person; or
providing guide information to the person.

E53. The system of E48, wherein the controller is configured to:
obtain information about the position of the object; and
provide the information or a service based on the position of the object.

E54. A non-transitory processor-readable medium storing instructions that are executable by one or more processors of an apparatus to perform operations for determining a position of an object in an environment, the operations comprising:
obtaining a first modulation signal and a second modulation signal, wherein the first and second modulation signals respectively contain a first Doppler shift and a second Doppler shift caused by motion of the object;
extracting a first signal envelope varied by the first Doppler shift from the first modulation signal, and a second signal envelope varied by the second Doppler shift from the second modulation signal; and
determining a direction of the object relative to a reference position in accordance with the first and second signal envelopes.

What is claimed is:

1. A method for detecting motion of an object in an environment, comprising:
transmitting a first wireless signal related to a transmission signal and receiving a second wireless signal related to an incoming signal, wherein:
the transmission signal is a continuous wave signal,
transmitting the first wireless signal includes transmitting the first wireless signal based on an output signal provided by a power amplifier, and
the second wireless signal is a reflected first wireless signal from the object;
obtaining a modulation signal by combining the continuous wave signal and the incoming signal, wherein the modulation signal contains a Doppler shift caused by the motion of the object;
extracting a signal envelope varied by the Doppler shift from the modulation signal;
determining whether a first signal level of the signal envelope exceeds a first predetermined threshold and a second signal level of the signal envelope is lower than a second predetermined threshold, the first predetermined threshold being higher than the second predetermined threshold; and
responsive to a determination that the first signal level of the signal envelope exceeds the first predetermined threshold and the second signal level of the signal envelope is lower than the second predetermined threshold, determining detection of the motion of the object.

2. The method of claim 1, wherein the transmission signal is an input signal of the power amplifier, wherein the output signal provided by the power amplifier is configured to be applied to an antenna to transmit the first wireless signal.

3. The method of claim 1, wherein extracting the signal envelope varied by the Doppler shift from the modulation signal comprises:
rectifying the modulation signal; and
filtering the rectified modulation signal.

4. The method of claim 1, wherein obtaining the modulation signal comprises:
modulating the incoming signal by the continuous wave signal; or
modulating the continuous wave signal by the incoming signal.

5. The method of claim 1, wherein the output signal is provided by the power amplifier to a circulator and obtaining the modulation signal comprises:
degrading the transmission signal by a leakage path of the circulator, and
adding the degraded transmission signal with the incoming signal using the circulator.

6. The method of claim 1, further comprising:
obtaining a control signal from a transmitter that generates the transmission signal; and
determining whether the Doppler shift is detected in accordance with the signal envelope and the control signal.

7. The method of claim 6, wherein the modulation signal is a first modulation signal, and the signal envelope is a first signal envelope, the method further comprising:
determining to extract one of the first signal envelope or a second signal envelope varied by the Doppler shift in accordance with the control signal;
responsive to determining to extract the second signal envelope,
obtaining a second modulation signal, and
extracting the second signal envelope from the second modulation signal; and
determining whether the Doppler shift is detected in accordance with the control signal and the one of the first or second signal envelope.

8. The method of claim 7, wherein the incoming signal is a first incoming signal, and obtaining the second modulation signal comprises:
combining a source signal and a second incoming signal to obtain the second modulation signal, wherein:
the source signal is obtained from an oscillator, and
the second incoming signal is obtained from the second wireless signal.

9. The method of claim 1, wherein the incoming signal is a first incoming signal, the second wireless signal is a first reflected first wireless signal from the object, adding the transmission and first incoming signals provides a sensed signal, and obtaining the modulation signal comprises:
combining the sensed signal and a second incoming signal to obtain the modulation signal, wherein the second incoming signal is obtained from a third wireless signal, the third wireless signal being a second reflected first wireless signal from the object.

10. The method of claim 9, comprising:
amplifying the second incoming signal,
wherein combining the sensed and second incoming signals includes:
combining the sensed signal and the amplified second incoming signal to obtain the modulation signal.

11. The method of claim 9, wherein the modulation signal is a first modulation signal, the signal envelope is a first signal envelope, and the Doppler shift is a first Doppler shift, the method further comprising:
  shifting a phase of the sensed signal;
  obtaining a second modulation signal by combining the phase-shifted sensed signal and the second incoming signal;
  extracting a second signal envelope varied by a second Doppler shift from the second modulation signal; and
  determining whether motion of the object is detected in accordance with the first and second signal envelopes.

12. The method of claim 1, wherein:
  the transmission signal is an input signal of a radio frequency circuit, the radio frequency circuit comprising the power amplifier, wherein an output signal of the radio frequency circuit is applied to a first antenna port for transmitting the first wireless signal; and
  the incoming signal is obtained from the second wireless signal via a second antenna port.

13. The method of claim 12, wherein the modulation signal is a first modulation signal, the signal envelope is a first signal envelope, and the Doppler shift is a first Doppler shift, the method further comprising:
  obtaining a second modulation signal by combining a source signal and the incoming signal, wherein the source signal is obtained from an oscillator;
  extracting a second signal envelope varied by a second Doppler shift from the second modulation signal; and
  determining whether motion of the object is detected in accordance with the first and second signal envelopes;
  wherein the transmission signal is an in-phase signal, and the source signal is a quadrature signal.

14. The method of claim 12, wherein the modulation signal is a first modulation signal, the signal envelope is a first signal envelope, and the Doppler shift is a first Doppler shift, the method further comprising:
  shifting a phase of the transmission signal;
  obtaining a second modulation signal by combining the phase-shifted transmission signal and the incoming signal;
  extracting a second signal envelope varied by a second Doppler shift from the second modulation signal; and
  determining whether motion of the object is detected in accordance with the first and second signal envelopes.

15. The method of claim 9, wherein:
  the modulation signal is a first modulation signal,
  the Doppler shift is a first Doppler shift, and
  the signal envelope is a first signal envelope,
  the method further comprising:
    extracting a second signal envelope varied by a second Doppler shift from the sensed signal; and
    determining whether motion of the object is detected in accordance with the first and second signal envelopes.

16. The method of claim 15, further comprising:
  determining a phase difference between the first and second signal envelopes; and
  determining a direction of the object based on the phase difference;
  wherein
    the first incoming signal is received via a first antenna port; and
    the second incoming signal is received via a second antenna port.

17. The method of claim 9, wherein:
  the modulation signal is a first modulation signal,
  the Doppler shift is a first Doppler shift, and
  the signal envelope is a first signal envelope,
  the method further comprising:
    combining the sensed signal and a third incoming signal to obtain a second modulation signal, wherein the third incoming signal is obtained from a fourth wireless signal, the fourth wireless signal being a third reflected first wireless signal from the object;
    extracting a second signal envelope varied by a second Doppler shift from the second modulation signal; and
    determining whether motion of the object is detected in accordance with the first and second signal envelopes.

18. The method of claim 17, further comprising:
  determining a phase difference between the first and second signal envelopes; and
  determining a direction of the object based on the phase difference;
  wherein
    the first incoming signal is received via a first antenna port;
    the second incoming signal is received via a second antenna port; and
    the third incoming signal is received via a third antenna port.

19. A circuit for detecting motion of an object in an environment, comprising:
  a transmission chain configured to transmit a first wireless signal related to a transmission signal, the transmission chain including a power amplifier, wherein the transmission signal is a continuous wave signal;
  a sensing circuit configured to obtain a modulation signal by combining the continuous wave signal and an incoming signal, wherein:
    the modulation signal contains a Doppler shift caused by the motion of the object, and
    the incoming signal is obtained from a second wireless signal, the second wireless signal being a reflected first wireless signal from the object;
  an envelope extraction circuit configured to extract a signal envelope varied by the Doppler shift from the modulation signal; and
  a detector circuit configured to:
    determine whether a first signal level of the signal envelope exceeds a first predetermined threshold and a second signal level of the signal envelope is lower than a second predetermined threshold, the first predetermined threshold being higher than the second predetermined threshold; and
    responsive to a determination that the first signal level of the signal envelope exceeds the first predetermined threshold and the second signal level of the signal envelope is lower than the second predetermined threshold, determine detection of the motion of the object.

20. A circuit for detecting motion of an object in an environment, the circuit comprising:
  a transmission chain including a power amplifier, a sensing circuit, and a single antenna coupled together, the transmission chain configured to transmit, by the single antenna, a first wireless signal related to a transmission signal, wherein:
    the transmission signal is a continuous wave signal;
    the single antenna is configured to receive a second wireless signal as an incoming signal, the second wireless signal being a reflected first wireless signal from the object; and the sensing circuit is configured to obtain a modulation signal by combining the continuous wave signal and the incoming signal, wherein the modulation signal contains a Doppler shift caused by the motion of the object;

an envelope extraction circuit configured to extract a signal envelope varied by the Doppler shift from the modulation signal; and a detector circuit configured to:
   determine that a signal level of the signal envelope exceeds a predetermined threshold; and
   responsive to the determination that the signal level of the signal envelope exceeds the predetermined threshold, determine detection of the motion of the object.

* * * * *